US008724000B2

(12) United States Patent  (10) Patent No.: US 8,724,000 B2
Georgiev et al.  (45) Date of Patent: May 13, 2014

(54) METHODS AND APPARATUS FOR SUPER-RESOLUTION IN INTEGRAL PHOTOGRAPHY

(75) Inventors: Todor G. Georgiev, Sunnyvale, CA (US); Georgi N. Chunev, Bloomington, IN (US); Andrew Lumsdaine, Bloomington, IN (US)

(73) Assignee: Adobe Systems Incorporated, San Jose, CA (US)

( * ) Notice: Subject to any disclaimer, the term of this patent is extended or adjusted under 35 U.S.C. 154(b) by 422 days.

(21) Appl. No.: 12/957,316

(22) Filed: Nov. 30, 2010

(65) Prior Publication Data

US 2013/0128087 A1  May 23, 2013

Related U.S. Application Data

(60) Provisional application No. 61/377,826, filed on Aug. 27, 2010.

(51) Int. Cl.
*H04N 3/14* (2006.01)
*H04N 5/335* (2011.01)
*H04N 5/225* (2006.01)
*G02B 27/10* (2006.01)

(52) U.S. Cl.
USPC ............................ 348/307; 348/340; 348/343

(58) Field of Classification Search
USPC .................. 348/307, 340, 343; 359/619–628
See application file for complete search history.

(56) References Cited

U.S. PATENT DOCUMENTS

| 725,567 A | 4/1903 | Ives |
| 2,039,648 A | 5/1936 | Ives |
| 3,743,379 A | 7/1973 | McMahon |
| 3,971,065 A | 7/1976 | Bayer |
| 3,985,419 A | 10/1976 | Matsumoto et al. |
| 4,175,844 A | 11/1979 | Glaser-Inbari |

(Continued)

FOREIGN PATENT DOCUMENTS

| CN | 101588437 | 11/2009 |
| CN | 101610353 | 12/2009 |

(Continued)

OTHER PUBLICATIONS

"Final Office Action", U.S. Appl. No. 12/957,322, (Aug. 12, 2013), 16 pages.

(Continued)

*Primary Examiner* — Timothy J Henn
*Assistant Examiner* — Pritham Prabhakher
(74) *Attorney, Agent, or Firm* — Wolfe-SBMC

(57) ABSTRACT

Methods and apparatus for super-resolution in integral photography are described. Several techniques are described that, alone or in combination, may improve the super-resolution process and/or the quality of super-resolved images that may be generated from flats captured with a focused plenoptic camera using a super-resolution algorithm. At least some of these techniques involve modifications to the focused plenoptic camera design. In addition, at least some of these techniques involve modifications to the super-resolution rendering algorithm. The techniques may include techniques for reducing the size of pixels, techniques for shifting pixels relative to each other so that super-resolution is achievable at more or all depths of focus, and techniques for sampling using an appropriate filter or kernel. These techniques may, for example, reduce or eliminate the need to perform deconvolution on a super-resolved image, and may improve super-resolution results and/or increase performance.

20 Claims, 31 Drawing Sheets

(56) References Cited

U.S. PATENT DOCUMENTS

| | | | |
|---|---|---|---|
| 4,180,313 A | 12/1979 | Inuiya | |
| 4,193,093 A | 3/1980 | St. Clair | |
| 4,230,942 A | 10/1980 | Stauffer | |
| 4,580,219 A | 4/1986 | Pelc et al. | |
| 4,732,453 A | 3/1988 | de Montebello et al. | |
| 4,849,782 A | 7/1989 | Koyama et al. | |
| 5,076,687 A | 12/1991 | Adelson | |
| 5,125,750 A | 6/1992 | Corel et al. | |
| 5,361,127 A | 11/1994 | Daily | |
| 5,400,093 A | 3/1995 | Timmers | |
| 5,579,445 A | 11/1996 | Loce et al. | |
| 5,659,420 A | 8/1997 | Wakai et al. | |
| 5,724,122 A | 3/1998 | Oskotsky | |
| 5,729,011 A | 3/1998 | Sekiguchi | |
| 5,946,077 A | 8/1999 | Nemirovskiy | |
| 5,987,164 A | 11/1999 | Szeliski et al. | |
| 6,009,188 A | 12/1999 | Cohen et al. | |
| 6,097,394 A | 8/2000 | Levoy et al. | |
| 6,097,541 A | 8/2000 | Davies et al. | |
| 6,137,535 A | 10/2000 | Meyers | |
| 6,137,937 A | 10/2000 | Okano et al. | |
| 6,268,846 B1 | 7/2001 | Georgiev | |
| 6,301,416 B1 | 10/2001 | Okano et al. | |
| 6,317,192 B1 | 11/2001 | Silverbrook et al. | |
| 6,339,506 B1 | 1/2002 | Wakelin et al. | |
| 6,341,183 B1 | 1/2002 | Goldberg | |
| 6,351,269 B1 | 2/2002 | Georgiev | |
| 6,476,805 B1 | 11/2002 | Shum et al. | |
| 6,570,613 B1 | 5/2003 | Howell | |
| 6,738,533 B1 | 5/2004 | Shum et al. | |
| 6,804,062 B2 | 10/2004 | Atwater et al. | |
| 6,831,782 B2 | 12/2004 | Patton et al. | |
| 6,838,650 B1 | 1/2005 | Toh | |
| 6,842,297 B2 | 1/2005 | Dowski, Jr. | |
| 6,961,075 B2 | 11/2005 | Mindler et al. | |
| 7,019,671 B2 | 3/2006 | Kawai | |
| 7,054,067 B2 | 5/2006 | Okano et al. | |
| 7,085,062 B2 | 8/2006 | Hauschild | |
| 7,113,231 B2 | 9/2006 | Conner et al. | |
| 7,119,319 B2 | 10/2006 | Noto et al. | |
| 7,164,446 B2 | 1/2007 | Konishi | |
| 7,167,203 B1 | 1/2007 | Yukawa et al. | |
| 7,367,537 B2 | 5/2008 | Ibe | |
| 7,470,032 B2 | 12/2008 | Damera-Venkata et al. | |
| 7,620,309 B2 | 11/2009 | Georgiev | |
| 7,723,662 B2 | 5/2010 | Levoy et al. | |
| 7,732,744 B2 | 6/2010 | Utagawa | |
| 7,792,423 B2 | 9/2010 | Raskar et al. | |
| 7,838,814 B2 | 11/2010 | Minhas et al. | |
| 7,872,796 B2 | 1/2011 | Georgiev | |
| 7,880,794 B2 | 2/2011 | Yamagata et al. | |
| 7,916,934 B2 | 3/2011 | Vetro et al. | |
| 7,936,392 B2 | 5/2011 | Ng et al. | |
| 7,949,252 B1 | 5/2011 | Georgiev | |
| 7,956,924 B2 | 6/2011 | Georgiev | |
| 7,962,033 B2 | 6/2011 | Georgiev et al. | |
| 7,965,936 B2 | 6/2011 | Raskar et al. | |
| 7,978,234 B2 | 7/2011 | Yano et al. | |
| 8,019,215 B2 | 9/2011 | Georgiev et al. | |
| 8,106,994 B2* | 1/2012 | Ichimura | 348/340 |
| 8,126,323 B2 | 2/2012 | Georgiev et al. | |
| 8,155,456 B2 | 4/2012 | Babacan et al. | |
| 8,160,439 B2 | 4/2012 | Georgiev et al. | |
| 8,189,065 B2 | 5/2012 | Georgiev et al. | |
| 8,189,089 B1 | 5/2012 | Georgiev | |
| 8,228,417 B1 | 7/2012 | Georgiev et al. | |
| 8,237,843 B2* | 8/2012 | Yamamoto et al. | 348/340 |
| 8,243,157 B2 | 8/2012 | Ng et al. | |
| 8,289,440 B2 | 10/2012 | Knight et al. | |
| 8,290,358 B1 | 10/2012 | Georgiev | |
| 8,315,476 B1 | 11/2012 | Georgiev et al. | |
| 8,330,848 B2* | 12/2012 | Yamamoto | 348/343 |
| 8,345,144 B1 | 1/2013 | Georgiev et al. | |
| 8,379,105 B2 | 2/2013 | Georgiev et al. | |
| 8,380,060 B2 | 2/2013 | Georgiev et al. | |
| 8,390,728 B2* | 3/2013 | Lim et al. | 348/344 |
| 8,400,555 B1 | 3/2013 | Georgiev et al. | |
| 8,401,316 B2 | 3/2013 | Babacan | |
| 8,471,920 B2 | 6/2013 | Georgiev et al. | |
| 8,502,911 B2* | 8/2013 | Yamamoto et al. | 348/343 |
| 8,559,756 B2 | 10/2013 | Georgiev et al. | |
| 8,570,426 B2 | 10/2013 | Pitts et al. | |
| 8,611,693 B2 | 12/2013 | Intwala et al. | |
| 8,665,341 B2 | 3/2014 | Georgiev et al. | |
| 2001/0012149 A1 | 8/2001 | Lin et al. | |
| 2001/0050813 A1 | 12/2001 | Allio | |
| 2002/0140835 A1 | 10/2002 | Silverstein | |
| 2002/0159030 A1 | 10/2002 | Frey et al. | |
| 2003/0108821 A1 | 6/2003 | Mei et al. | |
| 2003/0117511 A1 | 6/2003 | Belz et al. | |
| 2003/0156077 A1 | 8/2003 | Balogh | |
| 2003/0231255 A1 | 12/2003 | Szajewski et al. | |
| 2004/0114807 A1 | 6/2004 | Lelescu et al. | |
| 2004/0218830 A1 | 11/2004 | Kang et al. | |
| 2004/0223214 A1 | 11/2004 | Atkinson | |
| 2005/0080602 A1 | 4/2005 | Snyder et al. | |
| 2005/0088714 A1 | 4/2005 | Kremen | |
| 2005/0099504 A1 | 5/2005 | Nayar et al. | |
| 2005/0122418 A1 | 6/2005 | Okita et al. | |
| 2005/0243178 A1* | 11/2005 | McConica | 348/208.99 |
| 2006/0061845 A1 | 3/2006 | Lin | |
| 2006/0072029 A1 | 4/2006 | Miyatake et al. | |
| 2006/0104542 A1 | 5/2006 | Blake et al. | |
| 2006/0109282 A1 | 5/2006 | Lin et al. | |
| 2006/0177150 A1 | 8/2006 | Uyttendaele et al. | |
| 2007/0091197 A1 | 4/2007 | Okayama et al. | |
| 2007/0252074 A1 | 11/2007 | Ng et al. | |
| 2007/0258096 A1 | 11/2007 | Cui et al. | |
| 2007/0285526 A1 | 12/2007 | Mann et al. | |
| 2008/0007839 A1 | 1/2008 | Deng et al. | |
| 2008/0056549 A1 | 3/2008 | Hamill et al. | |
| 2008/0095469 A1 | 4/2008 | Kiser | |
| 2008/0107231 A1 | 5/2008 | Miyazaki et al. | |
| 2008/0142685 A1 | 6/2008 | Gazeley | |
| 2008/0152215 A1 | 6/2008 | Horie et al. | |
| 2008/0165270 A1 | 7/2008 | Watanabe et al. | |
| 2008/0166063 A1 | 7/2008 | Zeng | |
| 2008/0187305 A1* | 8/2008 | Raskar et al. | 396/268 |
| 2008/0193026 A1 | 8/2008 | Horie et al. | |
| 2008/0218610 A1 | 9/2008 | Chapman et al. | |
| 2008/0247623 A1 | 10/2008 | Delso et al. | |
| 2009/0002504 A1 | 1/2009 | Yano et al. | |
| 2009/0027542 A1 | 1/2009 | Yamamoto et al. | |
| 2009/0041381 A1 | 2/2009 | Georgiev | |
| 2009/0041448 A1 | 2/2009 | Georgiev | |
| 2009/0086304 A1 | 4/2009 | Yurlov et al. | |
| 2009/0122175 A1 | 5/2009 | Yamagata | |
| 2009/0127440 A1 | 5/2009 | Nakai | |
| 2009/0128658 A1 | 5/2009 | Hayasaka et al. | |
| 2009/0128669 A1 | 5/2009 | Ng et al. | |
| 2009/0140131 A1 | 6/2009 | Utagawa | |
| 2009/0167922 A1* | 7/2009 | Perlman et al. | 348/340 |
| 2009/0179142 A1* | 7/2009 | Duparre et al. | 250/208.1 |
| 2009/0185801 A1 | 7/2009 | Georgiev et al. | |
| 2009/0190022 A1* | 7/2009 | Ichimura | 348/340 |
| 2009/0268970 A1 | 10/2009 | Babacan et al. | |
| 2009/0295829 A1 | 12/2009 | Georgiev et al. | |
| 2009/0316014 A1* | 12/2009 | Lim et al. | 348/222.1 |
| 2010/0013979 A1 | 1/2010 | Golub et al. | |
| 2010/0026852 A1 | 2/2010 | Ng et al. | |
| 2010/0085468 A1 | 4/2010 | Park et al. | |
| 2010/0091133 A1* | 4/2010 | Lim et al. | 348/223.1 |
| 2010/0097491 A1 | 4/2010 | Farina et al. | |
| 2010/0128145 A1 | 5/2010 | Pitts et al. | |
| 2010/0141802 A1 | 6/2010 | Knight et al. | |
| 2010/0205388 A1 | 8/2010 | MacInnis | |
| 2010/0265381 A1 | 10/2010 | Yamamoto et al. | |
| 2010/0265386 A1 | 10/2010 | Raskar et al. | |
| 2011/0043604 A1 | 2/2011 | Peleg et al. | |
| 2011/0063354 A1 | 3/2011 | Enge | |
| 2011/0069189 A1 | 3/2011 | Venkataraman et al. | |
| 2011/0141224 A1 | 6/2011 | Stec et al. | |
| 2011/0157387 A1 | 6/2011 | Han et al. | |
| 2011/0169980 A1 | 7/2011 | Cho et al. | |

(56) References Cited

U.S. PATENT DOCUMENTS

| | | | |
|---|---|---|---|
| 2011/0211824 A1 | 9/2011 | Georgiev et al. |
| 2012/0183232 A1 | 7/2012 | Babacan et al. |
| 2012/0229679 A1 | 9/2012 | Georgiev et al. |
| 2012/0281072 A1 | 11/2012 | Georgiev et al. |
| 2013/0120356 A1 | 5/2013 | Georgiev |
| 2013/0120605 A1 | 5/2013 | Georgiev |
| 2013/0121615 A1 | 5/2013 | Intwala |
| 2013/0127901 A1 | 5/2013 | Georgiev et al. |
| 2013/0128030 A1 | 5/2013 | Georgiev |
| 2013/0128068 A1 | 5/2013 | Georgiev et al. |
| 2013/0128069 A1 | 5/2013 | Georgiev et al. |
| 2013/0128077 A1 | 5/2013 | Georgiev |
| 2013/0128081 A1 | 5/2013 | Georgiev |

FOREIGN PATENT DOCUMENTS

| | | |
|---|---|---|
| CN | 807604 | 7/2011 |
| EP | 1548481 | 6/2005 |
| JP | 504669 | 10/1976 |
| JP | 7270791 | 10/1995 |
| JP | 2001330769 | 11/2001 |
| JP | 2004239932 | 8/2004 |
| WO | 01/37025 | 5/2001 |
| WO | WO-0137025 | 5/2001 |
| WO | 2006/057838 | 6/2006 |
| WO | WO-2006057838 | 6/2006 |
| WO | WO-2007044725 | 4/2007 |
| WO | 2007/115281 | 10/2007 |
| WO | WO-2007115281 | 10/2007 |
| WO | WO-2009151903 | 12/2009 |

OTHER PUBLICATIONS

"Non-Final Office Action", U.S. Appl. No. 12/957,312, (Aug. 28, 2013),17 pages.

"Supplemental Notice of Allowance", U.S. Appl. No. 12/186,392, (Aug. 27, 2013), 2 pages.

Adelson, T., et al. "Single Lens Stereo with a Plenoptic Camera," IEEE Transactions on Pattern Analysis and Machine, Intelligence 14, 2, Feb. 1992, pp. 99-106.

Ng, R., et al, "Light Field Photography with a Hand-Held Plenoptic Camera," Stanford Univ. Computer Science Tech, Report CSTR 2005-02, Apr. 2005, pp. 1-11.

Ng R.: "Fourier Slice Photography," Proceedings of ACM SIGGRAPH 2005 (Jan. 2005), pp. 1-10.

Lin Z., Shum H.: Fundamental limits of reconstruction-based super-resolution algorithms under local translation. IEEE Transactions on Pattern Analysis and Machine Intelligence 26, 1 (Jan. 2004), pp. 83-97.

Levoy, Mark et al., "Light Field Microscopy," Stanford University, Submitted to Siggraph 2006, pp. 1-5.

Levoy, Mark, "Optical Recipes for Light Microscopes," Stanford Computer Grpahics Laboratory Technical Memo 2006-001, Jun. 20, 2006, pp. 1-10.

Levoy M., Hanrahan P.: "Light Field Rendering," ACM Trans. Graph. (1996), pp. 31-42.

M. Levoy, "Light Fields and computational Imaging," Computer [Online], vol. 39, No. 8, Aug. 2006, pp. 46-55, XP002501300.

Georgeiv, et al. "Spatio-Angular Resolution Tradeoff in Integral Photography," Proc. EGSR, 2006, pp. 1-10.

Georgiev T., Wainer M.: "Morphing Between Multiple Images," Tech. Rep. Apr. 17, 1997, pp. 1-17.

Georgiev T., Lumsdaine A.: Depth of field in plenoptic cameras. In Eurographics 2009—Annex (Apr. 2009), pp. 5-8.

Brown M., Lowe D. G.: "Unsupervised 3d Object Recognition and Reconstruction in Unordered Datasets," In Proceedings of 5th International Conference on 3D Imaging and Modelling (3DIM) (2005), pp. 21-30.

Gortler S. J., Grzeszczuk R., Szeliski, R., Cohen M. F.: "The Lumigraph," ACM Trans. Graph. (1996), pp. 43-54.

Isaksen A., McMillan L., Gortler S. J.: "Dynamically Reparameterized Light Fields," ACM Trans. Graph. (2000), pp. 297-306.

Lee S., Wolberg G., Shin S.: "Polymorph: Morphing Among Multiple Images," IEEE Computer Graphics and Applications (Jan./Feb. 1998), pp. 1-14.

Lippmann G.: "Epreuves reversible donnant la sensation du relief ("Reversible Prints Providing the Sensation of Depth")", Journal of Physics 7 (1908), pp. 821-825.

Lippmann G.: "Epreuves Reversibles Photographies Integrales," Academie des sciences (Mar. 1908), pp. 446-451.

Naemura T., Yoshida T., Harashima H.: "3d Computer Graphics Based on Integral Photography," Optics Express, vol. 8, 2 (Feb. 6, 2001), pp. 1-8.

Seitz S. M., Dyer C. R.: "View Morphing," ACM Trans. Graph. (1996), pp. 21-30.

Stevens R., Harvey T.: "Lens Arrays for a Three-dimensional Imaging System," Journal of Optics A, vol. 4 (2002), pp. 1-5.

Stewart J., Yu J., Gortler S. J., McMillan L.: "A New Reconstruction Filter for Undersampled Light Field," Eurographics Symposium on Rendering (2003), pp. 150-156.

Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004), pp. 1-8.

Wilburn B., Joshi N., Vaish V., Talvala E., Antunez E., Barth A., Adams A., Levoy M., Horowitz M.: "High Performance Imaging Using Large Camera Arrays," In ACM Trans. Graph. (2005), pp. 1-12.

Xiao J., Shah M.: "Tri-view Morphing," Computer Vision and Image Understanding 96, 3 (2004), pp. 345-366.

Zitnick C. L., Jojic N., Kang S.: "Consistent Segmentation for Optical Flow Estimation" In Proceedings of IEEE International Conference on Computer Vision (ICCV) (2005), pp. 1-8.

Veeraraghavan, et al., "Dappled Photography: Mask Enhanced Cameras for Heterodyned Light Fields and Coded Aperture Refocusing," ACM Transaction on Graphics, vol. 26, No. 3, Article 69, Jul. 2007, pp. 1-12, XP002491494.

J. Chai, S. Chan, H. Shum, and X. Tong: "Plenoptic Sampling", ACM Trans. Graph., pp. 307-318, 2000.

F. Durand, N. Holzschuch, C. Soler, E. Chan, and F. Sillion: "A frequency Analysis of Light Transport," ACM Trans. Graph., pp. 1115-1126, 2005.

Todor Georgiev and Chintan Intwala: "Light Field Camera Design For Integral View Photography," Adobe Tech. Rep., 2006, pp. 1-13.

J. Neumann, et al., "Eyes from Eyes Analysis of Camera Design Using Plenoptic Video Geometry," Dec. 2001, pp. 1-20, XP002509893.

Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, pp. 1-12.

Yang, J C, et al., "A Real-Time Distributed Light Field Camera," Rendering Techniques 2002, Eurographics Workshop Proceedings, PIS, Italy, Jun. 26-28, 2002, pp. 1-9.

Zhang, et al., "A Survey on Image-based Rendering-Representation, Sampling and Compression," Signal Processing, Image Communication, Elsevier Science Publishers, vol. 19, No. 1, Jan. 1, 2004, pp. 1-28.

Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003 pp. 1-18.

Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, pp. 1-4.

Ulrich, Fecker, et al., "Transposed Picture Ordering for Dynamic Light Field Coding," Joint Video Team (JVT) of ISO/ IEC MPEG & ITU-T VGEG (ISO/IEC JTC1/SC29/WG11 and ITU-T SG16 Q6), Jul. 9, 2004, pp. 1-8.

Grzeszczuk, R., et al., "Standard Support for 1-13 Progressive Encoding, Compression and Interactive Visualization of Surface

(56) References Cited

OTHER PUBLICATIONS

Light Fields," Joint Video Tem (JVT) of ISO/IEC MPEG & ITU-T VGEG (ISO/IEC JTC1/SC29/WG11 and ITU-T SG16 Q6), Nov. 21, 2001, pp. 1-11.
Chang, et al., "Light Field Compression Using Disparity-Compensated Lifting and Shape Adaptation," IEEE Transactions on Image Processing, vol. 15, No. 4, Apr. 2006, pp. 793-806.
Sebe, et al., "Mutli-View Geometry Estimation for Light Field Compression," VMV 2002, pp. 1-8.
Borman, S., and Stevenson, R., "Super-resolution from image sequences—a review", Proceedings of the 1998 Midwest Symposium on Circuits and Systems, Publication Date: Aug. 9-12, 1998, On pp. 374-378.
Elad, M., and Feuer, A., "Restoration of a single superresolution image from several blurred, noisy, and undersampled measured images," IEEE Transactions on Image Processing Dec. 1997, pp. 1646-1658.
Farsiu, S., Robinson, D., Elad, M., and Milanfar, P., "Advances and challenges in super-resolution," International Journal of Imaging Systems and Technology, 2004, pp. 1-12.
Park, S., Park, M., and Kang, M., "Super-resolution image reconstruction: a technical overview," Signal Processing Magazine, 2003, pp. 1-16.
David E. Roberts, History of Lenticular and Related Autostereoscopic Methods, 2003, pp. 1-17.
Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.
Lumsdaine A., Georgiev T.: Full Resolution Lightfield Rendering. Tech. rep., Adobe Systems, Jan. 2008, pp. 1-12.
Baker S., Kanade T.: Limits on superresolution and how to break them. IEEE Transactions on Pattern Analysis and Machine Intelligence (Jan. 2002), pp. 1-377.
Bishop T. E., Zanetti S., Favaro P.: Light field superresolution. In International Conference on Computational Photography (Apr. 16-17, 2009), pp. 1-4.
Levin A., Fergus R., Durand F., Freeman W.: Image and depth from a conventional camera with a coded aperture. ACM Transactions on Graphics, SIGGRAPH 2007 Conference Proceedings, San Diego, CA (2007), pp. 1-10.
Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, pp. 1-203.
JP504669 (1975), all pages, english equivalent is U.S. Patent 3985419, dated Oct. 12, 1976 by Matsumoto, et al.
Lumsdaine A., Georgiev T.: The focused plenoptic camera. In International Conference on Computational Photography (Apr. 2009), 8 pages.
Ng M. K., Bose N. K.: Mathematical analysis of super-resolution methodology. Signal Processing Magazine, IEEE 20, 3 (2003), pp. 62-74.
Schultz R.: Super-resolution enhancement of native digital video versus digitized NTSC sequences. In Proceedings of the Fifth IEEE Southwest Symposium on Image Analysis and Interpretation (2002), pp. 193-197.
Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.Levoy, et al. "Recording and controlling the 4D light field in a microscope using microlens arrays", Journal of Microscopy, 2009, pp. 1-19.
Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. 436-443, 2004.
U.S. Appl. No. 12/574,183, filed Oct. 6, 2009, Adobe Systems Incorporated.
U.S. Appl. No. 12/957,326, filed Nov. 30, 2010, Adobe Systems Incorporated.
U.S. Appl. No. 12/917,984, filed Nov. 2, 2010, Adobe Systems Incorporated.
U.S. Appl. No. 12/957,308, filed Nov. 30, 2010, Adobe Systems Incorporated.
U.S. Appl. No. 11/874,611, filed Oct. 18, 2007, Adobe Systems Incorporated.
U.S. Appl. No. 12/111,735, filed Apr. 29, 2008, Adobe Systems Incorporated.
U.S. Appl. No. 12/790,677, filed May 28, 2010, Adobe Systems Incorporated.
U.S. Appl. No. 12/474,112, filed May 28, 2009, Adobe Systems Incorporated.
U.S. Appl. No. 12/130,725, filed May 30, 2008, Adobe Systems Incorporated.
U.S. Appl. No. 12/628,437, filed Dec. 1, 2009, Adobe Systems Incorporated.
U.S. Appl. No. 12/690,869, filed Jan. 20, 2010, Adobe Systems Incorporated.
U.S. Appl. No. 12/690,871, filed Jan. 20, 2010, Adobe Systems Incorporated.
U.S. Appl. No. 12/503,803, filed Jul. 15, 2009, Adobe Systems Incorporated.
S Todt, C Rezk-Salama, A Kolb, and K.-D Kuhnert, "Fast (Spherical) Light Field Rendering with Per-Pixel Depth," Technical Report, Computer Graphics Group, University of Siegen, 2007, pp. 1-8.
John Kessenich, Dave Baldwin, Randi Rost. The OpenGL Shading Language, Version: 4.00, Document Revision: 7, Feb. 12, 2010, pp. 1-160.
Mark Segal, Kurt Akeley. The OpenGL Graphics System: A Specification (Version 3.2 (Core Profile)—Dec. 7, 2009), pp. 1-104.
"PyOpenGL, The Python OpenGL® Binding" downloaded from http://pyopengl.sourceforge.net/ on Dec. 21, 2010, pp. 1-2.
T. Adelson and J. Bergen, "The plenoptic function and the elements of early vision," in Computational models of visual processing (MIT Press, 1991), pp. 1-18.
Tanida, J. Yamada, K., "TOMBO: thin observation module by bound optics," Lasers and Electro-Optics Society, 2002. LEOS 2002. The 15th Annual Meeting of the IEEE, Issue Date: 2002, pp. 233-234 vol. 1.
M Christensen, M Haney, D Rajan, S Douglas, and S Wood, "Panoptes: A thin agile multi-resolution imaging sensor," Government Microcuircuit Applications and Critical, Technology Conference (GOMACTech-05)(Jan. 2005), pp. 1-4.
D Capel and A Zisserman, "Computer vision applied to super resolution," Signal Processing Magazine(Jan. 2003), pp. 1-10.
P Sloan, M Cohen, and S Gortler, "Time critical lumigraph rendering," Proceedings of the 1997 symposium on Interactive 3D graphics (Jan. 1997), pp. 1-7.
John Nickolls, Ian Buck, Michael Garland, and Kevin Skadron, "Scalable parallel programming with cuda," Queue 6, 40-53 (2008), pp. 1-40.
John E. Stone, David Gohara, and Guochun Shi, "OpenCL—The open standard for parallel programming of heterogeneous systems." Comput. in Sci. and Eng., 12:66-73, 2010, pp. 1-66.
Georgiev, et al. "Light-Field Capture by Multiplexing in the Frequency Domain," Adobe Technical Report, Apr. 2007, pp. 1-14.
"Optical virtual imaging at 50 nm lateral resolution with a white-light nanoscope," Zengbo Wang, Wei Guo, Lin Li, Boris Luk'yanchuk, Ashfaq Khan, Zhu Liu, Zaichun Chen, Minghui Hong, Nature Communications, Published Mar. 1, 2011, pp. 1-13.
"The optical microscopy with virtual image breaks a record: 50-nm resolution imaging is demonstrated," Zengbo Wang, Wei Guo, Lin Li, Zhu Liu, Boris Luk'yanchuk, Zaichun Chen, Minghui Hong, Jun. 2010, Cornell University Library, http://arxiv.org/abs/1006.4037v1, pp. 1-7.
"Direct imaging of photonic nanojets," Patrick Ferrand, JeromeWenger, Alexis Devilez, Martina Pianta, Brian Stout, Nicolas Bonod, Evgueni Popov, Herve Rigneault, Opt. Express 16, pp. 6930-6940 (2008).

(56) References Cited

OTHER PUBLICATIONS

Qiang Wu, G. D. Feke, Robert D. Grober, L. P. Ghislain, "Realization of numerical aperture 2.0 using a gallium phosphide solid immersion lens," Applied Physics Letters 75 (1999): pp. 4064-4066.
"Imaging with solid immersion lenses, spatial resolution, and applications", Q. Wu, L. P. Ghislain, and V. B. Elings, Proc. IEEE 88, 1491 (2000), pp. 1-8.
U.S. Appl. No. 13/288,765, filed Nov. 3, 2011, Georgiev.
U.S. Appl. No. 13/429,226, filed Mar. 23, 2012, Babacan, et al.
U.S. Appl. No. 13/288,759, filed Nov. 3, 2011, Georgiev.
U.S. Appl. No. 12/957,312, filed Nov. 30, 2010, Georgiev.
U.S. Appl. No. 12/957,320, filed Nov. 30, 2010, Georgiev.
U.S. Appl. No. 12/957,322, filed Nov. 30, 2010, Georgiev.
"Final Office Action", U.S. Appl. No. 12/957,320, (Jun. 27, 2013),16 pages.
"Non-Final Office Action", U.S. Appl. No. 12/957,308, (Jul. 25, 2013),18 pages.
"Notice of Allowance", U.S. Appl. No. 13/434,189, (Jul. 10, 2013), 8 pages.
"Supplemental Notice of Allowance", U.S. Appl. No. 12/186,392, (Jul. 19, 2013), 5 pages.
"Final Office Action", U.S. Appl. No. 12/957,312, (Jun. 6, 2013),16 pages.
"Non-Final Office Action", U.S. Appl. No. 12/690,869, (Mar. 26, 2012),8 pages.
"Non-Final Office Action", U.S. Appl. No. 12/957,322, (Apr. 24, 2013),15 pages.
"Non-Final Office Action", U.S. Appl. No. 13/434,189, (Mar. 7, 2013), 8 pages.
"Notice of Allowance", U.S. Appl. No. 12/186,392, (Mar. 13, 2013), 8 pages.
"Notice of Allowance", U.S. Appl. No. 12/690,869, (Jul. 13, 2012), 7 pages.
"Notice of Allowance", U.S. Appl. No. 13/549,330, (Feb. 7, 2013), 9 pages.
Aliaga, et al., "Plenoptic Stitching: A Scalable Method for Reconstructing 30 Interactive Walkthroughs", *Proceedings of the 28th annual conference on Computer graphics and interactive techniques*, (Aug. 2001), pp. 443-450.
Hunt, B. R., "Super-Resolution of Images: Algorithms, Principles, Performance", *International Journal of Imaging Systems and Technology*, vol. 6, (Jan. 1995), 9 pages.
Meng, et al., "An Approach on Hardware Design for Computational Photography Applications based on Light Field Refocusing Algorithm", *Technical Reports CS-2007-15, University of Virginia*, (Nov. 18, 2007), pp. 1-12.
"European Search Report", EP Application No. 09159086.9, (Aug. 14, 2009),8 pages.
"Final Office Action", U.S. Appl. No. 13/425,306, (Sep. 19, 2012),7 pages.
"Final Office Action", U.S. Appl. No. 12/130,725, (Jan. 3, 2012),6 pages.
"Non-Final Office Action", U.S. Appl. No. 12/111,735, (Jul. 28, 2011),12 pages.
"Non-Final Office Action", U.S. Appl. No. 12/130,725, (Sep. 9, 2011),7 pages.
"Non-Final Office Action", U.S. Appl. No. 12/186,392, (Apr. 3, 2012),13 pages.
"Non-Final Office Action", U.S. Appl. No. 12/186,392, (Nov. 19, 2012),13 pages.
"Non-Final Office Action", U.S. Appl. No. 12/271,389, (Sep. 30, 2010),7 pages.
"Non-Final Office Action", U.S. Appl. No. 12/474,112, (Oct. 19, 2011),5 pages.
"Non-Final Office Action", U.S. Appl. No. 12/628,437, (Jul. 30, 2012),10 pages.
"Non-Final Office Action", U.S. Appl. No. 12/957,312, (Nov. 13, 2012),14 pages.
"Non-Final Office Action", U.S. Appl. No. 12/957,320, (Dec. 5, 2012),11 pages.
"Non-Final Office Action", U.S. Appl. No. 13/103,880, (Aug. 9, 2011),5 pages.
"Non-Final Office Action", U.S. Appl. No. 13/425,306, (May 31, 2012),7 pages.
"Non-Final Office Action", U.S. Appl. No. 13/476,638, (Jul. 6, 2012),6 pages.
"Notice of Allowance", U.S. Appl. No. 12/917,984, (Aug. 21, 2012),11 pages.
"Notice of Allowance", U.S. Appl. No. 12/111,735, (Dec. 14, 2011),10 pages.
"Notice of Allowance", U.S. Appl. No. 12/130,725, (Apr. 3, 2012),8 pages.
"Notice of Allowance", U.S. Appl. No. 12/271,389, (Feb. 2, 2011),4 pages.
"Notice of Allowance", U.S. Appl. No. 12/271,389, (Jun. 18, 2010),6 pages.
"Notice of Allowance", U.S. Appl. No. 12/474,112, (Jan. 30, 2012),5 pages.
"Notice of Allowance", U.S. Appl. No. 12/503,803, (Mar. 20, 2012),6 pages.
"Notice of Allowance", U.S. Appl. No. 12/628,437, (Dec. 18, 2012),6 pages.
"Notice of Allowance", U.S. Appl. No. 13/103,880, (Dec. 13, 2011),5 pages.
"Notice of Allowance", U.S. Appl. No. 13/425,306, (Dec. 10, 2012),4 pages.
"Notice of Allowance", U.S. Appl. No. 13/429,226, (Dec. 26, 2012),7 pages.
"Notice of Allowance", U.S. Appl. No. 13/476,638, (Oct. 29, 2012),4 pages.
"PyOpenGL 3.x The Python OpenGL Binding", Retrieved from <http://pyopengl.sourceforge.net> on Dec. 21, 2010, (2010),2 pages.
"Restriction Requirement", U.S. Appl. No. 12/111,735, (Apr. 29, 2011),6 pages.
"Restriction Requirement", U.S. Appl. No. 12/130,725, (Jul. 15, 2011),5 pages.
"Restriction Requirement", U.S. Appl. No. 12/474,112, (Jul. 28, 2011),6 pages.
"Supplemental Notice of Allowance", U.S. Appl. No. 12/271,389, (Feb. 10, 2011),2 pages.
"Supplemental Notice of Allowance", U.S. Appl. No. 12/474,112, (Mar. 8, 2012),2 pages.
"Supplemental Notice of Allowance", U.S. Appl. No. 12/503,803, (Apr. 23, 2012),13 pages.
"Supplemental Notice of Allowance", U.S. Appl. No. 13/103,880, (Jan. 20, 2012),2 pages.
"U.S. Application as Filed", U.S. Appl. No. 11/627,141, (Jan. 25, 2007),43 pages.
"U.S. Application as Filed", U.S. Appl. No. 11/874,611, (Oct. 18, 2007),43 pages.
"U.S. Application as Filed", U.S. Appl. No. 12/111,735, (Apr. 29, 2008),44 pages.
"U.S. Application as Filed", U.S. Appl. No. 12/186,396, (Aug. 5, 2008),69 pages.
"U.S. Application as Filed", U.S. Appl. No. 12/271,389, (Nov. 14, 2008),63 pages.
"U.S. Application as Filed", U.S. Appl. No. 12/474,112, (May 28, 2009),75 pages.
"U.S. Application as Filed", U.S. Appl. No. 12/636,168, (Dec. 11, 2009),60 pages.
"U.S. Application as Filed", U.S. Appl. No. 12/690,569, (Jan. 20, 2010),36 pages.
"U.S. Application as Filed", U.S. Appl. No. 12/690,871, (Jan. 20, 2010),105 pages.
"U.S. Application as Filed", U.S. Appl. No. 12/917,984, (Nov. 2, 2010),127 pages.
"U.S. Application as Filed", U.S. Appl. No. 12/957,308, (Nov. 30, 2010),73 pages.
"U.S. Application as Filed", U.S. Appl. No. 12/957,316, (Oct. 30, 2010),66 pages.
"U.S. Application as Filed", U.S. Appl. No. 12/957,326, (Nov. 30, 2010),73 pages.

(56) References Cited

OTHER PUBLICATIONS

"US Application as Filed", U.S. Appl. No. 13/429,226, (Mar. 23, 2012),44 pages.
Adelson, et al., "Single lens stereo with a plenoptic camera", *IEEE Transactions on Pattern Analysis D and Machine Intelligence*, val. 14, issue 2, 99-106, 1992, pp. 99-106.
Adelson, et al., "The Plenoptic Function and the Elements of Early Vision", *Computational models of visual processing (MIT Press)*, (1991),18 pages.
Aggarwal, Manoj et al., "Split Aperture Imaging for High Dynamic Range", *International Journal of Computer Vision*, (Jan. 2004),8 pages.
Baker, et al., "Limits on Superresolution and How to Break Them", *IEEE Transactions on Pattern Analysis and Machine Intelligence*, (Jan. 2002),37 pages.
Bishop, et al., "Light Field Superresolution", *In International Conference on Computational Photography* (Apr. 6-17, 2009), 4 pages.
Borman, et al., "Super-resolution from image sequences—a review", *Proceedings of the 1998 D Midwest Symposium on Circuits and Systems*, Publication Date: Aug. 9-12, 1998, On pp. 374-378, 5 pages.
Brown, et al., "Unsupervised 3D Object Recognition and Reconstruction in Unordered Datasets", *In Proceedings of 5th International Conference on 3D Imaging and Modelling (3D1M)*, (2005),8 pages.
Capel, et al., "Computer Vision Applied to Super-resolution", *IEEE Signal Processing Magazine*, vol. 20, (Jan. 2003),10 pages.
Chai, et al., "Plenoptic Sampling", *ACM Transactions Graphics*, (2000),12 pages.
Chang, et al., "Light Field Compression Using Disparity-Compensated Lifting and Shape Adaptation", *IEEE Transactions on Image Processing*, vol. 15, No. 4,, (Apr. 2006),pp. 793-806.
Christensen, et al., "PANOPTES: A thin agile multi-resolution imaging sensor", *Microcuircuit Applications and Critical, Technology Conference (GOMACTech-05)*, (Jan. 2005),4 Pages.
Debevec, Paul E., et al., "Recovering High Dynamic Range Radiance Maps from hotographs", *ACM Transaction on Graphics, SIGGRAPH 1997 Conference Proceedings*, San Diego, CA, (1997),10 pages.
Dudley, Dana et al., "Emerging Digital Micromirror Device (DMD) Applications", *DLPTM Products New Applications, Texas Instruments, Inc.*, Copyright 2003 *Society of Photo-Optical Instrumentation Engineers., This paper was published in SPIE Proceedings* vol. 4985, (2003),12 pages.
Durand, et al., "A Frequency Analysis of Light Transport", *ACM Transactions Graphics*, (2005),12 pages.
Durand, Fredo "Fast Bilateral filtering for the Display of High-Dynamic-Range Images", *ACM Transactions on Graphics (TOG), Proceedings of the 29th Annual Conference on Computer Graphics and Interactive Techniques SIGGRAPH-02*, vol. 21, Issue 3, (2002),10 pages.
Elad, et al., "Restoration of a single superresolution image from several blurred, noisy, and undersampled measured images", *IEEE Transactions on Image Processing* Dec. 1997, pp. 1646-1658.
Farsiu, et al., "Advances and challenges in super-resolution", *International Journal of Imaging Systems and Technology*, 2004., pp. 47-57.
Fecker, Ulrich et al., "Transposed Picture Ordering for Dynamic Light Field Coding", *Joint Video Team (JVT) of ISO/ IEC MPEG & ITU-T VGEG (ISO/IEC JTC1/SC29/WG11 and ITU-T SG16 06)*, (Jul. 9, 2004),8 pages.
Fife, Keith et al., "A 3Mpixel Multi-Aperture Image Sensor With 0.7um Pixels In 0.11um CMOS", *IEEE ISSCC Digest of Technical Papers* (Feb. 2008), pp. 48-49, available at <http://isl.stanford.edu/groups/elgamal/people/kfife/>,3 pages.
Georgiev, "U.S. Application as Filed", U.S. Appl. No. 12/144,411, (Jun. 23, 2008),63 pages.
Georgiev, "U.S. Application as Filed", U.S. Appl. No. 12/574,183, (Oct. 6, 2009),30 pages.
Georgiev, "U.S. Application as Filed", U.S. Appl. No. 12/790,677, (May 28, 2010),48 pages.
Georgiev, et al., "Depth of Field in Plenoptic Cameras", *In Eurographics 2009—Annex*, (Apr. 2009),4 pages.
Georgiev, et al., "Light Field Camera Design for Integral View Photography", *Adobe Systems Technical Report*, (2006),13 pages.
Georgiev, et al., "Light-Field Capture by Multiplexing in the Frequency Domain", *Adobe Technical Report*, (Apr. 2007),14 pages.
Georgiev, et al., "Morphing Between Multiple Images", *Southern Illinois University at Carbondale, Dept. of Computer Science, Technical Report*, (Apr. 17, 1997),17 pages.
Georgiev, et al., "Spatio-angular resolution tradeoff in integral photography", *Proc. Eurographics Symposium on Rendering*, 2006, 10 pages.
Georgiev, et al., "U.S. Application as Filed", U.S. Appl. No. 12/690,869, (Jan. 20, 2010),103 pages.
Georgiev, et al., "U.S. Application as Filed", U.S. Appl. No. 12/503,803, (Jul. 15, 2009),114 pages.
Georgiev, et al., "U.S. Application as Filed", U.S. Appl. No. 12/628,437, (Dec. 1, 2009),114 pages.
Gortler, et al., "The Lumigraph", *ACM Trans. Graph.*, 43-54, 1996, pp. 43-54.
Grzeszczuk, et al., "Standard Support for Progressive Encoding, Compression and Interactive Visualization of Surface Light Fields", *Joint Video Tern (JVT) of ISO/IEC MPEG & ITU-T VGEG (ISO/IEC JTC1/SC29/WG11 and ITU-T SG16 06)*, (Nov. 21, 2001),11 pages.
Guttosch, Rudolph J., "Investigation of Color Aliasing of High Spatial Frequencies and Edges for Bayer-Pattern Sensors and Foveon X3 Direct Image Sensors", *Tech. Rep., Foveon*, 2002, 8 pages.
Horstmeyer, R et al., "Flexible multimodal camera using a light field architecture.", *In Proceedings ICCP 2009*, 2009., pp. 1-8.
Horstmeyer, Roarke et al., "Modified light field architecture for reconfigurable multimode imaging", *In Adaptive Coded Aperture Imaging, Non-Imaging, and Unconventional Imaging Sensor Systems. SPIE*, 2009., 9 pages.
Horstmeyer, Roarke et al., "Pupil plane multiplexing for multi-domain imaging sensors.", *In Society of Photo-Optical Instrumentation Engineers (SPIE) Conference Series*, vol. D 7096, Aug. 2008., 10 pages.
Hubel, Paul M., "Foveon Technology and the Changing Landscape of Digital Cameras", *Thirteenth Color Imaging Conference: Color Science and Engineering Systems, Technologies, and Applications*, Scottsdale, Arizona, (Nov. 2005),pp. 314-317.
Hubel, Paul M., et al., "Spatial Frequency Response of Color Image Sensors: Bayer Color Filters and Foveon X3", *Proceedings of the SPIE*, vol. 5301, (2004),pp. 1-4.
Intwala, et al., "U.S. Application as Filed", U.S. Appl. No. 12/130,725, (May 30, 2008),52 pages.
Isaksen, Aaron "Dynamically Reparameterized Light Fields", *Submitted to the Department of Electrical Engineering and Computer Science in partial fulfillment of the requirements for the degree of Master of Science in Electrical Engineering and Computer Science at the Massachusetts Institute of Technology*, (Nov. 2000),79 pages.
Isaksen, et al., "Dynamically reparameterized light fields", *ACM Trans. Graph.*, 297-306, 2000, pp. 297-306.
Kessenich, et al., "The OpenGL Shading Language", *Version: 4.00, Document Revision: 7*, (Feb. 12, 2010),160 pages.
Lee, et al., "Polymorph: Morphing Among Multiple Images", *IEEE Computer Graphics and Applications*, (1998),pp. 60-73.
Levin, et al., "Image and Depth from a Conventional Camera with a Coded Aperture", *ACM Transactions on Graphics, SIGGRAPH 2007 Conference Proceedings*, San Diego, CA, Retrieved from <http://groups.csail.mit.edu/graphics/CodedAperture/CodedAperture-LevinEtAl-SIGGRAPH07.pdf> on Dec. 21, 2012,(2007),9 pages.
Levoy, et al., "Light Field Rendering", *ACM Trans. Graph.*, 31-42, 1996, pp. 31-42.
Levoy, et al., "Recording and Controlling the 4D Light Field in a Microscope Using Microlens Arrays", *Journal of Microscopy*, vol. 235, Pt 2, (Apr. 7, 2009),19 pages.
Levoy, Marc "Light Fields and Computational Imaging", *Computer [Online]*, vol. 39, No. 8, XP002501300, (Aug. 2006),pp. 46-55.
Levoy, Mark et al., "Light Field Microscopy", *ACM Transactions on Graphics 25(3), Proceedings of SIGGRAPH*, (2006),11 pages.
Levoy, Mary "Optical Recipes for Light Microscopes", *Stanford Computer Grpahics Laboratory Technical Memo 2006-001*, (Jun. 20, 2006),5 pages.

(56) References Cited

OTHER PUBLICATIONS

Lin, Zhouchen "Fundamental Limits of Reconstruction-Based Superresolution Algorithms under Local Translation", *IEEE Transactions on Pattern Analysis and Machine Intelligence* 26, 1 (Jan. 2004), 83-97, available at <http://research.microsoft.com/apps/pubs/default.aspx?id=69073>,(Jan. 2004),pp. 83-97.
Lippmann, "Epreuves Reversible Donnant la Sensation Du Relief ("Reversible Prints Providing the Sensation of Depth")", *Journal of Physics 7*, (1908),pp. 821-825.
Lippmann, "Reversible Prints", *Academie des sciences*, (Mar. 1908),3 pages.
Lippmann, M.G. "Epreuves Reversibles Photographies Integrales ("Reversible Prints. Integral Photographs.")", *Academie des sciences*, Translation,(Mar. 1908),4 Pages.
Lumsdaine, Andrew et al., "Full Resolution Lightfield Rendering", *Adobe Systems Technical Report*, (Jan. 2008),12 pages.
Lumsdaine, et al., "The Focused Plenoptic Camera", *In International Conference on Computational Photography*, (Apr. 2009),8 pages.
Lyon, Richard F., et al., "Eyeing the Camera: into the Next Century", *In Proceedings IS&T/SID 10th Color Imaging Conference*, (2002),7 pages.
Naemura, et al., "3D Computer Graphics Based on Integral Photography", *Optics Express*, vol. 8, 2, (2001),8 pages.
Narasimhan, Srinivasa G., et al., "Enhancing resolution along multiple imaging dimensions using assorted pixels.", *IEEE Trans. Pattern Anal. Mach. Intel I.*, 27(4 ), (Apr. 2005),pp. 518-530.
Nayar, et al., "High Dynamic Range Imaging: Spatially Varying Pixel Exposures", *IEEE Conference on Computer Vision and Pattern Recognition*, Jun. 2000, vol. 1, pp. 4 72-4 79., 8 pages.
Nayar, Shree N., et al., "Programmable Imaging using a Digital Micromirror Array", *In Conf. on Computer Vision and Pattern Recognition*, pp. 1: 436-443, 2004, 8 pages.
Neumann, et al., "Eyes from Eyes Analysis of Camera Design Using Plenoptic Video Geometry", XP002509893, (Dec. 2001),20 pages.
Ng, "Digital Light Field Photography", *A Dissertation Submitted to the Dept. of Computer Science and the Commitiee on Graduate Studies of Stanford Univ in Partial fulfillment of the requirements for the degree of Doctor of Philosophy*, 203, (Jul. 2006),203 pages.
Ng, "Fourier slice photography", *International Conference on Computer Graphics and Interactive Techniques Proceedings of ACM SIGGRAPH 2005.*, (2005),10 pages.
Ng, et al., "Light field photography with a hand-held plenoptic camera", *Stanford University Computer Science Tech Report CSTR 2005-02*, Apr. 2005, 11 pages.
Ng, et al., "Mathematical Analysis of Super-Resolution Methodology", *Signal Processing Magazine, IEEE* 20, 3 (2003), pp. 62-74.
Nickolls, et al., "Scalable Parallel Programming with CUDA", *Queue 6*, 40-53, (Mar. 2008),14 pages.
Park, Cheol S., et al., "Super-Resolution Image Reconstruction: A Technical Overview", *IEEE Signal Processing Magazine*, vol. 20, Issue 3, (May 2003),16 pages.
Park, Jong H., et al., "An Ultra Wide Dynamic Range CMOS Image Sensor with a Linear Response", *Proceedings SPIE-IS&T Electronic Imaging, SPIE* vol. 6068, 2006., 8 pages.
Roberts, David E., "History of Lenticular and Related Autostereoscopic Methods", available at <ftp://ftp.umiacs.umd.edu/pub/aagrawal/HistoryOfIntegralImaging/HistoryOfLenticular.pdf>, (2003),17 pages.
Schechner, Yoav Y., et al., "Generalized mosaicing", *In ICCV*, pp. 17-25, 2001., 8 pages.
Schechner, Yoav Y., et al., "Generalized Mosaicing: High Dynamic Range in a Wide Field of View", *International Journal of Computer Vision*, 53(3):245-267, (2003),23 pages.
Schechner, Yoav Y., et al., "Generalized mosaicing: Polarization panorama", *IEEE Trans. Pattern Anal. Mach. Intell.*, 27(4):631-636, 2005., pp. 631-636.
Schechner, Yoaz et al., "Generalized mosaicing: Wide field of view multispectral imaging", *IEEE Trans. Pattern Anal. Mach. Intell.*, 24(1 0):1334-1348, (Oct. 2002),pp. 1334-1348.
Schultz, Richard R., "Super-Resolution Enhancement of Native Digital Video Versus Digitized NTSC Sequences", *In Proceedings of the Fifth IEEE Southwest Symposium on Image Analysis and Interpretation*, (2002),5 pages.
Sebe, et al., "Multi-View Geometry Estimation for Light Field Compression", *VMV 2002*, (2002),8 pages.
Segal, et al., "The OpenGL Graphics System: A Specification", *Version 3.2 (Core Profile)*, (Dec. 7, 2009),404 pages.
Seitz, et al., "View Morphing", *ACM Transactions Graphics*, (1996),10 pages.
Shing-Chow, et al., "The Compression of Simplified Dynamic Light Fields", *Proceedings of International Conference on Acoustics, Speech and Signal Processing*, Apr. 6-10, 2003, Hong Kong, val. 3, 4 pages.
Shum, Heung-Yeung et al., "Survey of Image-Based Representations and Compression Techniques", *IEEE Transactions on Circuits and Systems for Video Technology, IEEE Service Center*, vol. 13, No. 11, (Nov. 1, 2003),18 pages.
Sloan, et al., "Time Critical Lumigraph Rendering", *Proceedings of the 1997 symposium on Interactive 3D graphics*, (Jan. 1997),7 pages.
Stevens, et al., "Lens Arrays for a Three-dimensional Imaging System", *Journal of Optics A: Pure and Applied Optics, Opt. 4*, (2002),5 pages.
Stewart, et al., "A New Reconstruction Filter for Undersampled Light Field", *Eurographics Symposium on Rendering*, (2003),8 pages.
Stone, et al., "OpenCL: The open standard for parallel programming of heterogeneous systems", *Computing In Science & Engineering*, (May 2010),8 pages.
Tanida, et al., "TOMBO: Thin Obeservation Module by Bound Optics", *Lasers and Electro-Optics Society, 2002. LEOS 2002. The 15th Annual Meeting of the IEEE*, vol. 1, (2002),pp. 233-234.
Todt, et al., "Fast (Spherical) Light Field Rendering with Per-Pixel Depth", *Technical Report, Computer Graphics Group, University of Siegen*, (2007),8 pages.
Tumblin, Jack et al., "LCIS: A Boundary Hierarchy For Detail-Preserving Contrast Reduction", *ACM Transactions on Graphics, SIGGRAPH 1999 Conference Proceedings*, Los Angeles, CA, pp. 83-90, 1999., pp. 83-90.
Vaish, Vaibhav et al., "Using Plane+ Parallax to Calibrate Dense Camera Arrays", *In Proceedings of IEEE Conference on Computer Vision and Pattern Recognition (CVPR)*, (2004),8 pages.
Veeraraghavan, et al., "Dappled photography: Mask enhanced cameras for heterodyned light fields and coded aperture refocusing", *ACM Trans. Graph. 26*, 3, 69, 2007, 14 pages.
Wilburn, Bennett et al., "High Performance Imaging Using Large Camera Arrays", *In ACM Transactions Graphics*, (2005),12 pages.
Xiao, Jiangjian et al., "Tri-view Morphing", *Computer Vision and Image Understanding* 96, 3, (2004),pp. 345-366.
Yang, et al., "A Real-Time Distributed Light Field Camera", *Rendering Techniques 2002, Eurographics Workshop Proceedings*, PIS, Italy, Jun. 26-28, 2002, 9 pages.
Zaharia, et al., "Adaptive 3D-DCT Compression Algorithm for Continuous Parallax 3D Integral Imaging", *Signal Processing, Image Communication, Elsevier Scient Publishers*, Amsterdam, NL, vol. 17, No. 3, (Mar. 1, 2002),12 pages.
Zhang, et al., "A Survey on Image-based Rendering-Representation, Sampling and Compression", *Signal Processing, Image Communication, Elsevier Science Publishers*, vol. 19, No. 1, (Jan. 1, 2004),28 pages.
Zitnick, et al., "Consistent Segmentation for Optical Flow Estimation", *In Proceedings of IEEE International Conference on Computer Vision (ICCV)*, (2005),8 pages.
"Final Office Action", U.S. Appl. No. 12/957,312, Dec. 13, 2013, 15 pages.
"Non-Final Office Action", U.S. Appl. No. 12/957,322, Jan. 13, 2014, 20 pages.
"Non-Final Office Action", U.S. Appl. No. 12/957,326, Feb. 24, 2014, 8 pages.
"Notice of Allowance", U.S. Appl. No. 12/957,312, Feb. 26, 2014, 12 pages.
"Supplemental Notice of Allowance", U.S. Appl. No. 12/957,320, Jan. 24, 2014, 2 pages.

(56) References Cited

OTHER PUBLICATIONS

"Supplemental Notice of Allowance", U.S. Appl. No. 12/957,320, Jan. 30, 2014, 2 pages.

Chang, et al., "Super-Resolution through Neighbor Embedding", Computer Vision and Pattern Recognition, 2004. CVPR 2004. Proceedings of the 2004 IEEE Computer Society Conference, Jul. 2004, 8 pages.

"Final Office Action", U.S. Appl. No. 12/957,308, (Nov. 19, 2013), 21 pages.

"Non-Final Ofice Action", U.S. Appl. No. 13/288,759, (Sep. 11, 2013), 11 pages.

"Notice of Allowance", U.S. Appl. No. 12/957,320, (Oct. 16, 2013), 10 pages.

"Restriction Requirement", U.S. Appl. No. 12/957,326, (Nov. 25, 2013), 6 pages.

* cited by examiner

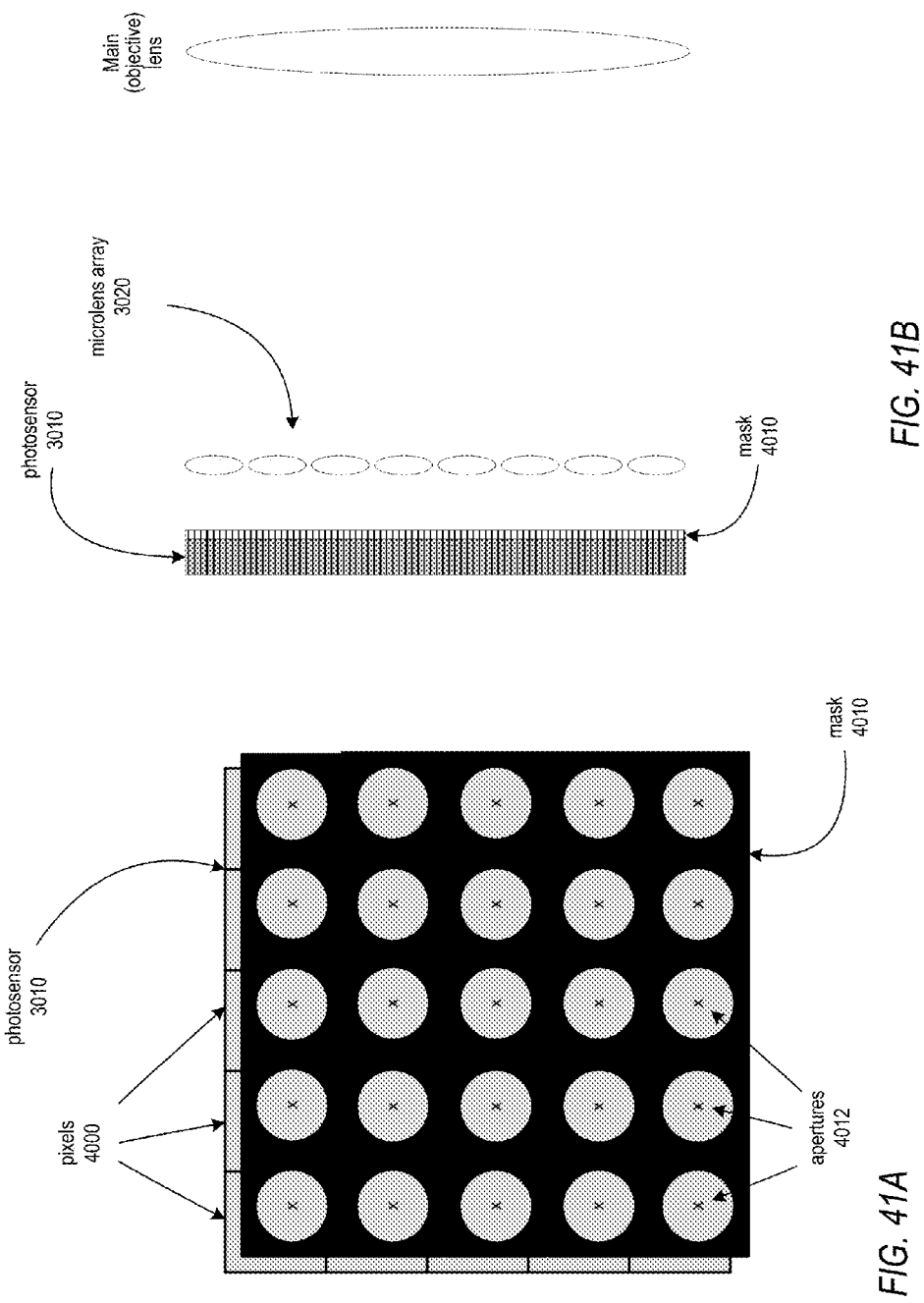

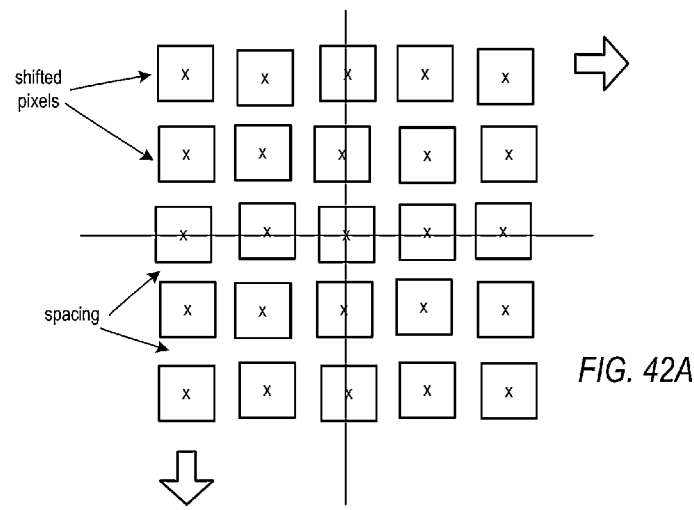
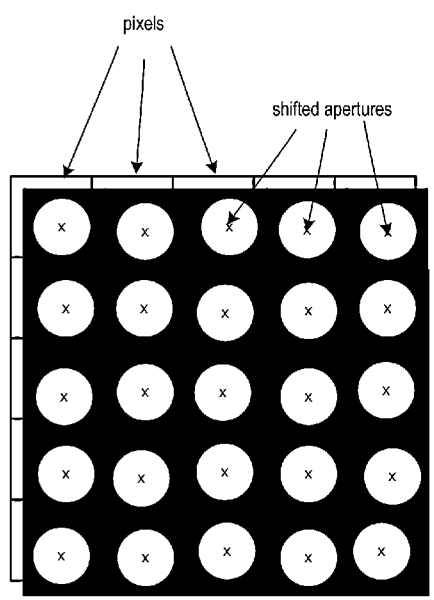
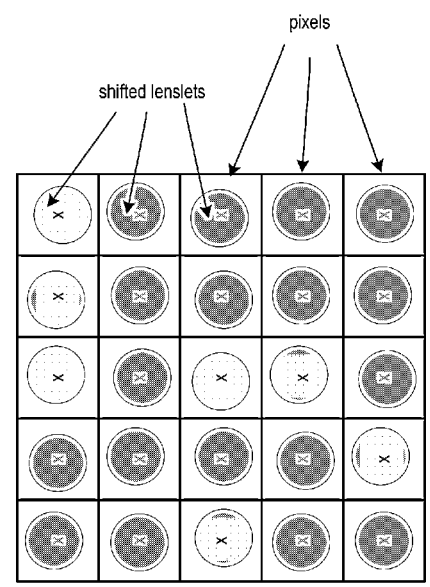
FIG. 42B          FIG. 42C

METHODS AND APPARATUS FOR SUPER-RESOLUTION IN INTEGRAL PHOTOGRAPHY

PRIORITY INFORMATION

This application claims benefit of priority of U.S. Provisional Application Ser. No. 61/377,826 entitled "Methods and Apparatus for Super-Resolution in Integral Photography" filed Aug. 27, 2010, the content of which is incorporated by reference herein in its entirety.

BACKGROUND

Description of the Related Art

In contrast to conventional cameras, light-field, or radiance capturing, cameras sample the four-dimensional (4-D) optical phase space or light-field, and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

The light-field is the radiance density function describing the flow of energy along all rays in three-dimensional (3D) space. Since the description of a ray's position and orientation requires four parameters (e.g., two-dimensional positional information and two-dimensional angular information), the radiance is a four-dimensional (4D) function. This function may be referred to as the plenoptic function. Image photosensor technology, on the other hand, is only two-dimensional, and light-field imagery must therefore be captured and represented in flat (two dimensional) form. A variety of techniques have been developed to transform and capture the 4D radiance in a manner compatible with 2D photosensor technology. This may be referred to as a flat representation of the 4D radiance (or light-field), or simply as a flat.

SUMMARY

Methods and apparatus for super-resolution in integral photography are described. Light fields carry a significant amount of information. This information can be used to generate novel effects when rendering. In the focused plenoptic camera, deliberate spatio-angular trade-offs may be made to obtain significant improvements in spatial resolution when compared to conventional plenoptic cameras. The focused plenoptic camera works as an array of microcameras. These microcameras are focused on the photographed object, a unique feature that distinguishes the focused plenoptic camera from conventional plenoptic cameras. Based on this feature, super-resolution techniques may be applied to the focused plenoptic camera and to the rendering of light-fields captured by the focused plenoptic camera.

Embodiments may provide and implement one or more techniques that may improve the super-resolution rendering process and/or the quality of super-resolved images that may be generated from flats captured with a focused plenoptic camera using a super-resolution rendering algorithm. At least some of these techniques may involve modifications to the focused plenoptic camera design. In addition, at least some of these techniques may involve modifications to the super-resolution rendering algorithm.

One technique that may be implemented in at least some embodiments involves modifications to the focused plenoptic camera (specifically, to the photosensor) that result in smaller pixels being captured at the photosensor from the main image plane of the camera. These modifications may include using pixels in the photosensor that are spaced apart rather than adjacent, using a fill factor-reducing lenslet at each pixel of the photosensor, and using a fill factor-reducing aperture at each pixel of the photosensor. Capturing smaller pixels may effectively reduce blur in high-resolution images of a scene generated by super-resolution techniques so that the need to deconvolve the high-resolution image is reduced or eliminated.

Another technique that may be implemented in at least some embodiments involves randomizing or otherwise altering the positioning of the pixels so that super-resolution is achievable at more depths of focus, or at all depths of focus. This may be referred to as shifted pixels. To randomize or otherwise alter the positioning of the pixels, the photosensor may be manufactured so that there is not a fixed pitch between pixel sensors, thus randomizing the spacing (pitch) between pixels. As another example, randomly spaced lenslets at the photosensor may be used; a microlens may be positioned at each pixel of the photosensor, with the centers of the lenslets not at a fixed pitch to thus randomize the centering of the light projected onto the pixels by the lenslets. As another example, randomly spaced apertures may be used; an aperture may be provided at each pixel of the photosensor, with the centers of the apertures not at a fixed pitch to thus randomize the centering of the light projected onto the pixels. Note that these shifted pixel techniques may be combined with the fill factor-reducing techniques.

Another technique that may be implemented in at least some embodiments is to apply a kernel, for example a sharpening kernel, when sampling pixels from different microimages during the super-resolution rendering process. The use of the kernel may apply a level of deconvolution when sampling the pixels, and may thus result in a sharper super-resolved image and reduce or eliminate the need to apply deconvolution to the output super-resolved image.

Note that, in various embodiments, each of these techniques or modifications may be individually implemented, or a combination of two or more of the techniques may be implemented in combination.

BRIEF DESCRIPTION OF THE DRAWINGS

FIGS. 41A and 41B illustrate a fill factor-reducing mask in a focused plenoptic camera, according to some embodiments.

FIG. 42A illustrates randomly shifted pixels in a photosensor, according to some embodiments.

FIG. 42B illustrates a mask in a focused plenoptic camera that provides shifted apertures, according to some embodiments.

FIG. 42C illustrates shifted lenslets at the pixels in a focused plenoptic camera, according to some embodiments.

Figure 1:
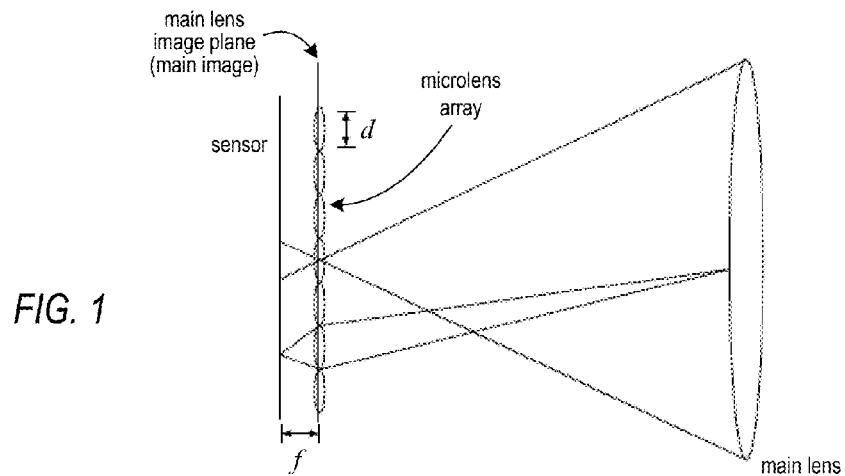
FIG. 1 illustrates a conventional plenoptic camera.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, apparatus, and computer-readable storage media for super-resolution in integral cameras are described. Light fields carry a significant amount of information. This information can be used to generate novel effects when rendering. In the focused plenoptic camera, deliberate spatio-angular trade-offs may be made to obtain significant improvements in spatial resolution when compared to conventional plenoptic cameras. The focused plenoptic camera works as an array of microcameras. These microcameras are focused on the photographed object, a unique feature that distinguishes the focused plenoptic camera from conventional plenoptic cameras. Based on this feature, super-resolution techniques may be applied to the focused plenoptic camera and to the rendering of light-fields captured by the focused plenoptic camera, for example as described in U.S. patent application Ser. No. 12/690,869, entitled "Super-Resolution with the Focused Plenoptic Camera" filed Jan. 20, 2010.

In previous super-resolution algorithms such as that described in U.S. patent application Ser. No. 12/690,869, the pixels overlap and are blended, resulting in a blurry image. To deblur the image, a deconvolution technique is applied to the image. However, deconvolution may generate noise in the image, and thus may require filtering of some type, and in any case tends to be computationally expensive and slow. To reduce or eliminate this need to deconvolve super-resolved images to overcome blurriness introduced by the blending of overlapping pixels, embodiments of a focused plenoptic camera are described that reduce the size of the pixels captured at the photosensor from the main image plane to thus reduce or eliminate the overlap of the pixels.

Another technique that may be implemented in at least some embodiments involves randomizing or otherwise altering the positioning of the pixels so that super-resolution is achievable at more depths of focus, or at all depths of focus.

Yet another technique that may be implemented in at least some embodiments is to apply a kernel, for example a sharpening kernel, when sampling pixels from different microimages in a super-resolution rendering algorithm.

Thus, the focused plenoptic camera and/or super-resolution techniques may be modified to improve the results of super-resolution rendering of focused plenoptic camera data when compared to previous super-resolution techniques.

This document first introduces super-resolution in a focused plenoptic camera, then describes previous super-resolution techniques and processes for the focused plenoptic camera as described in U.S. patent application Ser. No. 12/690,869, and finally describes embodiments including techniques that may improve the super-resolution rendering process and/or the quality of super-resolved images that may be generated from flats captured with a focused plenoptic camera using a super-resolution algorithm. At least some of these techniques may involve modifications to the focused plenoptic camera design. In addition, at least some of these techniques may involve modifications to the super-resolution rendering algorithm.

Super-Resolution in a Focused Plenoptic Camera

Light fields carry a significant amount of information. This information can be used to generate novel effects when rendering. In the focused plenoptic camera (see, e.g., FIGS. 2A and 2B), deliberate spatio-angular trade-offs may be made to obtain significant improvements in spatial resolution when compared to conventional plenoptic cameras (see, e.g., FIG. 1). The focused plenoptic camera works as an array of cameras (technically, an array of microcameras). These microcameras are focused on the photographed object, a unique feature that distinguishes the focused plenoptic camera from conventional plenoptic cameras. Based on this feature, super-resolution techniques may be applied to the focused plenoptic camera and to the rendering of light-fields captured by the focused plenoptic camera.

With the application of super-resolution techniques to the focused plenoptic camera, the attainable spatial resolution of the focused plenoptic camera may be further increased. A factor that has limited the adoption of conventional plenoptic cameras has been the relatively low available resolution. The combination of the focused plenoptic camera with super-resolution techniques as described herein enables images of sizes acceptable to modern photographers, making light-field photography immediately practical.

Embodiments of the focused plenoptic camera capture an array of real images focused on the object. This makes it possible to apply super-resolution techniques to the light-field data captured by a focused plenoptic camera, enabling the focused plenoptic camera to achieve higher spatial resolution. In this section, optical configurations via which a focused plenoptic camera can capture light-field data in images, or flats, suitable for super-resolution techniques are described. An algorithm for super-resolving flats captured with focused plenoptic cameras implementing the optical configurations is described. Experimental results are presented that show an increase in spatial resolution in rendered images when compared to basic focused plenoptic camera rendering approaches, for example as described in U.S. patent application Ser. No. 12/474,112, entitled "Methods and Apparatus for Full-Resolution Light-Field Capture and Rendering" filed May 28, 2009.

In the methods for rendering flats captured with the focused plenoptic camera, for example as described in U.S. patent application Ser. No. 12/474,112, the trade-off between spatial and angular resolution is determined by parameters in the camera optics. Depending on depth, some portions of the scene may have more angular samples (and correspondingly, a lower spatial resolution) than others. As will be shown, these additional samples of the same spatial area of the scene can be used to further increase the spatial resolution of that area through the application of super-resolution techniques as described herein.

In the following discussion, the conventional plenoptic camera and the focused plenoptic camera are compared, particularly in terms of trade-offs in spatial and angular resolution. It will be shown that the focused plenoptic camera is equivalent to an array of cameras, each one focused on the object being imaged. Expressions for the positions and parameters at which super-resolution is possible with the focused plenoptic camera will be derived. Several classes of super-resolution algorithms for the focused plenoptic camera will be developed and analyzed. A method for super-resolving objects at optical infinity with a focused plenoptic camera is described and demonstrated, and experimental results of super-resolution using an example focused plenoptic camera are presented and compared to results of conventional plenoptic cameras and focused plenoptic cameras without super-resolution.

Conventional Plenoptic Cameras

FIG. 1 illustrates a conventional plenoptic camera. Note that the components shown in this Figure are not necessarily to scale relative to each other. A conventional plenoptic camera includes a main lens and a microlens array placed at distance f in front of a photosensor. The microlenses have aperture d and focal length f, and are assumed to be equally spaced at interval d. The main lens is focused at the microlens plane, and the microlenses are focused at optical infinity (equivalently, at the main lens).

Considering that the focal length of the main camera lens is much greater than the focal length of the microlenses, each "microcamera" is focused at the main camera lens aperture, and not on the object being photographed. Each microlens image is thus completely defocused relative to that object, and represents only the angular distribution of the radiance. As a rule, these microimages look blurry and do not represent a human-recognizable image. Since each microlens image samples a given location depending on its position and spans the same angular range, rendering an output image from a conventional plenoptic camera radiance image can be accomplished by integrating all of the pixels under each microlens. Integrating a fixed portion of the pixels under each microlens generates an image of one certain view. In all cases, each microlens contributes to a single pixel in the final image.

The Focused Plenoptic Camera

Figure 2A:
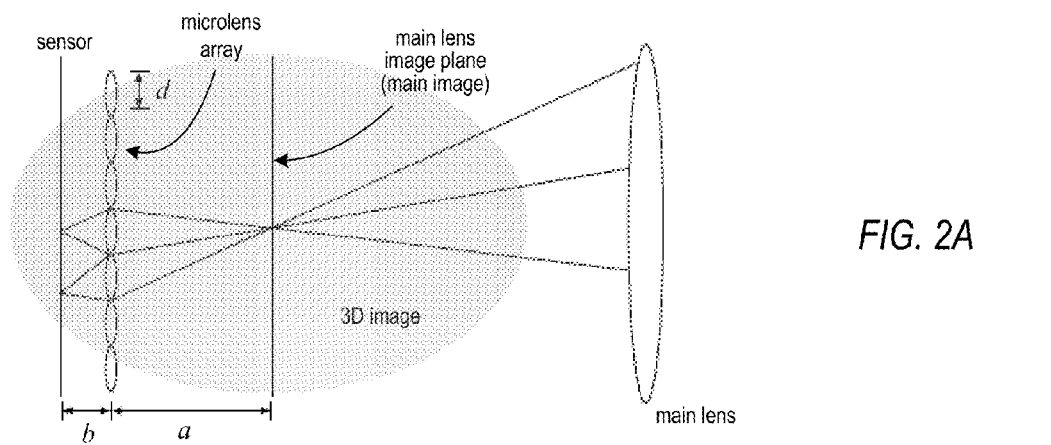
FIG. 2A illustrates an example focused plenoptic camera (Keplerian telescopic case), according to some embodiments.
Figure 2B:
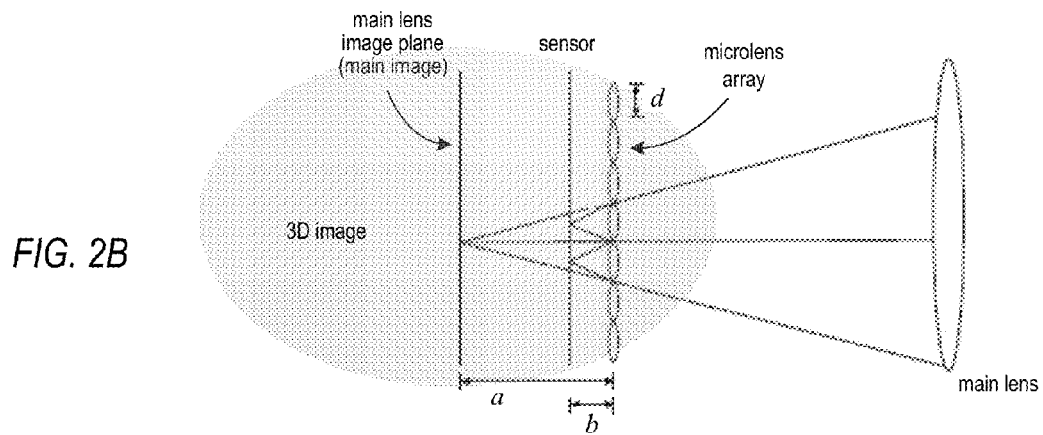
FIG. 2B illustrates an example focused plenoptic camera (Galilean telescopic case), according to some embodiments.

FIGS. 2A and 2B illustrate an example focused plenoptic camera, according to some embodiments. Note that the components shown in FIGS. 2A and 2B are not necessarily to scale relative to each other, nor are the distances between the components necessarily to scale, nor are the sizes of the components necessarily to scale. The focused plenoptic camera may include at least a main lens, a microlens array, and a photosensor. However, in the focused plenoptic camera, the array of "microcameras" is focused on an image plane of the main camera lens instead of at infinity, as in the conventional plenoptic camera shown in FIG. 1. With the focused plenoptic camera, each microcamera is reimaging the main lens image onto the photosensor. The microlenses form an array of true images of the main lens image as a relay system.

The ovoid shaded area in FIGS. 2A and 2B represent the three-dimensional (3D) image formed inside the camera by the main camera lens. Note that this 3D image may extend behind the microlenses. FIG. 2A illustrates the Keplerian telescopic case where the image plane being imaged is in front of the microlenses. If the main lens forms an image behind the microlenses, it is still possible to focus the microlenses on that virtual image so that they form a real image on the photosensor. This is the Galilean telescopic case (see FIG. 2B). In both the Keplerian telescopic case and the Galilean telescopic case, the microlens imaging is described by the lens equation:

$$\frac{1}{a} + \frac{1}{b} = \frac{1}{f}$$

with, respectively, positive a (Keplerian telescopic case) or negative a (Galilean telescopic case). When remapped onto the photosensor, the image of the main lens is reduced in size. This reduction may be denoted as:

$$m = \frac{a}{b}$$

As a result of this scaling, the spatial resolution of the radiance captured by the plenoptic camera is a function of the resolution of the microlens images and the amount of overlap in rendering, and not of the number of microlenses. This decoupling of resolution and number of microlenses is a critical observation that distinguishes the focused plenoptic camera from the conventional plenoptic camera.

Another difference between the conventional plenoptic camera and the focused plenoptic camera is in the nature of the information that is captured by each microlens. In the conventional plenoptic camera, each microlens images one position in the scene, capturing all of the angular information there. In the focused plenoptic camera, different microlenses capture the same position; angular information is spread across microlenses. Accordingly, to render flats captured with the focused plenoptic camera, the rendering algorithm integrates across microlens images, rather than within a single microlens image. That is, assuming that the task is "imaging the image" that is in focus, the rendering algorithm integrates the points in the microlenses that correspond to the same position in the image by overlapping them at a fixed pitch. See U.S. patent application Ser. No. 12/474,112 for examples of basic rendering algorithms for flats captured with embodiments of the focused plenoptic camera.

In order to apply super-resolution techniques to the focused plenoptic camera, the microcamera array needs to be precisely characterized. In particular, the array of microlenses together with the main lens is equivalent to an array of cameras due to the focused plenoptic camera's relay imaging mode of work (see FIGS. 2A and 2B). An array of microcameras observe the "object" in front of them. This "object" is the aerial 3D image of the scene, formed behind the main camera lens, represented as a shaded ovoid in FIGS. 2A and 2B. Since super-resolution is applicable to an array of cameras imaging an object, it is applicable to focused plenoptic camera imaging.

Focused Plenoptic Cameras with Super-Resolution

Super-Resolution Model

The super-resolution problem is to recover a high-resolution source from multiple low-resolution observations. The low-resolution observations may be produced in a variety of different ways, depending on the application. They may be captured by a camera array, a single shifted camera, or they may even be different frames of a video sequence.

Figure 3:
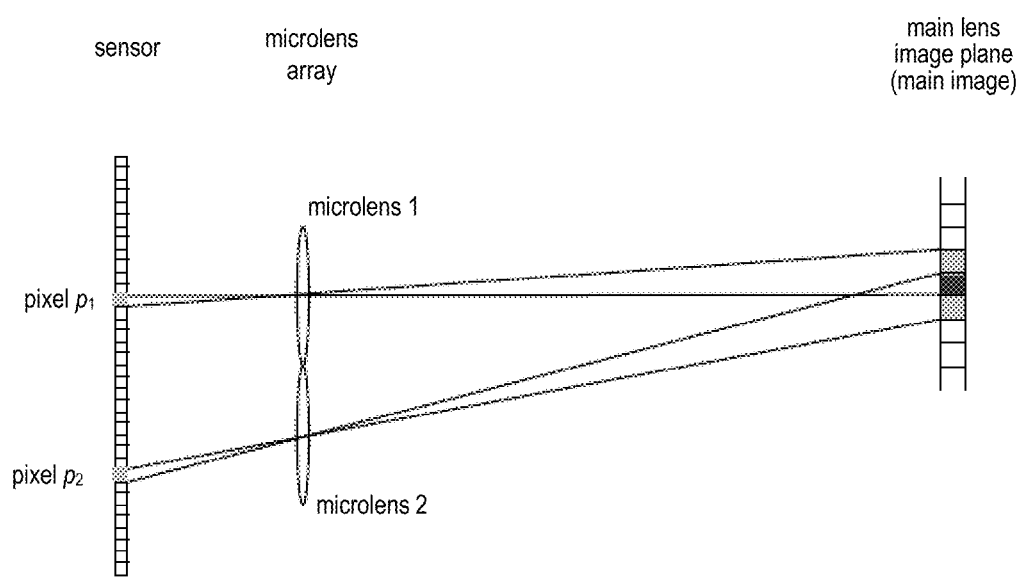
FIG. 3 graphically illustrates low-resolution acquisition of a high-resolution image in a focused plenoptic camera according to some embodiments.
Figure 4:
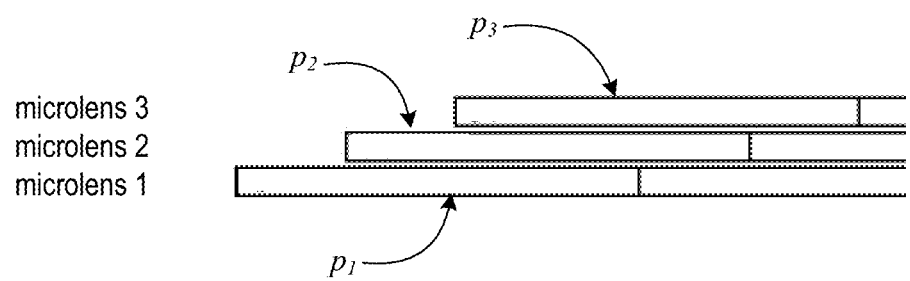
FIG. 4 graphically illustrates three overlapping pixels in a sampling area.

FIG. 3 illustrates low-resolution acquisition of a high-resolution image in a focused plenoptic camera according to some embodiments. The microlenses sample overlapping regions of the high-resolution image generated by the main camera lens. The image-acquisition process in the focused plenoptic camera as shown in FIG. 3 is modeled as follows. A pixel $p_1$ under microlens 1 samples radiance within a certain angle from a given spatial area in the main lens image (in front of the microlenses). In the same way, a pixel $p_2$ under microlens 2 samples an area partially overlapping with the area sampled by $p_1$, i.e., an area shifted by a subpixel amount. In FIG. 3, the overlapping area for pixels $p_1$ and $p_2$ is the darker shaded area of the main image. A pixel $p_3$ under microlens 3 (not shown in FIG. 3) samples an area partially overlapping with the area sampled by $p_1$ and $p_2$, and so on. FIG. 4 graphically illustrates three overlapping pixels ($p_1$, $p_2$, $p_3$) in a sampling area. In FIG. 4, for illustrative purposes, the pixels are mapped from the photosensor to the area sampled and placed on top of each other in space.

Each of the pixels samples a version of the outside world scene, blurred through the kernel of the focused plenoptic camera optics. This includes both the main lens and microlens corresponding to the pixel. In addition, the final pixel value is the result of the convolution of that blurred image with the point-spread function of the pixel photosensor's responsivity. The total kernel may be represented as H with an added noise term. This is an analysis of super-resolution, adapted to the focused plenoptic camera:

$$L = Hx + n \quad (1)$$

where L represents the collected low-resolution observed images, H is the blur matrix, n is a noise term, and x is the high-resolution image that is to be recovered. Recovering x is then cast as a minimization problem:

$$\min_x \{\|Hx - L\|_2^2 + \alpha R(x)\} \quad (2)$$

where R(f) is a regularization term, the choice of which depends on the application and desired solution characteristics. The minimization problem may then be solved using any one of several techniques.

In super-resolution, there needs to be nonintegral (subpixel) shifts between different aliased observations of the high-resolution images. In the general case, estimating these shifts (and, consequently, forming H) is also part of the super-resolution problem. In the case of the focused plenoptic camera, some of the super-resolution problem is simplified, as the focused plenoptic camera is essentially an array of cameras spaced with predetermined micron precision. On the other hand, the shift between features from one microlens image to the next depends on the scene and the camera optics.

Focused Plenoptic Camera Design for Super-Resolution

Figure 5:
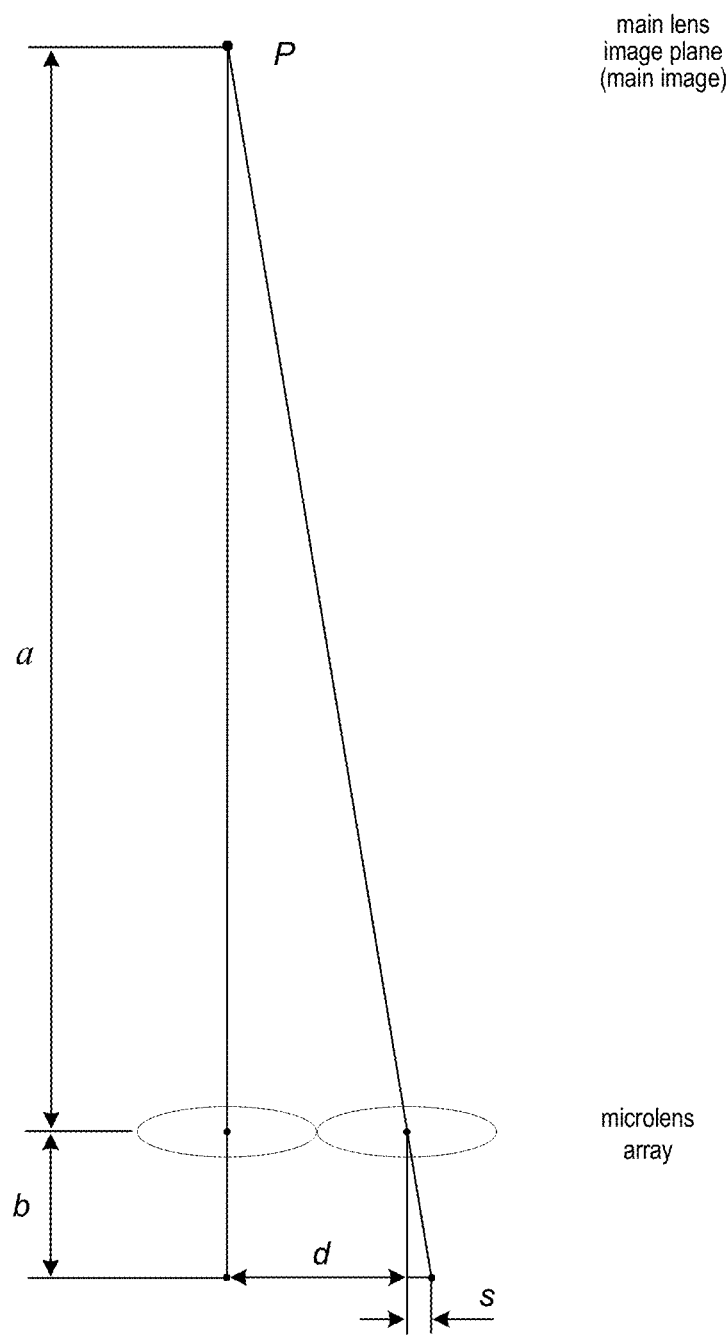
FIG. 5 graphically illustrates the geometry of data capture for super-resolution with the focused plenoptic camera, according to some embodiments.

In this section, methods for designing the optics of the focused plenoptic camera to best support super-resolution are described. FIG. 5 illustrates the geometry of data capture for super-resolution with the focused plenoptic camera, according to some embodiments. As previously discussed, the focused plenoptic camera can be viewed as a relay imaging system, an array of microcameras focused on the image created by the main camera lens. Referring to FIG. 5, consider one luminous point P in the main lens image. FIG. 5 represents the imaging of this point in two microcameras. To be amenable to super-resolution, the distance between the images of the point should be a nonintegral pixel value.

In FIG. 5, it can be seen that d/a=s/b. From this observation, a=db/s is derived. Since, in general, the distance d between microlens centers is already not an integer, it would not be appropriate to constrain s as a way of controlling the subpixel shift. Rather, let the next integer larger than d be Δ=d+x and let s=x+t. Since the pixel size and d are known with precision, x is known. Therefore, t is the translation from the integer pixel location to the image of the observed point. In this way, t=s−x is the quantity that is required to have a nonintegral value.

Note that there are multiple regions in the scene (multiple values of a and b) for which t will have a nonintegral value. For instance, for 2×2 super-resolution, t can be taken to be 0.5 pixels, but t can also be taken to be 1.5, or 2.5, or, in general, 0.5+n for n=0, 1, 2, 3, .... After super-resolving, these values for t provide the same 2× increase in the resolution.

The general case is t=k+n, where k is a fraction less than 1. Different types of super-resolution can be designed with different k. With this notation, the general equation can be written as:

$$a = \frac{db}{x + k + n} \quad (3)$$

From the above, super-resolution is achieved with microimages shifted by Δ+k+n pixels.

In the focused plenoptic camera, the portion of the scene that is at optical infinity (i.e., imaged at the largest distance from the microlenses) will have the greatest reduction in size; that is, the lowest spatial resolution under focused plenoptic camera rendering. In addition, since the portion of the scene that is at optical infinity is the farthest from the microlenses, it has the most angular samples. The low resolution and the availability of the most angular samples also means that this region of the scene is generally the most important to use for support of super-resolution.

Different depths in the scene are imaged at different distances a in front of the microlenses. This creates a difficulty for support of super-resolution because the depths would super-resolve at different values of k. Solving this problem requires subpixel registration among all microimages, which may be a difficult problem, as the solution may be computationally expensive or unreliable for automatic super-resolution. In addition, certain depths would not be super-resolvable at all if the shift between microimages happens to be close to or equal to an integral number of pixels. This type of problem has plagued conventional super-resolution methods, and the conventional super-resolution methods still remain too unreliable for commercial image-processing products.

However, the focused plenoptic camera has the unique characteristic that there is one special depth in the scene, the depth of infinity, which is always mapped to the same location in front of the microlenses, one focal length from the main camera lens. Infinity is also the depth that benefits most from focused plenoptic camera super-resolution. This is also the depth that can be handled with highest precision for super-resolution since it is fixed and subpixel correspondence is set and exactly known in advance.

Figure 6:
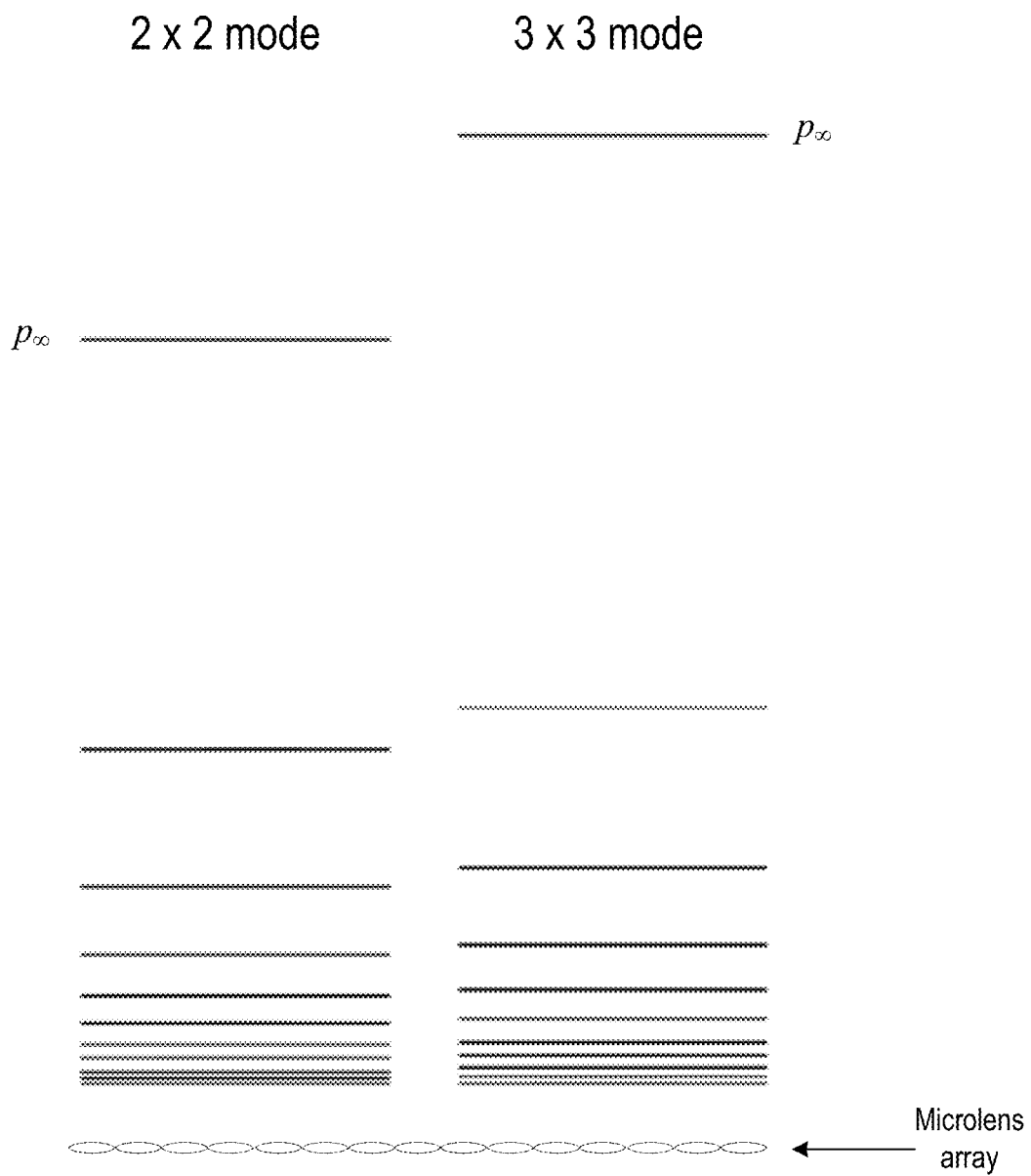
FIG. 6 graphically illustrates planes at different distances from the microlenses at which the focused plenoptic camera super-resolves in 2×2 and 3×3 modes, according to some embodiments.

For a given type of super-resolution (defined by the fraction k) there are a number of planes that satisfy the subpixel shift condition. As these planes approach the microlens array, the planes become closer together, denser and denser; at a certain point their position becomes hard to determine and unreliable (see FIG. 6). FIG. 6 graphically illustrates planes at different distances from the microlenses (represented in the vertical direction) at which the focused plenoptic camera super-resolves in 2×2 and 3×3 modes, according to some embodiments. The plane corresponding to infinity $p_\infty$ is the farthest plane from the microlens array at which there is an image to capture. The separation between this plane and the previous plane is the largest. This makes this the plane with most reliable correspondence, and best for super-resolution.

A focused plenoptic camera may thus be designed and implemented such that infinity is super resolved directly, with registration provided by the camera geometry and the microlens pitch. This avoids estimation of registration from the imagery. At the same time, the registration is much more precise and reliable.

However, while the plane corresponding to infinity $p_\infty$ for a particular super-resolution mode may be best for super-resolution at that mode, the other planes for that mode also work well for super-resolution at that mode. Also note that super-resolution may be used at locations at or near the planes; super-resolution for a given mode will work best when exactly at one of the planes, however, super-resolution will also work satisfactorily for the mode when not exactly at but nearby any of the planes corresponding to that mode.

Another thing to note about FIG. 6 is that the 2×2 and 3×3 super-resolution modes, and other super-resolution modes (e.g., 5×5), may all be realized in the same focused plenoptic camera. Thus, referring to FIG. 6, the 2×2 and 3×3 planes may be overlaid so that the planes are "interleaved", as could planes for one or more other super-resolution modes; there are thus many planes in the focused plenoptic camera at which some level of super resolution (2×2, 3×3, etc.) may be realized. Thus, for a given flat captured with the focused plenoptic camera at some optical setting, there is generally at least one plane at which at least one of the levels of super-resolution may be applied.

Focused Plenoptic Camera with Super-Resolution Design Examples

U.S. patent application Ser. No. 12/474,112 describes example film camera and digital camera embodiments of a focused plenoptic camera that may be configured as described herein to support super-resolution. The parameters of an example physical focused plenoptic camera implementation to support super-resolution are as follows. The microlens pitch of the example focused plenoptic camera is 500 µm and the photosensor pixels are 6.8 µm. Thus, d=73.5294 pixels, Δ=74 pixels, and x=0.4706 pixels. The value for b≈1.6 mm may not be estimated with precision better than 0.1 mm because of the cover glass of the photosensor. However, the value for b may be approximately estimated from known photosensor parameters and independently from the microlens images at different F/numbers. Thus, db≈120 mm is computed. Note that a and b are measured in millimeters, while everything else is measured in pixels (i.e. no units). Also note that these parameters for a focused plenoptic camera that supports super-resolution are given by way of example; other designs for focused plenoptic cameras are possible and contemplated that utilize other values for microlens pitches, photosensor pixel sizes, and so on, and that support super-resolution as described herein.

2×2 Super-Resolution

The following describes super-resolving a focused plenoptic camera image by increasing the size by 2 in each direction (2×2 super-resolution). For 2×2 super-resolution, t=0.5+n, where n=0, 1, 2, 3, ... and a=db/(x+0.5+n). With the parameters of the example focused plenoptic camera described above, a≈120/(1+n), measured in millimeters. The values of n at which the camera super-resolves and the corresponding distances a (in millimeters) are given in the Table 1. Note that other designs for focused plenoptic cameras may yield different values in Table 1 for 2×2 resolution with the particular design.

TABLE 1

| a | 120 | 60 | 40 | 30 | 24 | 20 | 17.1 | 15 | 13.3 | 12 | 10.9 | 10 | 9.2 |
|---|-----|----|----|----|----|----|------|----|------|----|------|----|-----|
| n | 0   | 1  | 2  | 3  | 4  | 5  | 6    | 7  | 8    | 9  | 10   | 11 | 12  |

3×3 Super-Resolution

The following describes super-resolving a focused plenoptic camera image by increasing the size by 3 in each direction (3×3 super-resolution). To super resolve a focused plenoptic camera image three times in each direction, t=⅓+n, where n=0, 1, 2, 3, ... and a=db/(x+⅓+n). With the parameters of the example focused plenoptic camera described above, a≈120/(0.8+n), measured in millimeters. The values of n at which the camera super resolves and the corresponding distances a (in millimeters) are given in Table 2. Note that other designs for focused plenoptic cameras may yield different values in Table 2 for 3×3 resolution with the particular design.

TABLE 2

| a | 150 | 66.6 | 42.8 | 31.6 | 25 | 20.7 | 17.6 | 15.4 | 13.6 | 12.2 | 11.1 |
|---|-----|------|------|------|----|------|------|------|------|------|------|
| n | 0   | 1    | 2    | 3    | 4  | 5    | 6    | 7    | 8    | 9    | 10   |

The depth planes at which the above two types of super-resolution work are graphically represented in FIG. 6. FIG. 6 graphically illustrates planes at different distances from the microlenses (represented in the vertical direction) at which the focused plenoptic camera super resolves in 2×2 and 3×3 mode. The plane corresponding to infinity $p_\infty$ is the farthest plane from the microlens array at which there is an image to capture.

Other modes of super-resolution, such as 5×5, and so on, may be similarly designed and implemented in the focused plenoptic camera, and similar Tables may be generated for the other modes.

The above description focuses on determining the appropriate super-resolution mode to be used from the internal geometry of the focused plenoptic camera. Using these methods and formulas, generally, some plane can be identified from the geometry of the camera at which one of the super-resolution modes can be applied. The pixel size, microlens pitch, distance from the microlenses to the photosensor, and other aspects of the internal camera geometry are known with precision; these geometry parameters may thus be used to identify an appropriate super-resolution mode to apply to a given image captured at some setting of the camera. In some embodiments, if a focal plane suitable for super-resolution at some super-resolution level cannot be identified from the camera geometry, the focused plenoptic camera rendering method may fall back on a super-resolution method that analyzes the microimages in the flat to determine subpixel shift, and super-resolution may then be applied according to the analytically determined subpixel shift, rather than according to the method that relies on the known geometry of the camera. Note, however, that in super-resolution, there needs to be nonintegral (subpixel) shifts between different aliased observations of the high-resolution images; at integral values for the subpixel shift, super-resolution is not applicable.

Super-Resolution Algorithms for the Focused Plenoptic Camera

Figure 7:
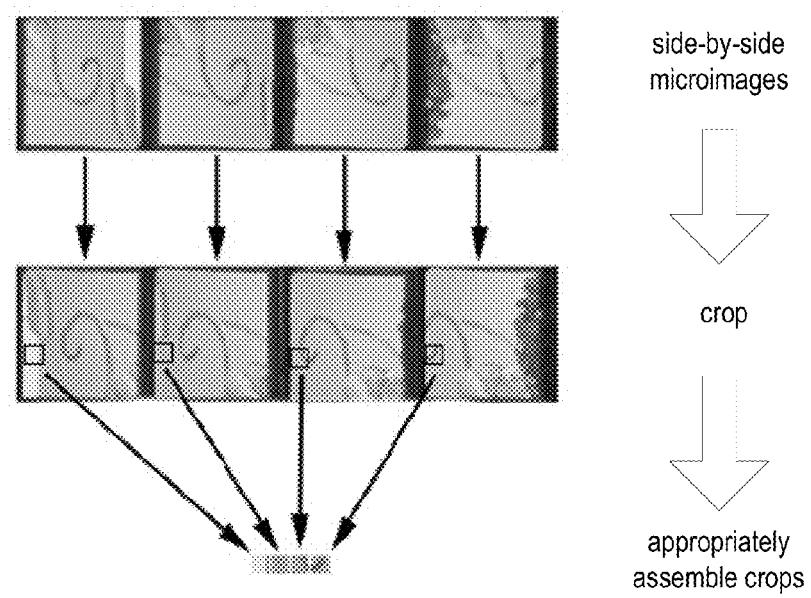
FIG. 7 graphically illustrates a rendering method for flats captured with the focused plenoptic camera without super-resolution.

FIG. 7 graphically illustrates a rendering method or pipeline for flats captured with the focused plenoptic camera without super-resolution. The rectangles in the images of the second row illustrate crops from the four side-by-side microimages. The bottom row shows the four crops as appropriately assembled in the output image.

However, this rendering method tends to waste pixels. Applying super-resolution to the rendering process allows more pixels from each microimage to be used. The method may broadly be stated as making the crop squares larger so that, on each image, the portion covered by the crop square is overlapping some portion of the crop square from the next image. Note that the two crop squares are imaging the same pixels in some overlapping range. Also note that two, three or more microimages may overlap (see, e.g., FIG. 4). Where the microimages overlap, the overlapping portion may be used to increase the resolution via the super-resolution method as described herein, thereby increasing the resolution of the resulting output image.

The following broadly describes a super-resolution algorithm that may be used, for example, to render super-resolved images from flats captured with a focused plenoptic camera appropriately configured for super-resolution as described herein. To solve equation (1) in the example 3×3 case, the following general approach may be used in some embodiments. This algorithm may be adapted for use at other levels of super-resolution (2×2, 5×5, etc.).

Create a high-resolution observed image by interleaving pixels from adjacent microlens images. In the examples given herein, a 3×3 resolution increase is generally used, so each microlens image interleaves pixels from its eight nearest neighbors.

Solve equation (1) ($L=Hx+n$) with an appropriate computational method. In some embodiments, a deconvolution method with Gaussian and sparse priors may be used. The kernel used for deconvolution may be obtained, for example, by imaging a point light source (pinhole). Other embodiments may use other computational methods to solve equation (1).

Figure 8:
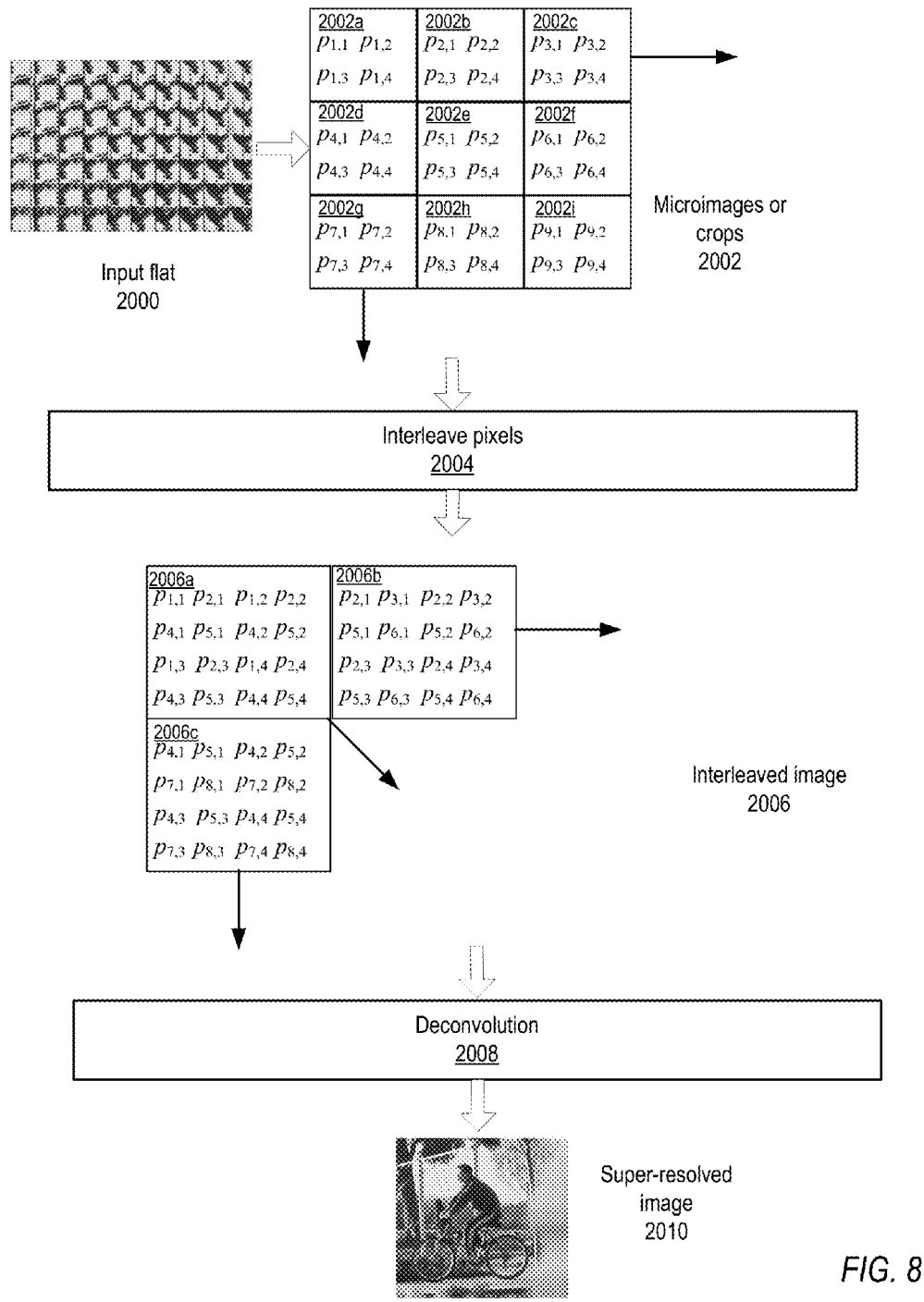
FIG. 8 graphically illustrates a super-resolution rendering algorithm, according to some embodiments.

FIG. 8 graphically illustrates a super-resolution rendering algorithm, according to some embodiments, as applied to a simple example of 2×2 super-resolution, where each "crop" or microimage includes four pixels. Input flat 2000 represents a portion of a flat captured with an implementation of the focused plenoptic camera. Microimages or crops 2002 represent pixels in a subset of the microimages, or in crops selected from the microimages, alphanumerically. For example, a first microimage/crop 2002 includes pixels ($p_{1,1}$, $p_{1,2}$, $p_{1,3}$, $p_{1,4}$). At 2004, the pixels from the microimages are interleaved; since 2×2 super-resolution is being performed, the pixels from four adjacent microimages are interleaved. The output of interleaving 2004 is a raw interleaved image 2006. The interleaved image 2006 is constructed from multiple subimages, each including multiple (four, for 2×2 super-resolution) interleaved microimages or crops 2002 appropriately assembled. For example, subimage 2006a includes interleaved pixels from 2002a, 2002b, 2002d, and 2002e, subimage 2006b includes interleaved pixels from 2002b, 2002c, 2002e, and 2002f, and subimage 2006c includes interleaved pixels from 2002d, 2002e, 2002g, and 2002h.

After interleaved image 2006 is constructed, a deconvolution technique, or some other technique, may be applied to the image to generate the output super-resolved image 2010. Since each pixel of the interleaved image 2006 is sampled from a large area of the main image in the camera and not from a point, interleaving the pixels tends to blur the image, which is sharp in the main image at the image plane captured by the microlenses. Deconvolution, or some other technique, may be applied to remove the blur.

Figure 9:
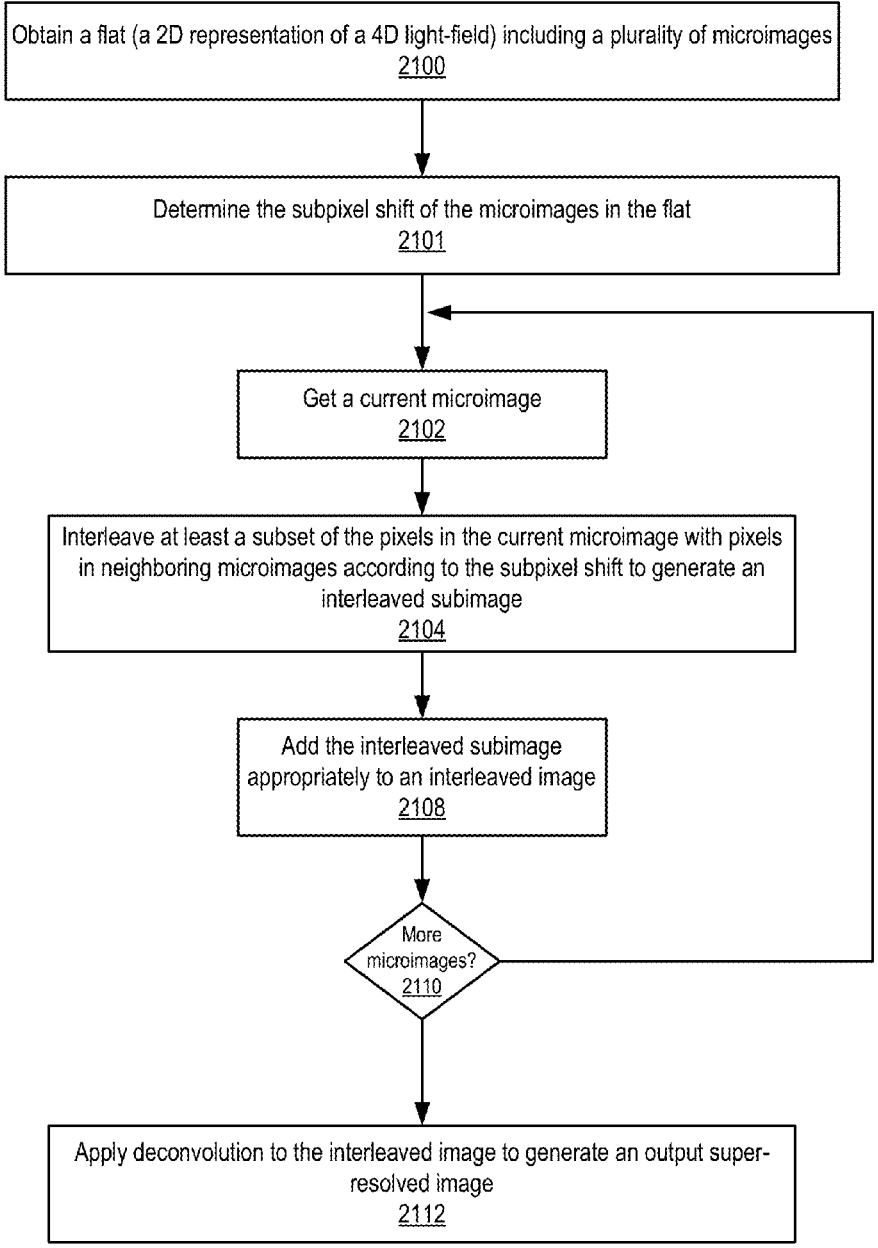
FIG. 9 is a flowchart of a general method for applying super-resolution to flats captured with a focused plenoptic camera, according to some embodiments.

FIG. 9 is a flowchart of a general method for applying super-resolution to flats captured with a focused plenoptic camera, according to some embodiments. As indicated at 2100, a flat (a 2D representation of a 4D light-field) including a plurality of microimages may be obtained. The flat may have been captured by a focused plenoptic camera appropriately configured to support super-resolution, and may have been captured according to an appropriate optical setting to support super-resolution (see, for example, Tables 1 and 2).

As indicated at 2101, the method may determine a subpixel shift that indicates the amount of overlap of the pixels in the microimages. In some embodiments, determining the subpixel shift may be performed by determining the subpixel shift according to configuration values of the focused plenoptic camera used to capture the flat. The configuration values may include pitch of the microlenses in a microlens array of the focused plenoptic camera, distance from the microlenses to a photosensor of the focused plenoptic camera, and distance from the microlenses to an image plane of an objective lens of the focused plenoptic camera at which the flat was captured. In some embodiments, the subpixel shift may alternatively be determined according to an analysis of at least two of the microimages that include overlapping portions of the image of the scene.

The method may iterate over the microimages in the flat to generate an interleaved image. As indicated at 2102, a current microimage may be obtained. As indicated at 2104, at least a subset of the pixels in the current microimage may be interleaved with pixels in neighboring microimages according to the subpixel shift to generate an interleaved subimage. For example, in 2×2 super-resolution, at least a subset of the pixels of the current microimage may be interleaved with pixels from three neighbor microimages; in 3×3 super-resolution, at least a subset of the pixels of the current microimage may be interleaved with pixels from eight neighbor microimages. The subpixel shift may be used to determine the level of super-resolution to be used. For example, a subpixel shift of ½ results in 2×2 super-resolution, a subpixel shift of ⅓ results in 3×3 super-resolution, and so one. Note that the subpixel shift may be approximate, and does not need to be exact, for a level of super-resolution to be used.

As indicated at 2108, the interleaved subimage may be appropriately assembled to generate an interleaved image. Note that in some embodiments the interleaved subimage may be formed directly in interleaved image memory. At 2110, if there are more microimages to be processed, the method returns to 2102 to get a next microimage. Otherwise, the interleaving of the microimages is done, and the output of the process is the interleaved image.

The following is a summary of elements 2102 through 2110 that generalizes the process. Let $L_S$ represent a level of super-resolution determined according to the subpixel shift, where $L_S=(2, 3, 4, \ldots)$. For each microimage, the pixels of the microimage are interleaved with the pixels of $(L_S^2-1)$ neighboring microimages that overlap the current microimage to generate an interleaved subimage, where LS is a level of super-resolution determined according to the subpixel shift. The interleaved subimages are appropriately assembled to generate a high-resolution (interleaved) image of the scene.

As indicated at 2112, after the interleaved image is generated, deconvolution or some other technique may be applied to the interleaved image to generate an output super-resolved image. Since each pixel of the interleaved image is sampled from a large area of the main image in the camera and not from a point, interleaving the pixels tends to blur the image, which is sharp in the main image at the image plane captured by the microlenses. Deconvolution, or some other technique, may be applied at 2112 to remove the blur.

In some embodiments, deconvolution may be applied to each subimage individually, rather than applying deconvolution to the interleaved image.

Example Results

The example images presented in FIGS. 10 through 19 were generated using an example focused plenoptic camera implementation and selecting n=8 in Table 2 for 3×3 super-resolution, corresponding to a distance a=13.6 mm in front of the microlenses for this example camera. A relatively large value of n was used because, for lower values of n, the image may be too far from the microlenses and may be too small.

In the example focused plenoptic camera implementation used to capture these example images, the main camera lens is moved forward with a 13 mm extension tube and, the position of the main lens is fine-tuned by changing the focus. Refocusing provides fine-tuning by continuously moving the lens forward between 0 mm and 10 mm. Super-resolution was performed at a shift of Δ+n=82 pixels between captured microimages.

For the example focused plenoptic camera implementation, a medium format camera, using an 80-mm lens and a 39-megapixel digital back, is used. Pixel size is 6.8 μm. The lens is mounted on the camera with a 13 mm extension tube, which provides the needed spacing to establish an appropriate distance from the focal plane to the microlens array and the photosensor as described above. In the example focused plenoptic camera, the microlens array works with the photosensor without removing the cover glass. For that purpose, the microlenses have focal length of 1.5 mm and the array is placed directly on the cover glass of the photosensor, after removing the infrared filter. A method for providing variable additional spacing of up to 0.2 mm is provided for fine-tuning the microlens focus.

U.S. patent application Ser. No. 12/474,112 describes an example embodiment of a focused plenoptic camera based on a large-format film camera that is somewhat similar to the example focused plenoptic camera described in this section. More generally, U.S. patent application Ser. No. 12/474,112 describes example film camera and digital camera embodiments of a focused plenoptic camera which may be configured as described herein to support super-resolution, and further describes both fixed and adjustable embodiments of the focused plenoptic camera. It is noted that these are example embodiments, and are not intended to be limiting. Other embodiments of the focused plenoptic camera are possible and anticipated.

The pitch of the microlenses is 500 μm with a precision better than 1 μm. This precision makes subpixel registration and the method of super-resolution possible. The large pitch makes the microlenses work with an F-number of the main lens as low as 3. Note that if such an array were used with a conventional plenoptic camera, it would result in a final image of size less than 100×100 pixels after rendering. That is why conventional plenoptic camera designs required removal of the cover glass and a very small distance to the photosensor—in order to accommodate a low F-number at small pitch.

Next, the range of depths in the real world at which super-resolution works is estimated. As noted previously, in the example focused plenoptic camera with the appropriate chosen settings for 3×3 super-resolution from Table 2, the image of infinity is formed at distance 13.6 mm from the microlenses, corresponding to n=8. The next closer plane good for 3×3 super-resolution would be at 12.2 mm, and between them there is a plane where super-resolution would fail. Assuming that the image is well super-resolved within 0.5 mm (from 13.1 mm to 13.6 mm), consider the lens equation for the main camera lens:

$$(A-F)(B-F)=F^2 \tag{4}$$

where F=80 mm is the focal length of the main lens, A is the distance to the object, and B is the distance to the image. The estimate above that B−F=0.5 mm leads to a distance A=12.8 m. Anything that is located at more than 13 m from the camera is well super resolved. Note that this plane can be brought closer by selecting different camera parameters.

The example images presented in FIGS. 10 through 19 were initially captured in color using the example focused plenoptic camera implementation and settings as described above, and have been converted to grayscale for display purposes.

Figure 10:
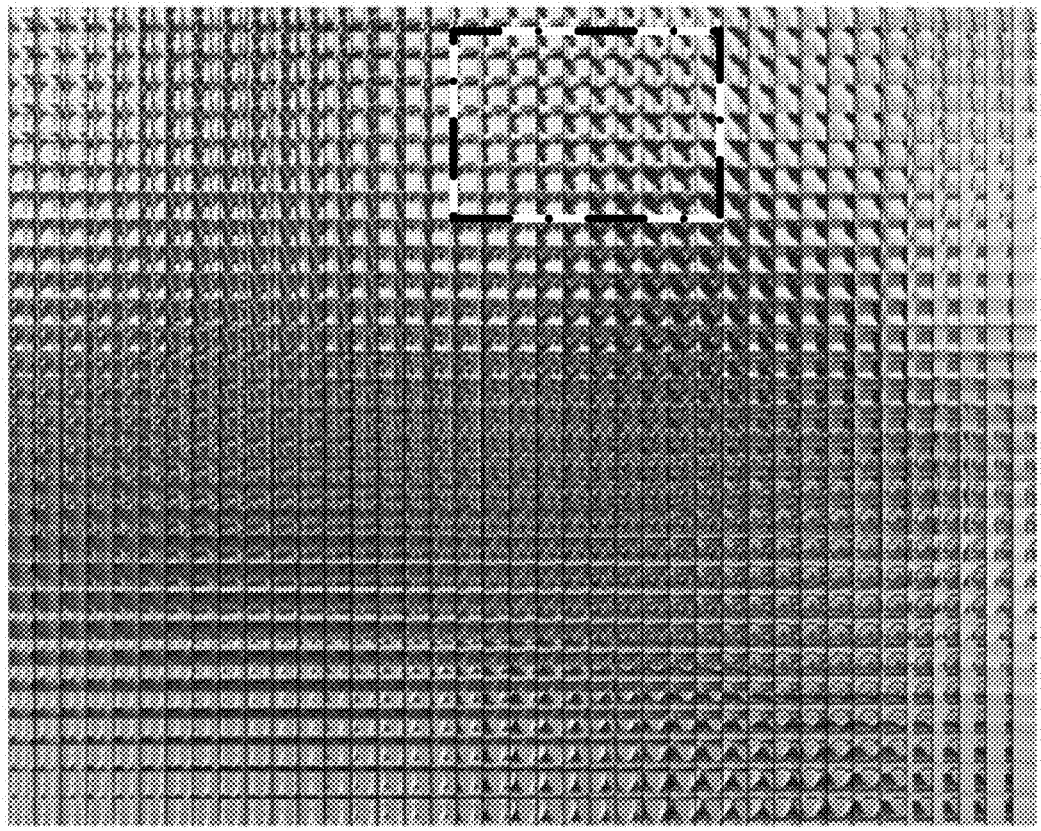
FIG. 10 shows a portion of a light-field image, or flat, captured by the example focused plenoptic camera.
Figure 11:
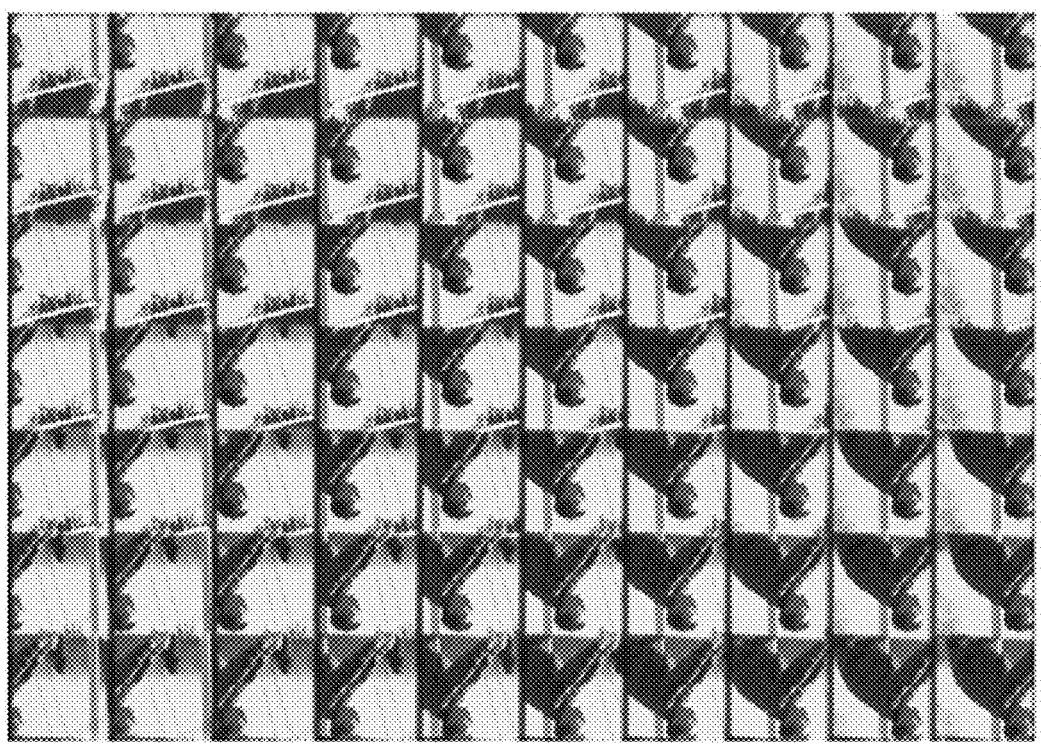
FIG. 11 is a zoom-in to the region indicated by the rectangle in FIG. 10.

FIG. 10 shows a portion of a light-field image, or flat, captured by the example focused plenoptic camera. No part of the image is in focus at the image plane; hence, the light-field image appears blurry at a macro level. However, by closely examining the microimages themselves, it can be seen that the microimages are well focused, as shown in FIG. 11, which is a zoom-in to the region indicated by the rectangle in FIG. 10. Note that a square main lens aperture was used to provide efficient use of photosensor space, so the microimages are squares and not circles.

Figure 12:
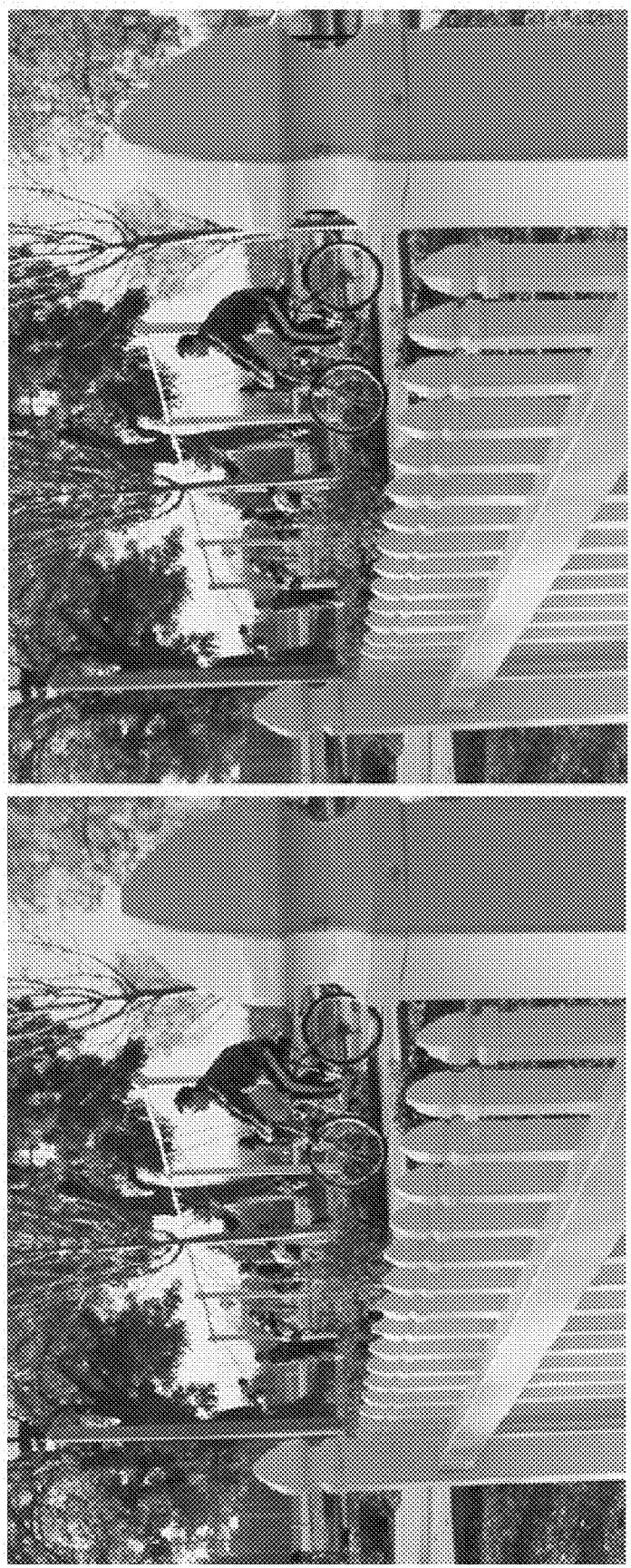
FIG. 12 shows a stereo rendering of the captured flat of FIG. 10, rendered using a focused plenoptic camera rendering algorithm without super-resolution.
Figure 13:
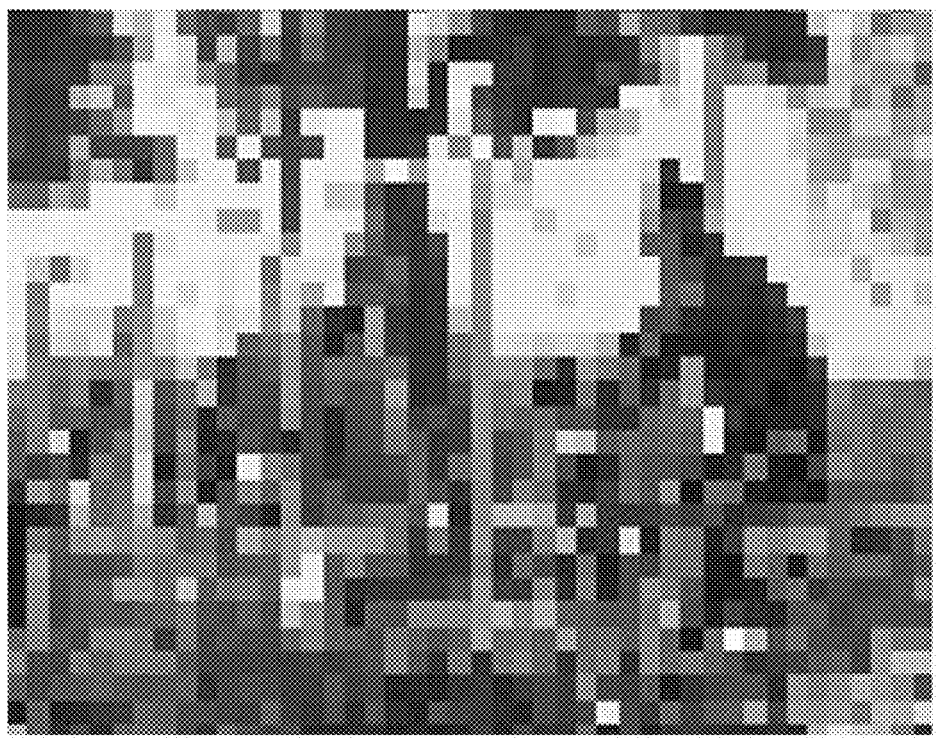
FIG. 13 shows a rendering of the flat of FIG. 10 according to a conventional plenoptic camera rendering technique that uses one pixel per microlens.
Figure 14:
FIG. 14 shows a rendering of the flat of FIG. 10 according to a focused plenoptic camera rendering algorithm without super-resolution.
Figure 15:
FIG. 15 shows a rendering of the flat of FIG. 10 according to a focused plenoptic camera super-resolution rendering algorithm.

FIG. 12 shows a stereo rendering of the captured flat of FIG. 10, rendered using a focused plenoptic camera rendering algorithm without super-resolution. FIGS. 13 through 15 show results of the different rendering approaches. To show the effects of the different rendering approaches more clearly, smaller portions of the image are shown. Rendering the light-field according to conventional plenoptic camera rendering techniques that use one pixel per microlens yields an image with very low resolution, as shown in FIG. 13. A focused plenoptic camera rendering algorithm without super-resolution enables significant resolution improvement, as shown in FIG. 14. A slightly different view of the same light field rendered with a focused plenoptic camera super-resolution rendering algorithm according to some embodiments is shown in FIG. 15. The image in FIG. 15 is clearly of higher resolution than the images in FIGS. 13 and 14.

Figure 16:
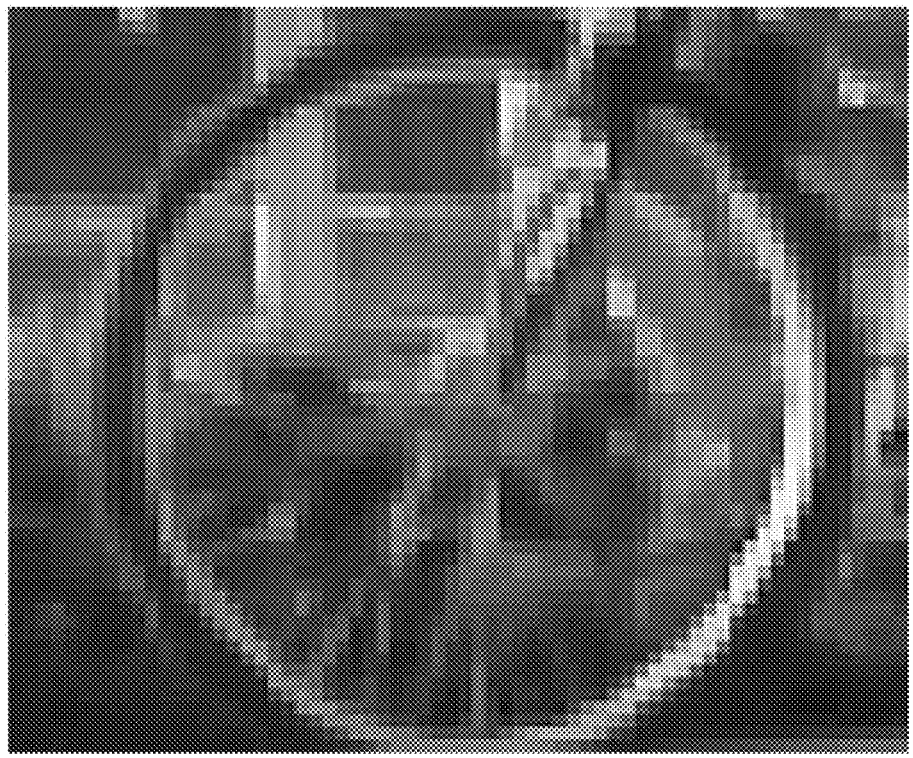
FIG. 16 shows a close-up of the front wheel of the bicycle from FIG. 14, rendered with a focused plenoptic camera rendering algorithm without super-resolution.
Figure 17:
FIG. 17 shows a close-up of the front wheel of the bicycle from FIG. 15, rendered according to a focused plenoptic camera super-resolution rendering algorithm.

FIG. 16 shows a close-up of the front wheel of the bicycle rendered with a focused plenoptic camera rendering algorithm without super-resolution; pixilation is visually evident. FIG. 17 shows a close-up of the front wheel of the bicycle rendered with the focused plenoptic camera and super-resolution, using the focused plenoptic camera super-resolution rendering algorithm according to some embodiments. The image in FIG. 17 is clearly of higher resolution than the image in FIG. 16.

Figure 18:
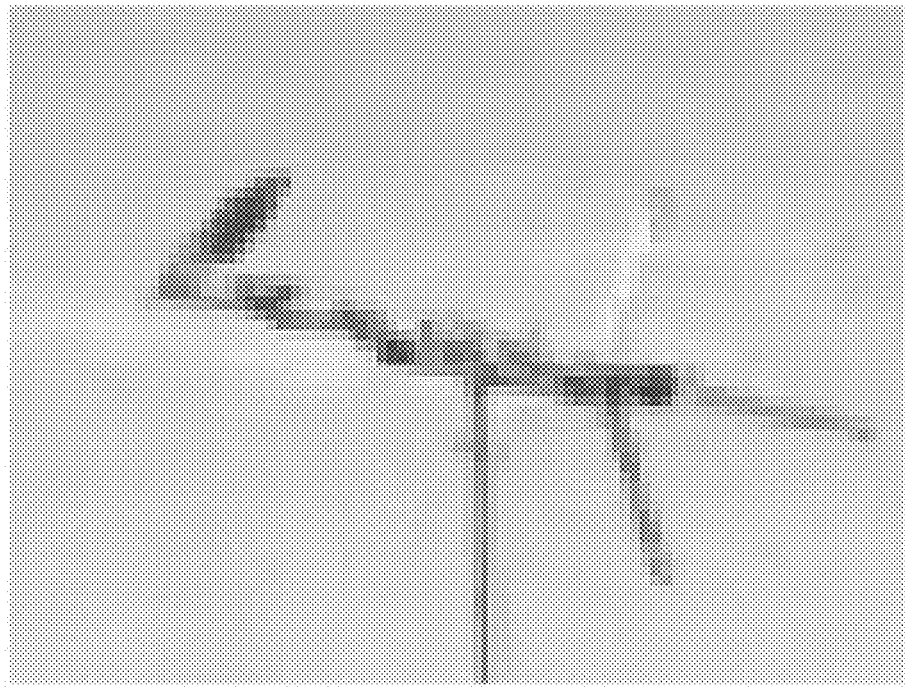
FIG. 18 shows a rendering from light-field data using a focused plenoptic camera rendering algorithm without super-resolution.
Figure 19:
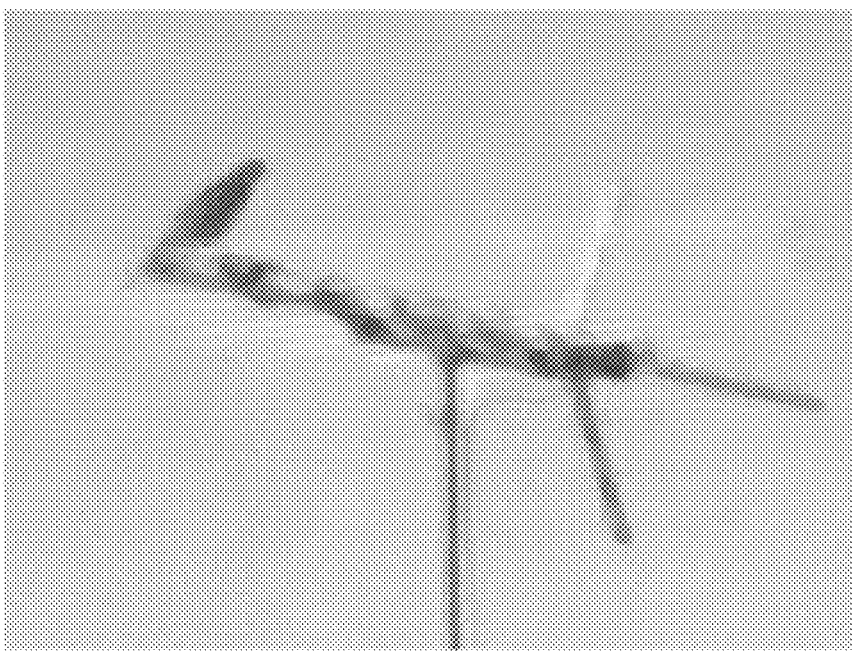
FIG. 19 shows a rendering from the same light-field data used in FIG. 18, but using a focused plenoptic camera super-resolution rendering algorithm.

FIGS. 18 and 19 show an image of a bird on an antenna, rendered from a flat captured with a focused plenoptic camera. The image in FIG. 18 is rendered from the light-field data using a focused plenoptic camera rendering algorithm without super-resolution. The image in FIG. 19 is a super-resolved rendering from the same data, rendered using the focused plenoptic camera super-resolution rendering algorithm according to some embodiments. Pixilation can be clearly seen in the image of FIG. 18, and the improvement gained with super-resolution rendering can be seen in FIG. 19 when compared to FIG. 18.

Methods and Apparatus for Super-Resolution in Integral Photography

Methods and apparatus for super-resolution in integral photography are described. Embodiments may provide and implement one or more techniques that may improve the super-resolution process and/or the quality of super-resolved images that may be generated from flats captured with a focused plenoptic camera using a super-resolution algorithm. At least some of these techniques may involve modifications to the focused plenoptic camera design. In addition, at least some of these techniques may involve modifications to the super-resolution algorithm. One technique is to implement modifications to the focused plenoptic camera (specifically, to the photosensor) that result in smaller pixels being captured at the photosensor from the main image plane of the camera. Another technique is to implement modifications to the focused plenoptic camera that randomize the positioning of the pixels so that super-resolution may be applied at all depths of focus. Another technique is to apply a kernel, for example a sharpening kernel, when sampling pixels from different microimages. Note that these techniques may be individually implemented, or a combination of two or more of the techniques may be implemented in combination. Another technique is to randomize or otherwise alter the positioning of the pixels so that super-resolution is achievable at more depths of focus, or at all depths of focus.

Figure 20:
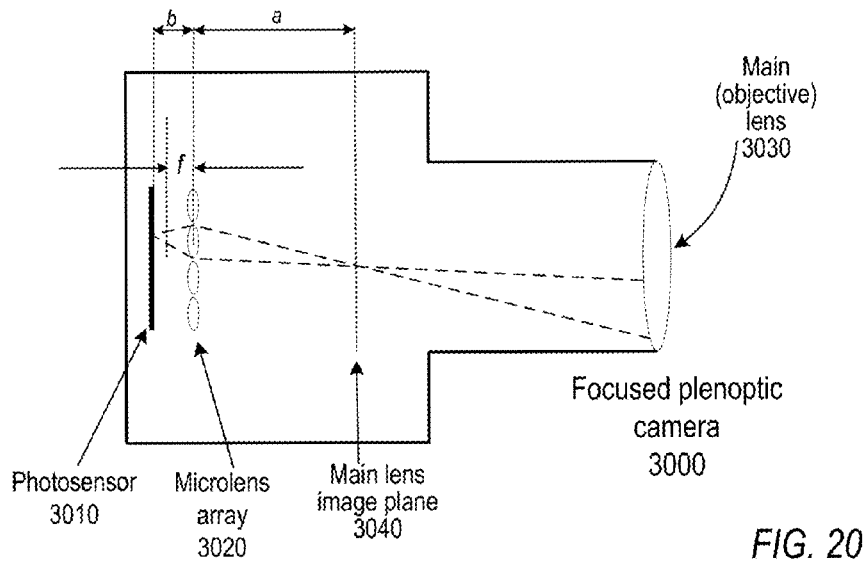
FIG. 20 is a block diagram illustrating a focused plenoptic camera according to some embodiments.

FIG. 20 is a block diagram illustrating a focused plenoptic camera according to some embodiments. Focused plenoptic camera 3000 may include a main (objective) lens 3030, a microlens array 3020, and a photosensor 3010. In at least some embodiments, microlens array 3020 may be located at a distance greater than f from photosensor 3010, where f is the focal length of the microlenses in array 3020. The microlenses in array 3020 are focused on the image plane 3040 of the main lens 3030.

The "ba" Microlens System

Figure 22:
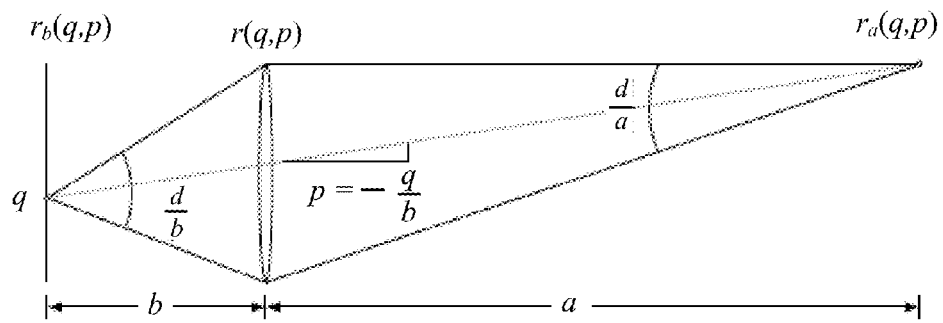
FIG. 22 illustrates the "ba" microlens system of the focused plenoptic camera.

FIG. 22 illustrates the "ba" microlens system of the focused plenoptic camera, for example as illustrated in FIG. 20. Consider one microlens and let $r_a(q, p)$ be the radiance at the focal plane of the main lens and $r_b(q, p)$ be the radiance at the photosensor behind that microlens. The image from the main lens is assumed to be focused on the plane distance a in front of the microlenses, i.e., the imaging plane of the microlenses. Each microlens focuses a portion of the image plane onto the photosensor.

Figure 23:
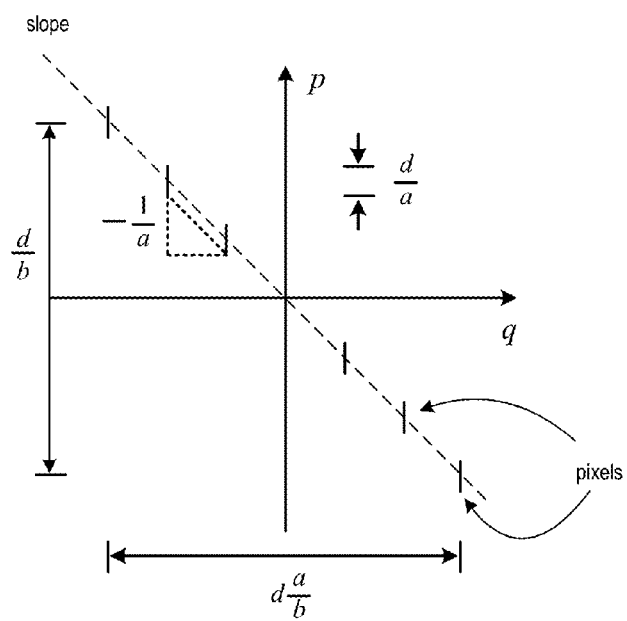
FIG. 23 illustrates sampling radiance by a single microlens.

FIG. 23 illustrates the way that radiance is sampled by a single microlens (infinitely small pixels and microlens aperture d are assumed). This Figure illustrates sampling of the radiance $r_a(q, p)$ by a single microlens represented in the two-dimensional (q, p) plane. Each pixel samples a single position in q (the positional coordinate) and samples a span of d/a in p (the directional coordinate). The entire microlens samples a span of da/b in q (the spatial coordinate).

Figure 24:
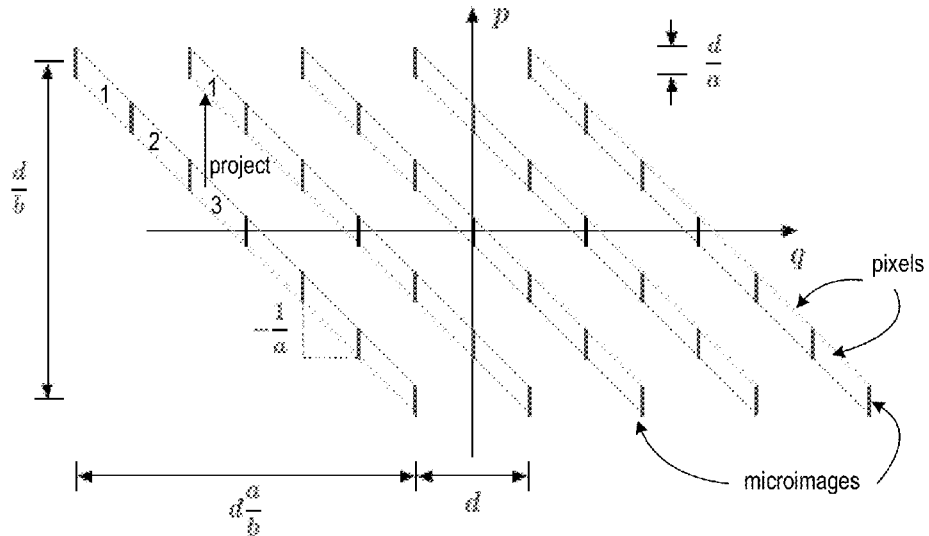
FIG. 24 illustrates sampling of the radiance $r_a(q, p)$ by a microlens array represented in the two-dimensional (q, p) plane.

FIG. 24 illustrates sampling of the radiance $r_a(q, p)$ by a microlens array represented in the two-dimensional (q, p) plane.

Figure 25:
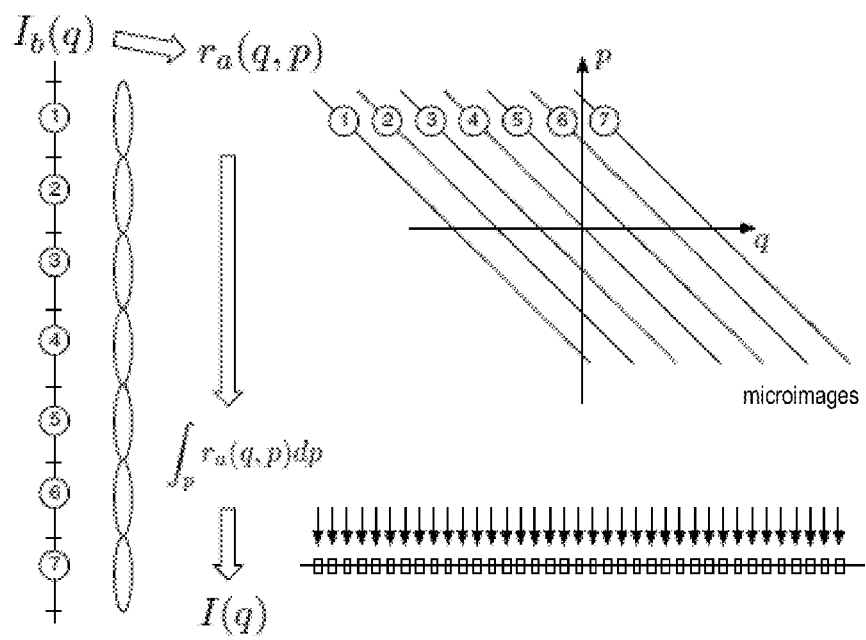
FIG. 25 illustrates rendering of a final image from a captured lightfield in two steps, according to a conventional technique.

FIG. 25 illustrates rendering of a final image from a captured lightfield, according to a standard super-resolution rendering pipeline. First, the photosensor image $I_b(q)$ is converted into the radiance $r_a(q, p)$. Next, integrate (average) at fixed q over p. The resolution at which integration is performed is determined by the resolution of the microlens images, not by the number of microlenses.

Figure 21:
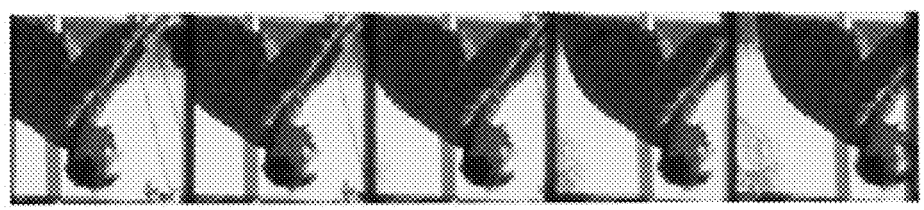
FIG. 21 shows an example crop from an example raw image as captured by an embodiment of a focused plenoptic camera.

FIG. 21 shows an example crop from an example raw image as captured by an embodiment of a focused plenoptic camera. This raw image consists of many microimages, one for each microlens in the microlens array; the crop shown in FIG. 21 shows a row of five microimages. In each microimage, different points are captured from different parts of the main camera lens because the microlenses see the image of the main lens in such a way that each pixel in a given microimage is from a slightly different viewpoint, and captures a slightly different part of the main camera lens.

The following may reference FIG. 23. An image or flat captured with a focused plenoptic camera consists of many microimages, as noted above. Each microimage captures a mixture of positional and angular information in front of a respective microlens. In front of the microlens, imagine a plane where the main lens is focused. On that plane, there is position (x,y position). At each (x,y) point, there is also directional information (i.e., the angle a light ray comes from.) In FIG. 23, the (x,y) positions are combined as one dimension, q. The other dimension, p, represents the angular data. Thus, p and q are the two axes as shown in FIG. 23; q is position on the image plane, and p is the angle at each q, that is the angle the light rays hit each q.

In a microimage of the image shown in FIG. 21, q is the (x,y) position of a pixel, and p is the angle at which each ray is hitting the image. The rays intersecting different points in one microimage come from different angles because the rays are from different locations on the main camera lens. Those different angles are represented by p, as illustrated in FIG. 23. The small vertical lines in FIG. 23 each represent a pixel. Note that the pixels are sloped. In an idealized form, each pixel is infinitely thin (infinitely small in the positional direction); in the angular direction, each pixel has some size (the vertical length of the lines representing pixels). All of the pixels form a line, slanted at the angle $-1/a$, where a and b are parameters of the focused plenoptic camera (see, e.g., FIG. 22). The slanted line represents one microimage.

There are multiple microimages in an image captured with a focused plenoptic camera; each microimage has the properties described above. In the optical phase space, the (q,p) space, all the microimages are lined together as shown in FIG. 24. FIG. 24 shows five long parallelograms, each representing one microimage, and each being shifted relative to the others by some amount in space. The six smaller parallelograms making up each microimage in FIG. 24 represent individual pixels. Each microimage captures different angles, captures the image at a slightly different position. Thus, all of the microimages sample the full optical phase space of position and angle.

Comparing FIG. 24 to the image shown in FIG. 21, in the image of FIG. 21, there is an array of microimages. Taking a given point, e.g. the center of each microimage, the point is slightly shifted from one microimage to the next, just as the point where the parallelograms in FIG. 24 intersect the q axis are slightly shifted from one to the next. However, the images in FIG. 24 are stacked together, not in one dimension but in two dimensions, both horizontal and vertical.

FIG. 25 illustrates a simplified representation of FIG. 24; in FIG. 25, the microimages are shown as straight lines. Imagine an image at each line (microimage) in FIG. 25, for example microimages from FIG. 21. The image is repeated multiple times; each image is very similar but not exactly the same. The difference is that each microimage is sampled at a slightly different location, as previously described, due to the optical characteristics of the focused plenoptic camera. Therefore, a pixel capturing a grayscale or color value is positioned slightly different in each microimage. Note that each pixel is a small square or rectangle, and not one point. The structure of this rectangle needs to be recovered in the final image. On one microimage, a pixel looks like, and is, a constant color, but the same pixel on another microimage may be a slightly different color. If the microimages are shifted by a subpixel amount and mixed, a better representation of each rectangle (pixel) may be recovered.

The following generally describes a super-resolution algorithm as described earlier in the document, for example in reference to FIG. 9. Consider the leftmost microimage in FIG. 24 as the first microimage. Projecting the third pixel of this microimage vertically, this third pixel may be exactly like the first pixel in the second microimage, which is above it. This is true if the projection is vertical, which is the case if the image is directly in focus. If the image is not directly in focus, the projection has to be performed at a slightly tilted angle. In some cases the angle may be such that the first pixel of the second microimage falls exactly between the second and third pixels of the first microimage. With this projection, approximately 2× higher density of the pixels will be achieved when projected on the q axis than can be achieved with conventional rendering techniques. Essentially, resolution may be doubled by choosing a slightly tilted angle of projection. With a little more tilt to properly align the pixels, the resolution may be increased 3×, with one pixel from a first microimage, one pixel from a second microimage, and one pixel from a third microimage, and repeating with pixels from the first second and third microimages. Thus, in this super-resolution algorithm, pixels are simply fitted between each other; the pixels slightly overlap. See, for example, FIG. 4. Since the pixels overlap, blending of the pixels may result in the image being blurry. Thus, a deconvolution technique is applied to the resulting image, for example as previously described in reference to FIG. 9.

Focused Plenoptic Cameras with Reduced Pixel Size

Figure 33:
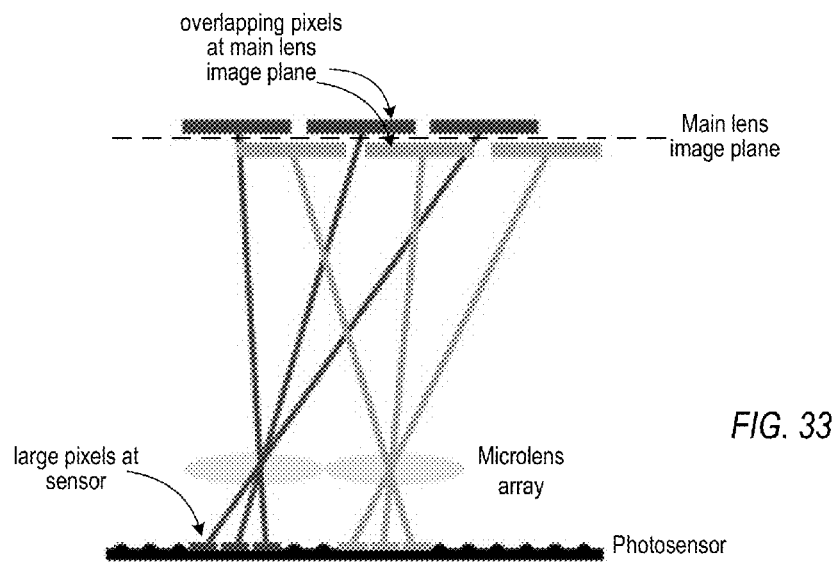
FIG. 33 shows overlapping pixels at the main lens image plane of a conventional focused plenoptic camera.
Figure 34:
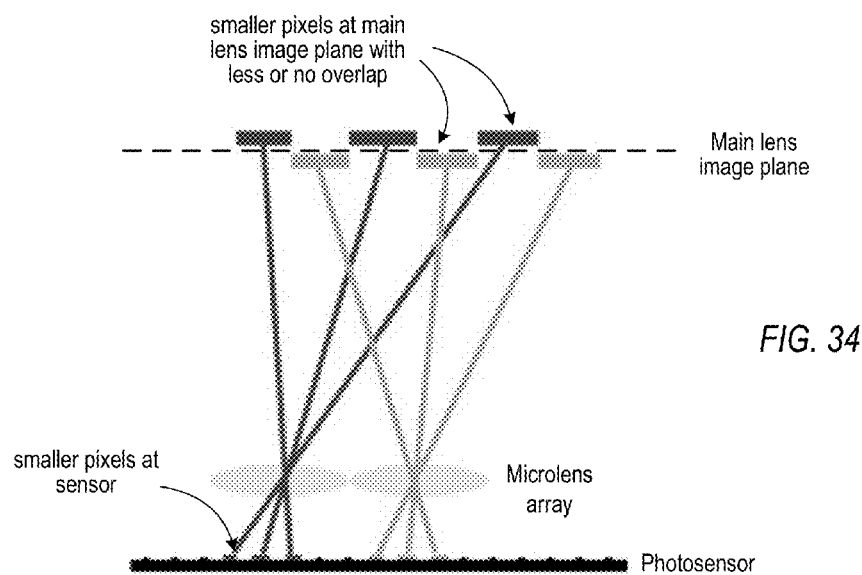
FIG. 34 shows an example embodiment of a focused plenoptic camera in which the camera has been modified so that smaller pixels are captured at the photosensor from the main lens image plane.

As noted above, in the conventional super-resolution algorithm, since the pixels overlap and are blended, resulting in a blurry image, a deconvolution technique is applied to the resulting image. However, deconvolution may generate noise in the image, and thus may require filtering of some type, and in any case tends to be computationally expensive and slow. To reduce or eliminate this need to deconvolve super-resolved images to overcome blurriness introduced by the blending of overlapping pixels, embodiments of a focused plenoptic camera are described that reduce the size of the pixels captured at the photosensor from the main image plane to thus reduce or eliminate the overlap of the pixels. FIG. 33 shows overlapping pixels at the main lens image plane of an unmodified focused plenoptic camera. FIG. 34 shows an example embodiment of a focused plenoptic camera in which the camera has been modified so that smaller pixels are captured at the photosensor from the main lens image plane. Note that the smaller pixels may overlap less than those captured with the conventional focused plenoptic camera, or in some embodiments may not overlap at all. Since the pixels captured from the main image plane in the modified camera of FIG. 34 overlap less or not at all, blurring is reduced or eliminated, and thus deconvolution may not be necessary or, if performed, may be reduced. Since deconvolving an image may generate noise in the image, reducing or eliminating deconvolution may result in better quality output images, and may also speed up performance.

Several different modifications may be made, alone or in combination, to the focused plenoptic camera design to capture smaller pixels from the image plane at the photosensor as shown in FIG. 34. In some embodiments, the focused plenoptic camera may be modified by positioning an appropriate lenslet at each pixel of the photosensor to reduce the fill factor at the pixel so that smaller pixels are captured. Thus, the focused plenoptic camera may be modified with a fill factor-reducing lenslet at each pixel of the photosensor, where the lenslets have the optical characteristic of generating smaller pixels at the photosensor, and thus in the microimages of captured flats. Referring to FIG. 20, these lenslets would be located between microlens array 3020 and photosensor 3010, proximate to photosensor 3010. This modification may be used in a focused plenoptic camera, for example as shown in FIG. 20, to reduce the size of the pixels captured from the image plane, thus improving super-resolution in the camera by reducing or eliminating the need to apply deconvolution to super-resolved images generated from flats captured with the camera.

Figure 38:
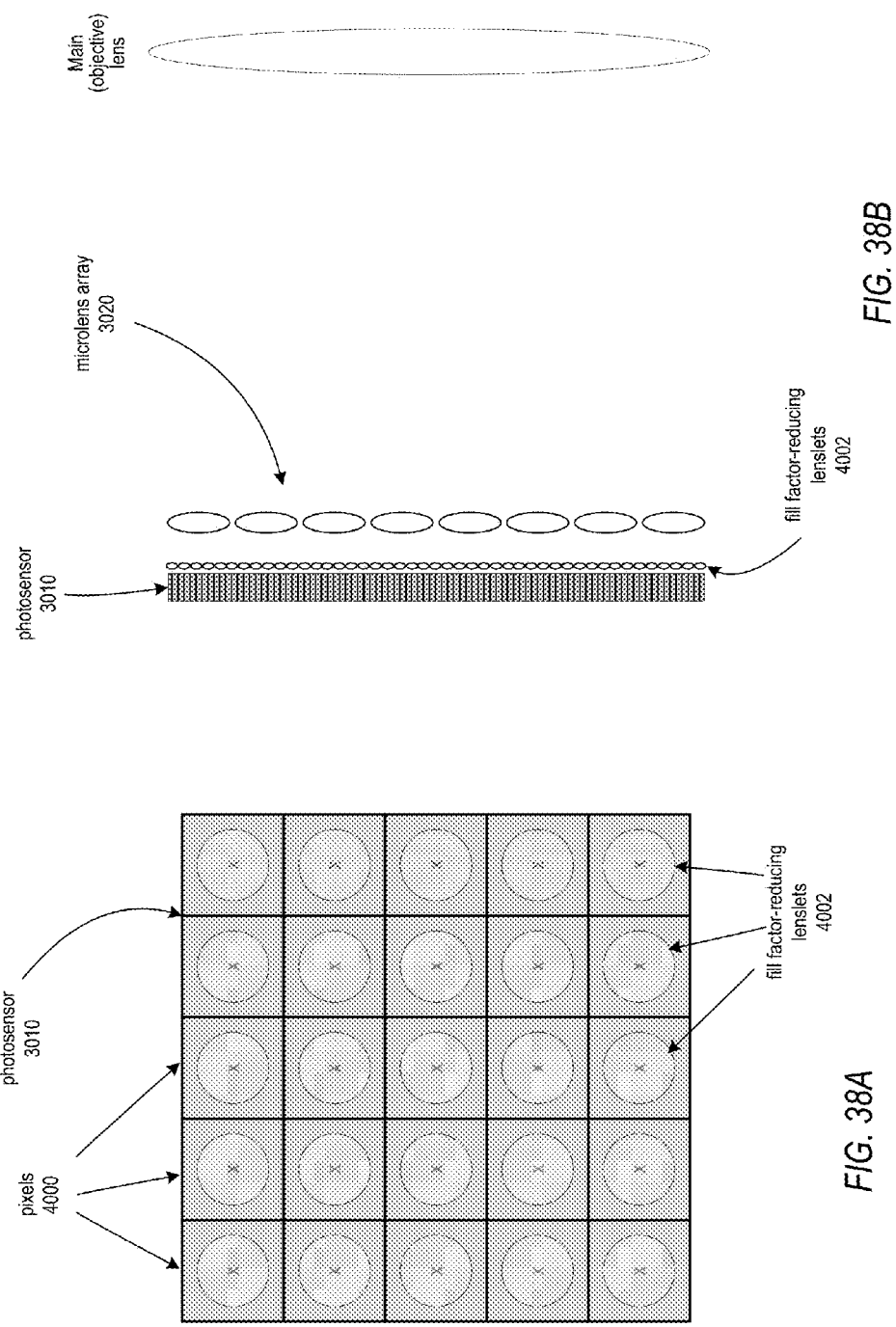
FIGS. 38A and 38B illustrate fill factor-reducing lenslets in a focused plenoptic camera, according to some embodiments.

FIGS. 38A and 38B illustrate fill factor-reducing lenslets in a focused plenoptic camera, according to some embodiments. FIG. 38A shows a photosensor 3010, such as photosensor 3010 of FIG. 20, with a fill factor-reducing lenslet 4002 at each pixel 4000 of the photosensor 3010. FIG. 38B is a side view that shows the positioning of the fill factor-reducing lenslets 4002 between the microlens array 3020 and photosensor 3010 in a focused plenoptic camera such as the camera shown in FIG. 20. Note that the size and shape of the lenslets 4002 are given as examples; other sizes and shapes of lenslets 4002 may be used.

In some embodiments, instead of or in addition to modifying the focused plenoptic camera with lenslets at the pixels that reduce the fill factor at the pixels, a photosensor may be used in the focused plenoptic camera in which the pixels are spaced apart. In some types of photosensors used in digital cameras, e.g. CCD arrays, the pixels are adjacent to each other, with little or no gap between pixels. However, it is possible to manufacture photosensors in which the pixels are spaced apart, with gaps between pixels, which would result in each pixel capturing a smaller area from the main image plane projected onto the photosensor by the microlens array, thus reducing the size of the pixels. In fact, some photosensors, for example CMOS photosensors, do have spacing between the pixels to allow for transistors or other components used in these devices. However, these photosensors typically have a small lens associated with each pixel to optically increase the area captured by the pixel (i.e., to increase the fill factor at the pixel), effectively eliminating the gap between the pixels. Such a photosensor could be modified by removing these fill factor-increasing lenses from the pixels, or by not placing the lenses at the pixels during manufacture, which would effectively reduce the size of the pixels. Thus, existing photosensors may be modified, or photosensors may be manufactured, to provide spacing between the pixels. These photosensors may then be used in a focused plenoptic camera to reduce the size of the pixels, thus improving super-resolution in the camera by reducing or eliminating the need to apply deconvolution to super-resolved images generated from flats captured with the camera.

Figure 39:
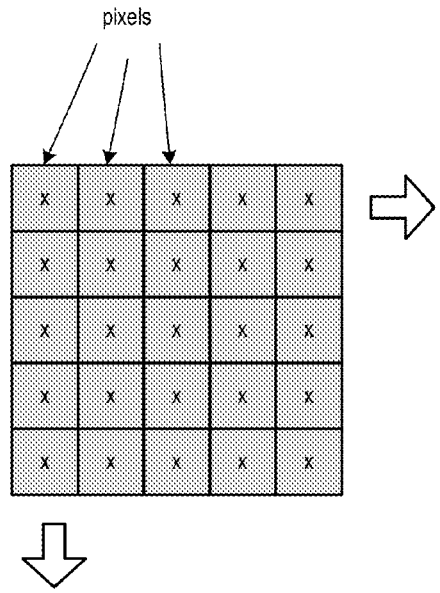
FIGS. 39 and 40 illustrate spaced pixels, according to some embodiments.
Figure 40:
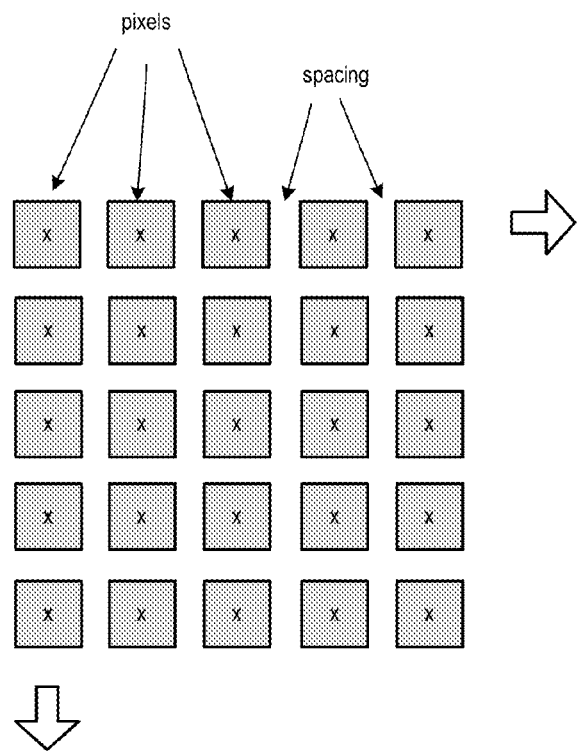

FIGS. 39 and 40 illustrate spaced pixels, according to some embodiments. FIG. 39 graphically illustrates a typical photosensor with the pixels adjacent to each other. FIG. 40 graphically illustrates a photosensor with the pixels spaced apart. Note that the spacing shown is an example; relatively more or less spacing may be provided between the pixels.

In some embodiments, instead of or in addition to one or more of the other techniques, a mask, coating, surface, or covering may be provided at the photosensor, with a small aperture or hole above each pixel of the photosensor between the photosensor and the microlens array, which would result in each pixel capturing a smaller area from the main image plane projected onto the photosensor by the microlens array, thus reducing the size of the pixels. Again, reducing the size of the pixels improves super-resolution in the camera by reducing or eliminating the need to apply deconvolution to super-resolved images generated from flats captured with the camera.

FIGS. 41A and 41B illustrate a fill factor-reducing mask in a focused plenoptic camera, according to some embodiments. FIG. 41A shows a photosensor 3010, such as photosensor 3010 of FIG. 20, with a fill factor-reducing mask 4010 that provides a fill factor-reducing aperture 4012 at each pixel 4000 of the photosensor 3010. FIG. 38B is a side view that shows the positioning of the fill factor-reducing mask 4010 between the microlens array 3020 and photosensor 3010 in a focused plenoptic camera such as the camera shown in FIG. 20. Note that the size and shape of the apertures 4012 are given as examples; other sizes and shapes of apertures 4012 may be used. For example, substantially square or rectangular apertures 4012 may be used. Also note that FIG. 41A shows a space between the photosensor 3010 and the mask 4010; in practice, the mask 4010 may be in direct contact with photosensor 3010, or applied to a glass surface that is in direct contact with photosensor 3010.

Sampling with Small Pixels

As noted above, one or more of several modifications may be made to a focused plenoptic camera to effectively reduce the pixel size. The following illustrates and describes sampling techniques for super-resolution using the smaller pixels that do not overlap or that overlap less than pixels in conventional plenoptic cameras.

Figure 26:
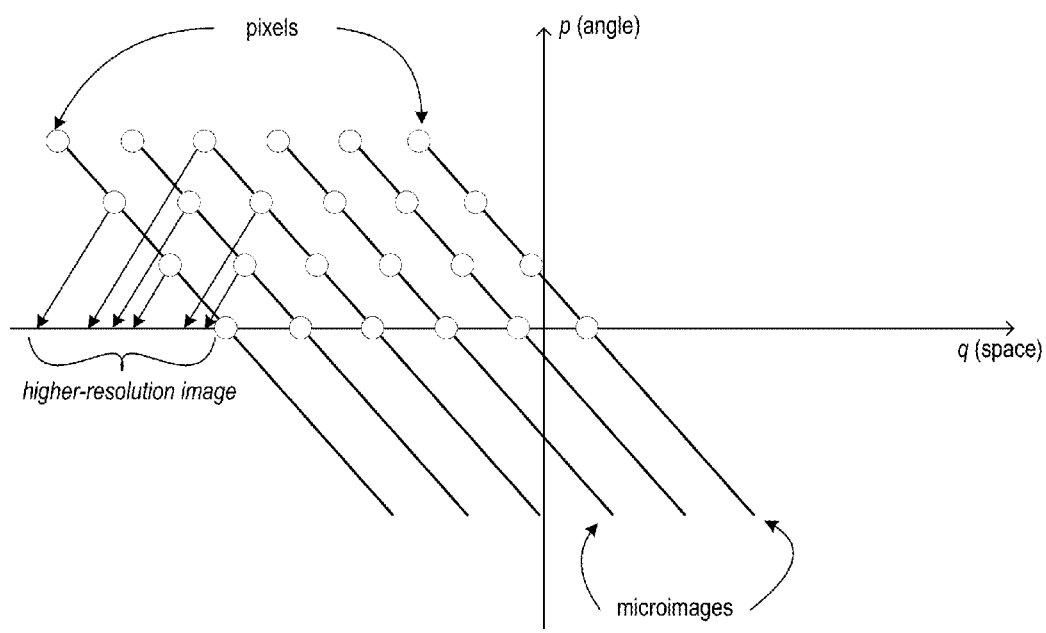
FIG. 26 illustrates projecting pixels according to a super-resolution technique, where the pixels are smaller and thus do not overlap.

FIG. 26 illustrates microimages viewed as a stack in (q, p) space and shows projecting pixels according to a super-resolution technique, where the pixels are smaller and thus do not overlap, according to at least some embodiments. The small circles represent the pixels. Note that the pixels are small, with considerable space between pixels in each microimage. The lines of projection intersect the q axis. Note, however, that the lines of projection do not pass through other pixels on other microimages, as they do in FIG. 24, which shows large pixels that are adjacent to each other with little or no space in between.

Figure 27:
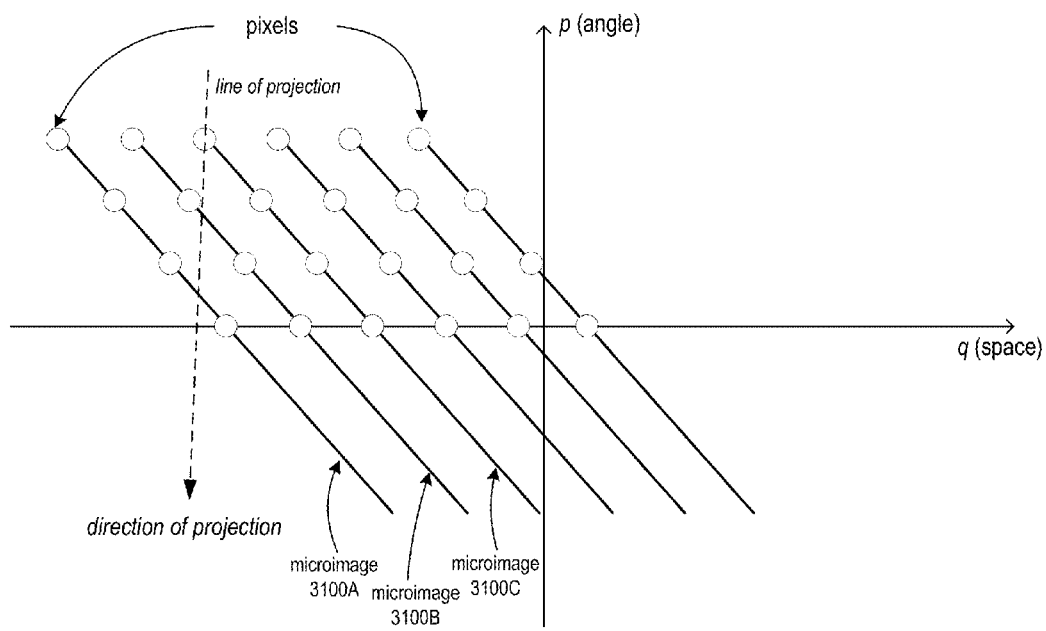
FIGS. 27 and 28 illustrate a line of projection through a stack of microimages with small pixels, according to embodiments.

FIG. 27 illustrates microimages viewed as a stack in (q, p) space, and shows a line of projection through the microimages, the angle of which is determined by a current depth of focus, according to at least some embodiments. The small circles represent the pixels. Note that the pixels are small, with considerable space between pixels in each microimage. The super-resolving technique needs to determine what value to read at each microimage (e.g., at microimages 3100A, 3100B, and 3100C). To do this, lines of projection are formed at pixels to project the pixels onto the q axis. Note that the example line of projection from a pixel on microimage 3100C does not pass through pixels on microimages 3100A and 3100B, but instead passes between the pixels.

Figure 28:
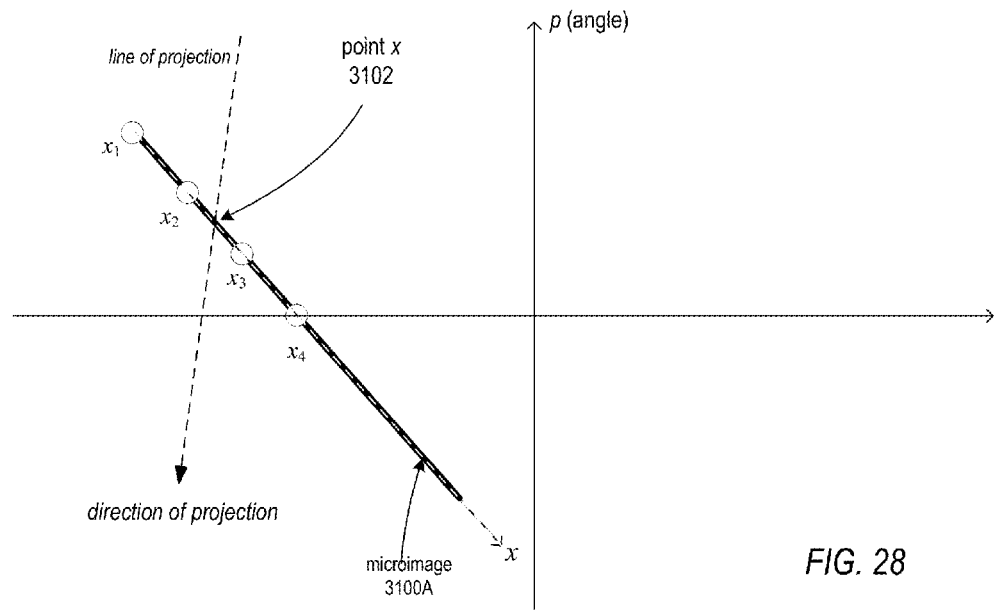
Figure 29A:
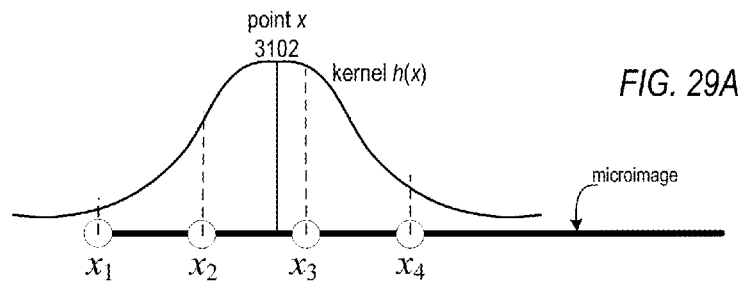
FIG. 29A graphically illustrates an example kernel that may be used in at least some embodiments.
Figure 29B:
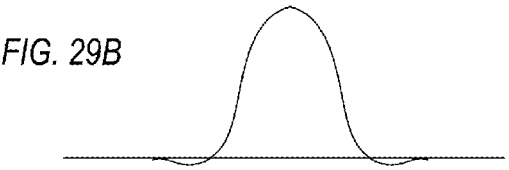
FIG. 29B graphically illustrates an example sharpening kernel or filter that may be used in at least some embodiments.

FIG. 28 illustrates the point x 3102 on microimage 3100A at which the line of projection intersects the microimage. Note that, since the pixels are small and there is space between the pixels on each microimage, the line of projection may pass through a pixel, or between pixels. In some embodiments, the point x 3102 defines the sampled pixel value for the given microimage based on a kernel, for example as shown in FIG. 29A or 29B. In at least some embodiments, the kernel weights the values accumulated from a pixel (e.g., $x_1, x_2, x_3,$ or $x_4$) according to the distance of the pixel from point x 3102. In some embodiments, the kernel may be a sharpening kernel, i.e. a sharpening filter, as shown in FIG. 29B, that has negative tails and is relatively narrow. In super-resolution, because deconvolution may be required due to the blurring resulting from blending pixels, it may be advantageous to do at least some deconvolution while sampling the pixels with the kernel. Using a sharpening filter when sampling and blending the pixels may result in less blurry blending results and thus may reduce the amount of deconvolution required in post-processing the image. Other types of kernels may be used, including but not limited to bi-cubic and Gaussian kernels. The following is a general formulation for an example kernel that may be used in some embodiments:

$$f(x) = \sum_{k=0}^{K-1} c_k h(x - x_k)$$

where h is the interpolation kernel weighted by coefficients $C_k$ and applied to K data samples, $X_k$.

The kernel, for example a sharpening kernel, is thus used to sample pixel values from the microimages. Embodiments take a pixel from q, and draw the projection line (according to a selected angle) that crosses many microimages in the image stack. In each microimage, according to the distance of the neighboring pixels to this intersectional line, the kernel gives certain weights to certain pixels. Once the calculations are performed for one such line, the result is an average value according to the kernel. The value may be normalized, e.g. divided by a normalization metric for the kernel, to get the pixel value of this point on the q axis. This is performed for all the pixels to generate a final, super-resolved image. Referring again to FIG. 28, embodiments may compute values sampled at microimage 3100A based on the kernel, centered at point x 3102. The technique then similarly adds in values sampled from the other microimages using the kernel centered at the corresponding intersection points (x', x", ...) on those microimages.

FIGS. 30 through 37 further illustrate sampling, according to at least some embodiments.

Figure 30:
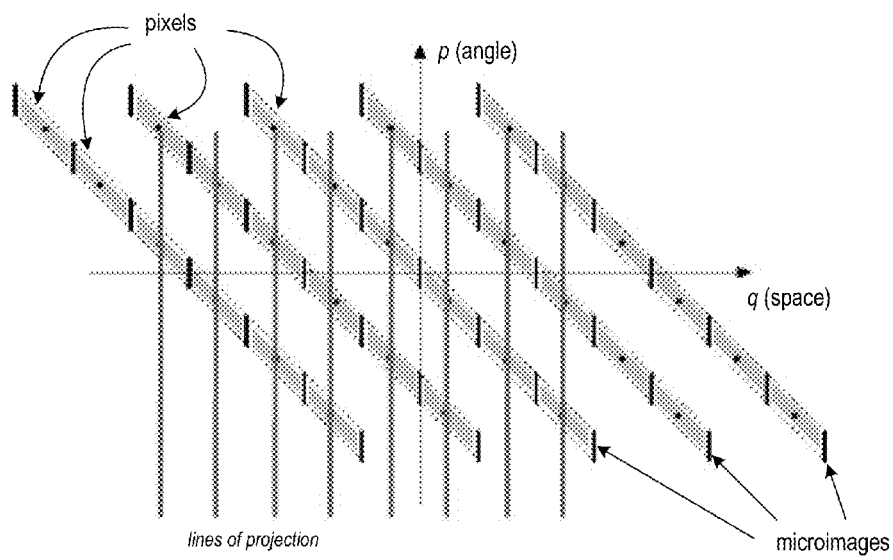
FIG. 30 illustrates conventional blended rendering, without super-resolution, and without small pixels.

FIG. 30 illustrates conventional blended rendering, without super-resolution, and without small pixels. Note that the vertical lines of projection are aligned on the centers of the conventional pixels on different microimages; the pixels in each microimage are large, with little or no space between them. Thus, each pixel fully overlaps the pixels it is blended with. This technique does not gain anything in terms of resolution; the pixels are simply blended.

Figure 31:
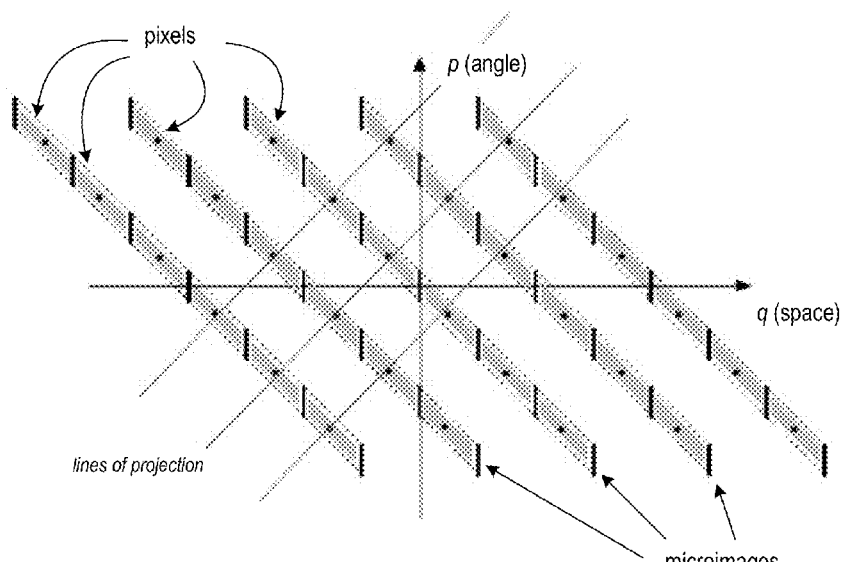
FIG. 31 illustrates rendering with the projection lines arranged at an angle, rather than vertically as shown in FIG. 30.

FIG. 31 illustrates rendering with the projection lines arranged at an angle, rather than vertically as shown in FIG.

30. Thus, this image is focused at a different depth than that of FIG. 30. Changing the angle of the lines of projection changes the depth of focus. However, as in FIG. 30, note that the lines of projection in FIG. 31 are aligned on the centers of the conventional pixels on different microimages; the pixels in each microimage are large, with little or no space between them. Thus, each pixel fully overlaps the pixels it is blended with. This does not gain anything in terms of resolution; the pixels are simply blended.

Figure 32:
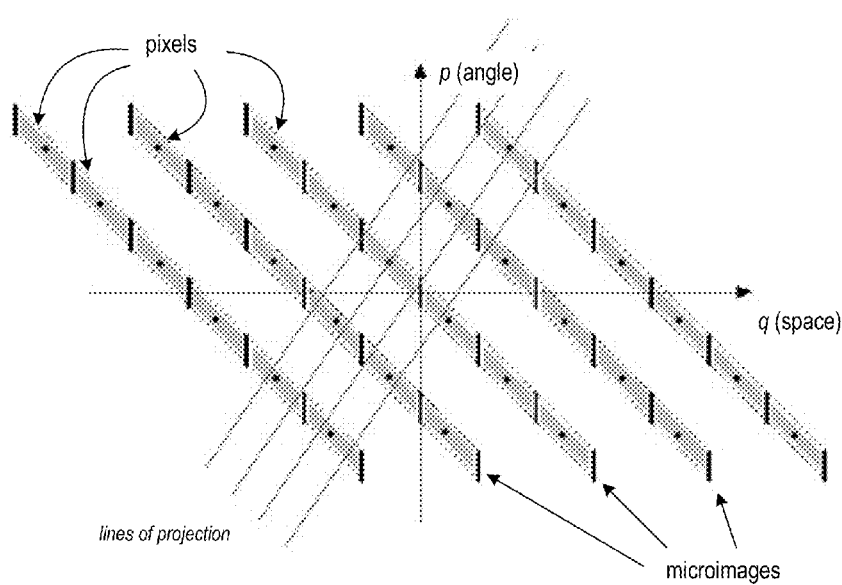
FIG. 32 shows the same situation as FIG. 31, with the angle of the lines of projection changed slightly.

FIG. 32 shows the same situation as FIG. 31, with the angle of the lines of projection changed slightly. Thus, the lines of projection do not go through all the same pixels; instead, the lines go from one pixel to another. Tilting the lines as shown in FIG. 32 thus mixes different pixels. By mixing the pixels, more pixel values are obtained than are obtained sampling directly as shown in FIGS. 30 and 31. These pixels in FIG. 32 may be blended according to a super-resolution algorithm to produce a super-resolved image. However, the pixels in each microimage of FIG. 32 are large, with little or no space between them. Thus, each pixel partially overlaps all pixels it is blended with. This results in blurriness of the output image.

Appropriately blending pixels with a super-resolution technique thus yields images that are at higher resolution, 2×, 3×, 4×, etc., than images produced by methods as shown in FIGS. 30 and 31. The images contain more information, but are blurry because the pixels are large and thus overlap. The resulting image requires deblurring. Note that it is not required for super-resolution to be performed exactly at a plane where the pixels fit between each other. Super-resolution may be performed at many different tilt angles. However, in conventional focused plenoptic cameras, super-resolution is not possible at certain depths of focus as determined by the angle of the lines of projection, because at those depths the pixels exactly align. Thus, if dynamically adjusting an image in a standard super-resolution pipeline, super-resolution does not appear when the angle of the lines of projection is set to certain values. Super-resolution "comes and goes", in other words.

FIG. 33 shows overlapping pixels at the main lens image plane of a conventional focused plenoptic camera. FIG. 34 shows an example embodiment of a focused plenoptic camera in which the camera has been modified according to one or more of the techniques as described herein so that smaller pixels are captured at the photosensor from the main lens image plane. Note that the smaller pixels may overlap less than those captured with the conventional focused plenoptic camera, or in some embodiments may not overlap at all.

Figure 35:
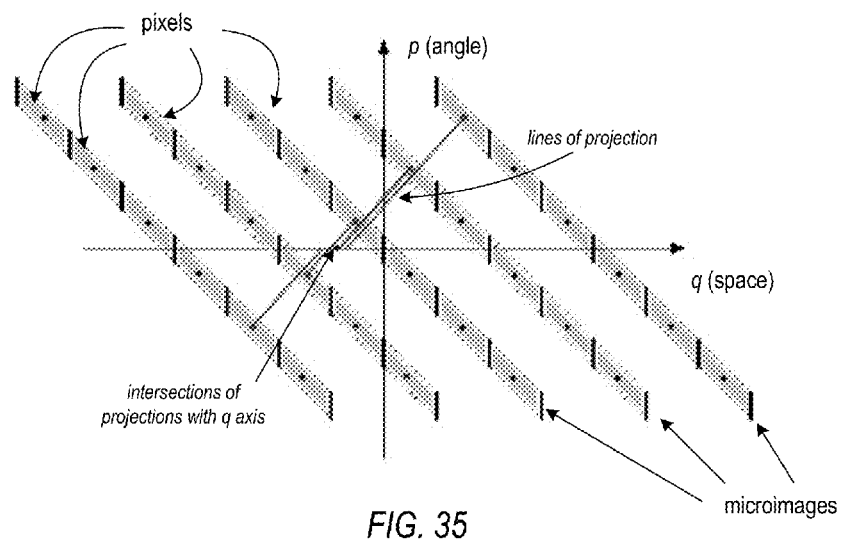
FIGS. 35 and 36 illustrate a more detailed representation of projection, according to at least some embodiments.
Figure 36:
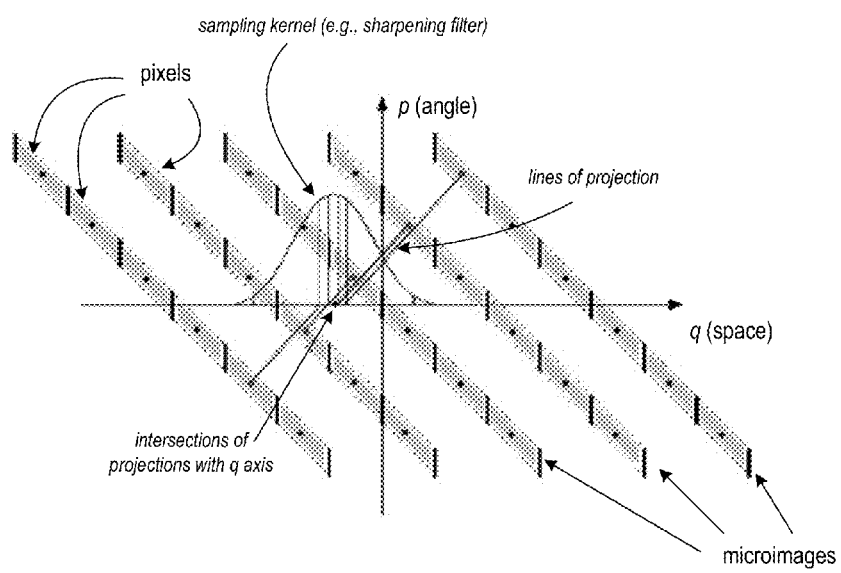

FIGS. 35 and 36 illustrate a more detailed representation of projection, according to at least some embodiments. FIG. 35 shows another representation of pixels. Assuming the pixels are located at the central point, where would they be projected on the spatial axis, q? With this projection, as shown, four pixels intersect the q axis. The pixel values could be sampled directly. However, as shown in FIG. 36, in some embodiments, instead of direct sampling, a kernel or filter may be used to sample the pixels. The kernel provides weights at which to sample the pixels. Pixels are sampled at many different locations, using the weights provided by the kernel, and are appropriately blended to generate a super-resolved image. Note that this kernel filtering technique work both for embodiments of a focused plenoptic camera that is configured to capture relatively small pixels that do not overlap or that overlap less than conventional, larger pixels, and for conventional focused plenoptic camera embodiments that capture large pixels with little or no space between pixels. As previously noted, the large pixels result in blurring due to overlap, and thus require deconvolution. However, embodiments of a focused plenoptic camera configured to capture small pixels, as described herein, do not need as much, or possibly do not need any, deconvolution.

In some embodiments, the kernel may be a sharpening kernel, i.e. a sharpening filter. In super-resolution, because deconvolution may be required due to the blurring resulting from blending pixels, it may be advantageous to do at least some deconvolution while sampling the pixels with the kernel. Using a sharpening filter when sampling and blending the pixels may result in less blurry blending results and thus may reduce the amount of deconvolution required in post-processing the image. Other types of kernels may be used, including but not limited to bi-cubic and Gaussian kernels.

Figure 37:
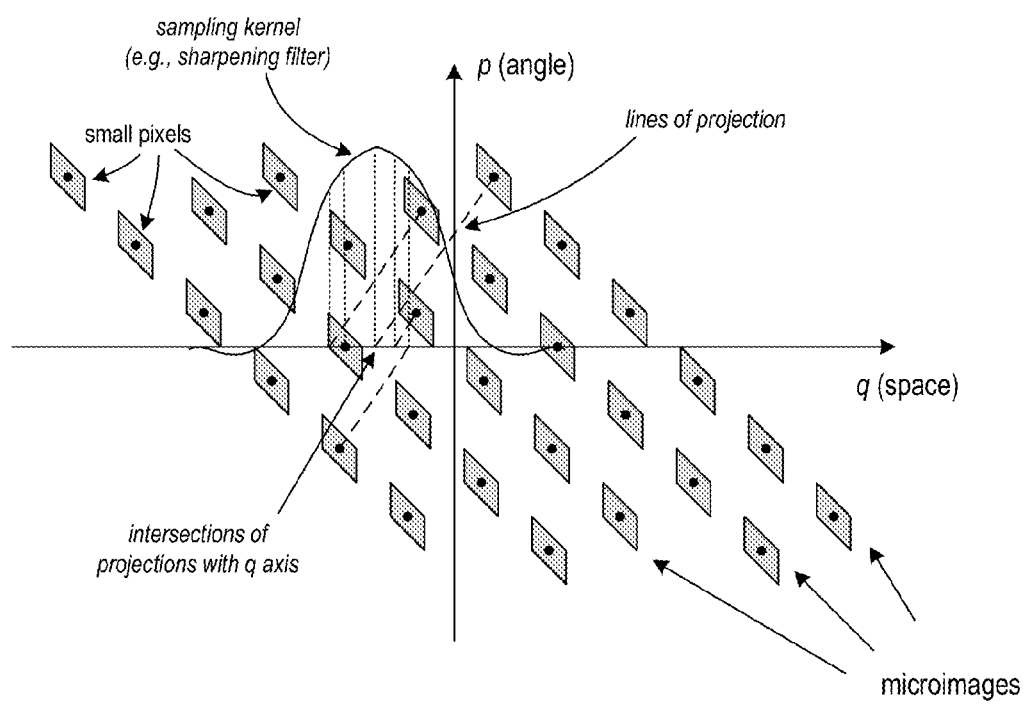
FIG. 37 shows a representation of projection with small, non-overlapping pixels, and sampling using a kernel, according to at least some embodiments.

FIG. 37 shows a representation of projection with small, non-overlapping pixels, and sampling using a kernel, according to at least some embodiments. For example, the kernel may be a sharpening kernel, as previously described. FIG. 37 is similar to FIG. 36, except that the pixels are small, non-overlapping pixels, and thus the lines of projection generally do not pass through other pixels, which reduces or eliminates blurring, thus reducing or eliminating the need for deconvolution.

Shifted Pixels

As previously noted, in conventional focused plenoptic cameras, super-resolution is not possible at certain depths of focus as determined by the angle of the lines of projection, because at those depths the pixels exactly align. For example see FIGS. 30 and 31. At these depths of focus, the pixels line up exactly. Because they do, super-resolution cannot be achieved at these depths. Thus, at depths or directions of projection where pixels line up perfectly, super-resolution is not achieved. At other depths, for example as shown in FIG. 32, the pixels do not exactly line up, and thus super-resolution can be achieved. Thus, when dynamically adjusting an image in a super-resolution pipeline, super-resolution does not appear when the angle of the lines of projection is set to certain values. Super-resolution "comes and goes," in other words.

To overcome this problem, and to make super-resolution possible at more depths or at all depths, the pixels may be slightly shifted, for example according to a random positioning of the centers of the pixels. In conventional photosensors, the pixels all have the same pitch (i.e. the distance between centers of the pixels). In many but not all conventional photosensors, the pitch is near or equal to the pixel width. Embodiments of techniques by which the centers (and pitch) of the pixels may be randomized to slightly shift the centers relative to each other are described. This randomization of the pixels effectively adds noise to the positions of the pixels. Note that at least some of these techniques may be applied in focused plenoptic cameras that also employ smaller, reduced-overlap or non-overlapping pixels according to one or more of the techniques for reducing pixel size that were previously described. In addition, at least some of these techniques may also be applied in focused plenoptic cameras that employ conventional, large-pixel sensors. Note that the techniques for shifted pixels that are described below may be used alone or in combination with other techniques for shifted pixels, and also may be used in combination with the previously described techniques for achieving small pixels.

A first technique for achieving shifted pixels is to manufacture photosensors in which the pixels are randomly shifted (or otherwise shifted) in relation to each other, so that pitch between pixels varies from pixel to pixel. Note that this random shifting technique may be combined with techniques for providing smaller pixels.

FIG. 42A illustrates randomly shifted pixels in a photosensor, according to some embodiments. FIG. 42A shows a photosensor with the pixels spaced apart, with the centers of the pixels randomly shifted in relation to each other. Note that the spacing and shifting shown is an example; relatively more or less spacing and shifting may be provided among the pixels.

A second technique for achieving shifted pixels is to place a mask over the pixels on the photosensor with randomly (or otherwise) shifted small holes or pinholes (e.g., rectangular or square holes, or holes of some other geometric shape). Note that this random shifting may be combined with the technique that employs smaller holes than the pixel size to effectively reduce the pixel size.

FIG. 42B illustrates a mask in a focused plenoptic camera that provides shifted apertures, according to some embodiments. FIG. 4BA shows a photosensor 3010, such as photosensor 3010 of FIG. 20, with a mask 4010 that provides shifted apertures at each pixel of the photosensor. FIG. 41B provides a side view that shows the positioning of such a mask between the microlens array 3020 and photosensor 3010 in a focused plenoptic camera such as the camera shown in FIG. 20. Note that the size and shape of the apertures in FIG. 42B are given as examples; other sizes and shapes of apertures may be used. For example, substantially square or rectangular apertures may be used. Also note that FIG. 42B shows a space between the photosensor and the mask; in practice, the mask may be in direct contact with the photosensor, or applied to a glass surface that is in direct contact with photosensor. Also note that, in some embodiments, the apertures may be fill factor-reducing apertures as illustrated in FIG. 41A.

A third technique for achieving shifted pixels is to use an array of lenslets between the sensor and the main image plane in which the centers of the lenslets are randomly or otherwise shifted relative to each other. Thus, the lenslets are not at perfect pitch. In some embodiments, the lenslets may be fill factor-reducing lenslets to effectively generate smaller pixels, as previously described. However, this technique will also work to provide super-resolution at more or all depths of focus even for conventional focused plenoptic cameras employing larger pixels.

FIG. 42C illustrates shifted lenslets at the pixels in a focused plenoptic camera, according to some embodiments. FIG. 42C shows a photosensor, such as photosensor 3010 of FIG. 20, with a randomly shifted lenslet at each pixel of the photosensor. FIG. 38B provides a side view that shows the positioning of the shifted lenslets between the microlens array and photosensor in a focused plenoptic camera such as the camera shown in FIG. 20. Note that the size and shape of the shifted lenslets are given as examples; other sizes and shapes of lenslets may be used. Also note that, in some embodiments, the shifted lenslets may be fill factor-reducing microlenses as illustrated in FIG. 38A.

Applying one or more of these techniques in a focused plenoptic camera effectively randomly shifts the centers of the pixels captured with the camera. Since the pixels are slightly shifted relative to each other, the pixels generally do not perfectly align at any depth of focus, and thus super-resolution may be achieved at more or all depths of focus, which is not possible with conventional, aligned pixels. When performing the super-resolution processing, the pixels are processed as previously described as if they are aligned. However, because of the sub-pixel shift introduced by one or more of the above techniques, the image aligns in an artificial way, and super-resolution can be achieved at more or all depths of focus.

Image with a Focused Plenoptic Camera According to Some Embodiments

Figure 43:
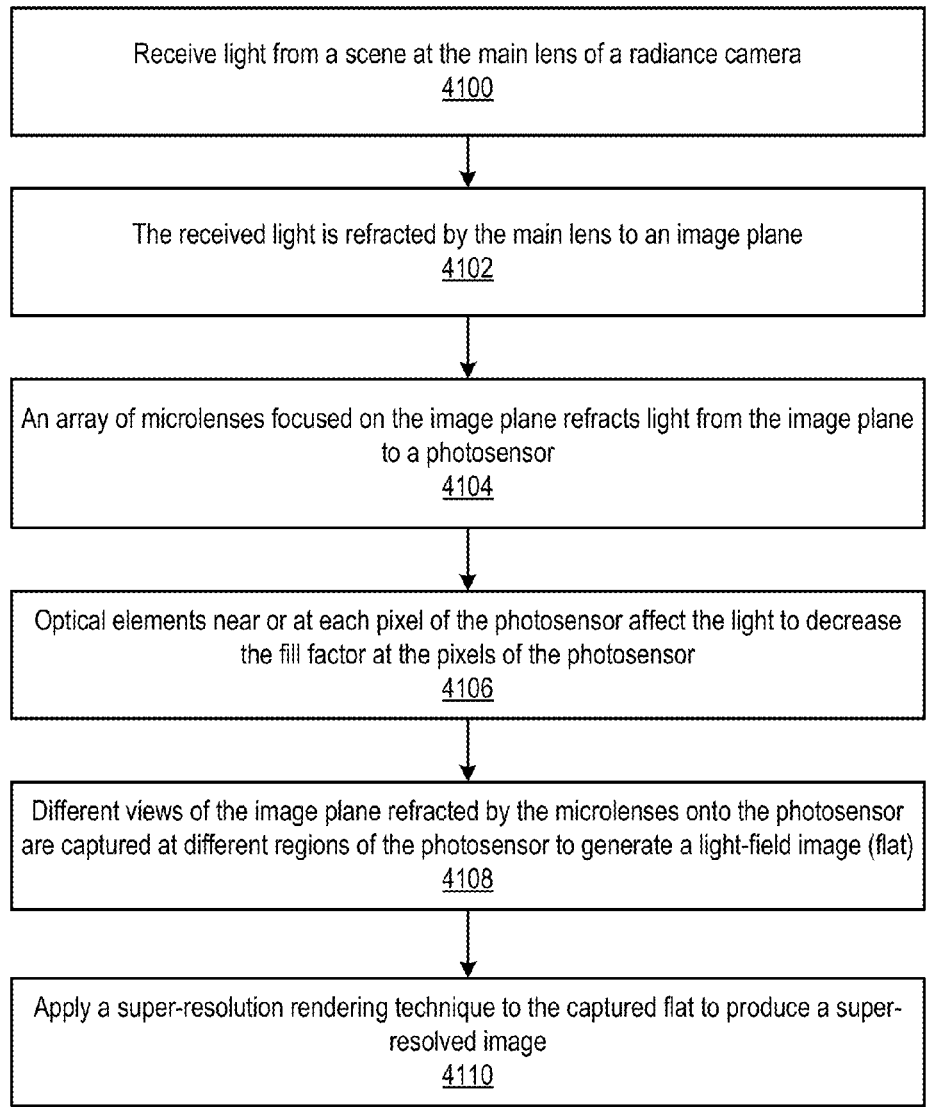
FIG. 43 is a flow chart illustrating how light is directed within a focused plenoptic camera that implements smaller pixels to improve super-resolution, according to at least some embodiments.

FIG. 43 is a flow chart illustrating how light is directed within a focused plenoptic camera that implements smaller pixels to improve super-resolution, according to at least some embodiments. As indicated at 4100, light from a scene is received at the main lens of a focused plenoptic camera. FIG. 20 illustrates an example focused plenoptic camera. As indicated at 4102, the received light is refracted by the main lens to an image plane. As indicated at 4104, an array of microlenses, the microlenses of which are focused on the image plane and not on the main lens, refracts light from the image plane onto a photosensor. As indicated at 4106, optical elements near or at each pixel of the photosensor affect the light to decrease the fill factor at the pixels of the photosensor. Example optical elements that may be used to decrease the fill factor include fill factor-reducing lenslets as illustrated in FIGS. 38A and 38B, spaced pixels as illustrated in FIG. 40, and apertures as illustrated in FIGS. 41A and 41B. Note that combinations of these different optical elements may be used in some embodiments. As indicated at 4108, different views of the image plane, refracted by the microlenses onto the photosensor, are captured at different regions of the photosensor to generate a light-field image. At 4110, the captured light-field image (also referred to as a flat) may be rendered according to a super-resolution rendering technique as described herein to produce a final super-resolved image. However, since the optical elements provide spacing between the pixels as illustrated in FIGS. 34 and 37, the captured pixels in the microimages do not overlap or overlap less than in a flat captured using a standard focused plenoptic camera. Thus, the resulting super-resolved image may be less blurry or not blurry, which may reduce or eliminate the need to apply deconvolution in the super-resolved image.

In at least some embodiments, the super-resolution rendering technique that is used may employ a kernel such as a sharpening kernel when sampling pixels from the microimages, as described in relation to FIGS. 29A and 29B and FIG. 37B. The use of the kernel may apply a level of deconvolution when sampling the pixels, and may thus result in a sharper super-resolved image and reduce or eliminate the need to apply deconvolution to the output super-resolved image.

Video Camera Applications

There are cameras available that can capture both still images and video, including but not limited to inexpensive, point-and-shoot cameras. However, in many of these cameras, video is captured at much lower resolution than the maximum resolution at which still images can be captured. For example, many such cameras reduce the size of the video frames to approximately ⅑ of the maximum resolution. In at least some such cameras, this is accomplished using a binning technique in which a block (typically 9, a 3×3 square) of pixels on the photosensor are captured as one pixel. The reason for this reduction in resolution is that many such cameras cannot capture video images at an acceptable frame rate at the higher resolution due to limitations of the hardware and/or processing capabilities of these devices.

One or more of the techniques for providing smaller, non-overlapping pixels as described herein, and/or super-resolution techniques as described herein, may be applied to produce video in such cameras, appropriately modified, with higher resolution than is conventionally provided by such cameras.

In embodiments of such a camera, the photosensor may be configured to capture video frames in skipping mode instead of binning mode. In skipping mode, instead of collectively capturing one pixel at each block, a single pixel from each block is captured. For example, in a 3×3 block, the center pixel may be captured. Alternatively, some other pixel in each block may be captured, or the location of the pixel in each block that is captured may be randomly determined, or determined according to some pattern. Thus, the frames are captured at reduced resolution. However, the frames are super-resolvable. By using smaller pixels as described herein, the frames are super-resolvable without deconvolution, or with a lesser amount of deconvolution. One or more of the super-resolution rendering techniques as described herein may be applied to a video clip captured with the camera to increase the resolution, for example to double or triple the resolution.

Super-Resolution User Interface

Figure 44:
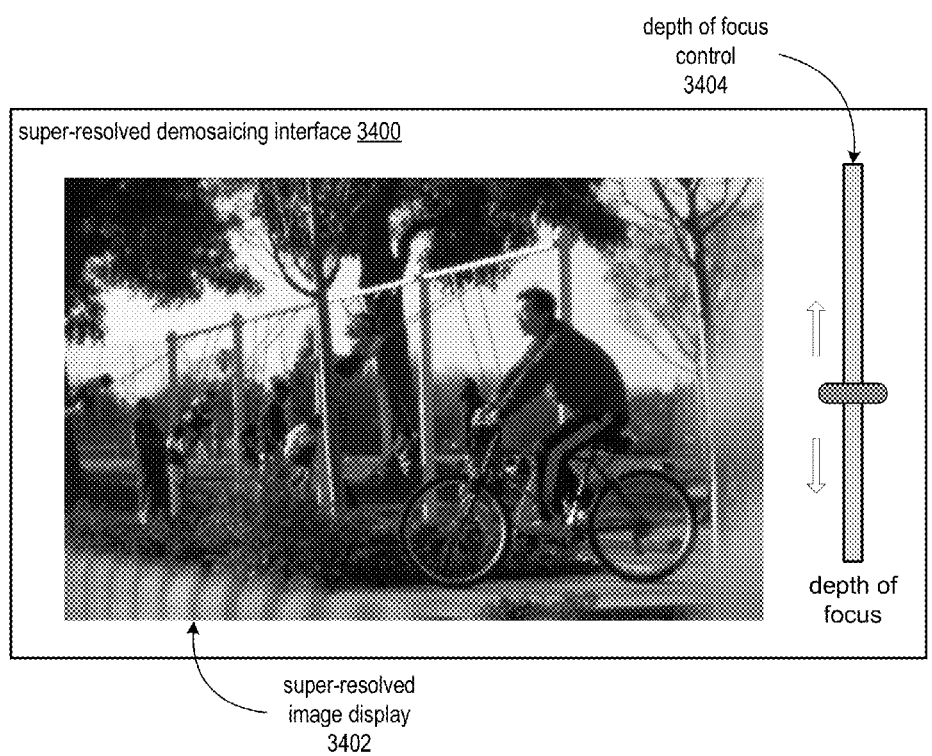
FIG. 44 shows an example user interface, according to some embodiments, for processing a flat captured with a focused plenoptic camera to render a super-resolved image.

FIG. 44 shows an example user interface, according to some embodiments, to a pipeline for processing a flat captured with a focused plenoptic camera to render a super-resolved image. Embodiments may provide a user interface 3400 and user interface elements (e.g., super-resolved image 3402 and depth of focus control 3404) via which a user can interactively apply a super-resolution rendering algorithm to an input image. In at least some embodiments, the user interface may provide a depth of focus control 3404. A slider bar or other user interface element or elements may be provided via which the user can change the angle of the line of projection; changing this angle is equivalent to changing the depth of focus, i.e. the angle determines the depth of focus, or vice versa. Generally, a particular angle will result in the best focusing, and thus give the best sharpness or resolution at certain depths, i.e. at certain image planes. In some embodiments, this technique may provide immediate feedback; that is, the user may adjust the user interface element and almost immediately see the results on a displayed super-resolved image 3402. Thus, the user may tweak the user interface element 3404 to quickly determine the best, near-best, or desired depth of focus to generate a high-quality, super-resolved output image 3402 from an input focused plenoptic camera image. In at least some embodiments, the super-resolving algorithm may be implemented, at least in part, as a graphics processing unit (GPU) application executable on a GPU.

Example Implementations of Rendering Methods

Figure 45:
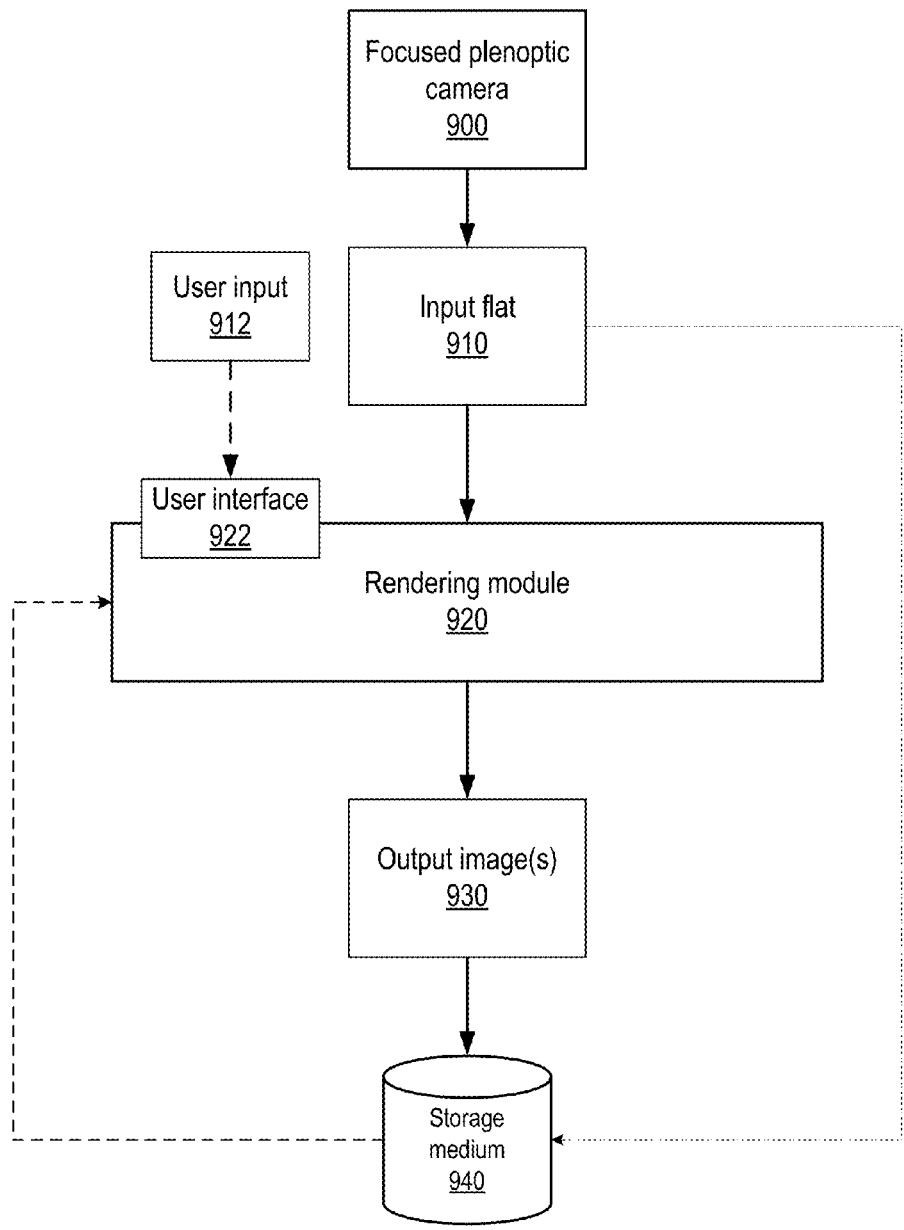
FIG. 45 illustrates a rendering module rendering a high-resolution image from a flat captured, for example, by a focused plenoptic camera, according to some embodiments.
Figure 46:
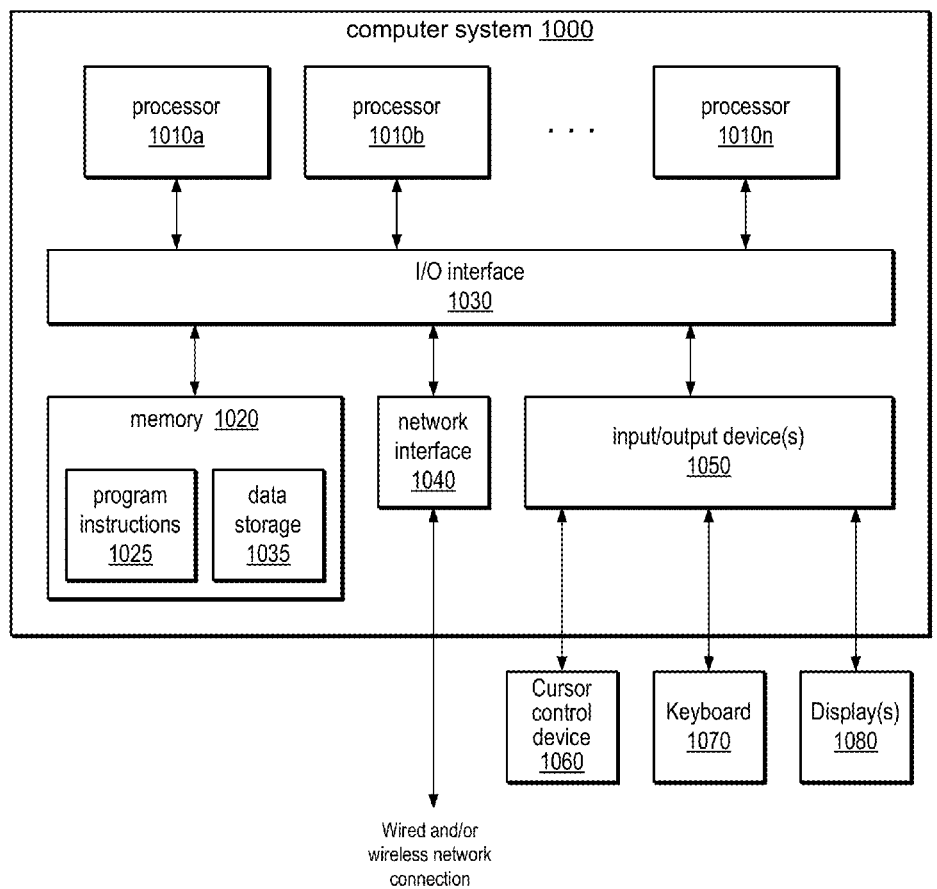
FIG. 46 illustrates an example computer system that may be used in embodiments.

Embodiments of the super-resolution techniques may be performed by a rendering module implemented by program instructions stored in a computer-readable storage medium and executable by one or more processors (e.g., one or more CPUs or GPUs) of a computer system or other device. FIG. 45 illustrates a rendering module rendering images from a flat captured, for example, by various embodiments of a focused plenoptic camera as described herein. Rendering module 920 may, for example, implement super-resolution methods for rendering super-resolved images from flats captured using focused plenoptic cameras, as described herein. FIG. 46 illustrates an example computer system on which embodiments of rendering module 920 may be implemented. FIG. 44 illustrates an example user interface for a rendering module 920 (note that other user interfaces may also be provided). In some embodiments of a focused plenoptic camera, rendering module 920 may be implemented in the camera, e.g. in captured data processing module. Referring to FIG. 45, rendering module 920 receives an input flat 910 captured by a focused plenoptic camera, such as one of the embodiments of focused plenoptic cameras described herein. An example portion of a flat as may be captured by various embodiments of a focused plenoptic camera is illustrated in FIG. 21. Rendering module 920 then processes the input image 910 according to an appropriate rendering method or methods as described herein, for example the super-resolution rendering methods as described herein. Rendering module 920 generates as output one or more images 930. Output image 930 may, for example, be stored to a storage medium 940, such as system memory, a disk drive, DVD, CD, etc. The dashed line from input image 910 to storage medium 940 indicates that the original (input) flat 910 may also be stored. The dashed line from storage medium 940 to rendering module 920 indicates that stored images may be retrieved and further processed by rendering module 920.

In some embodiments, rendering module 920 may provide a user interface 922 via which a user may interact with the module 920, for example to specify or otherwise manage input flats 910 and output images 930 as described herein. The user interface 922 may also provide one or more user interface elements whereby the user may select parameters of the super-resolution rendering method, such as the depth of focus or the super-resolution mode (2×2, 3×3, etc.), to be used to super-resolve a flat. An example user interface is shown in FIG. 44.

Example System

Embodiments of a rendering module and/or one or more of the various rendering methods as described herein may be executed on one or more computer systems, which may interact with various other devices. One such computer system is illustrated by FIG. 46. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some embodiments, computer system 1000 may be a digital camera.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the various rendering methods disclosed herein may be implemented at least in part by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a rendering module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 46, memory 1020 may include program instructions 1025, configured to implement embodiments of a rendering module as described herein, and data storage 1035, comprising various data accessible by program instructions 1025. In one embodiment, program instructions 1025 may include software elements of embodiments of a rendering module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a rendering module as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A camera, comprising:
    an objective lens configured to refract light from a scene located in front of the camera to form an image of the scene at an image plane of the objective lens;
    a microlens array, positioned between the objective lens and a photosensor that comprises a plurality of pixels configured to capture light projected on to the photosensor, the microlens array comprises a plurality of microlenses that are each configured to sample a respective region of the image of the scene formed at the image plane by the objective lens, each region of the image of the scene sampled by the microlenses partially overlaps at least one other region of the image of the scene sampled by the microlenses;
    a plurality of optical elements fabricated as apertures in a mask layer interposed between the pixels of the microlens array and the photosensor to reduce areas of the image of the scene sampled by the pixels so that the area of the image of the scene sampled by pixels at respective locations on the photosensor do not overlap the areas of the image of the scene sampled by pixels at other locations on the photosensor onto which an overlapping region of the image of the scene is projected, each said location on the photosensor samples radiance from a particular area of the image of the scene; and
    the photosensor configured to capture a flat that includes each of the regions of the image of the scene projected onto the photosensor by the microlenses in a separate microimage in the flat that is processed by a super-resolution technique that interleaves pixels in neighboring microimages according to a subpixel shift to render a high-resolution image of the scene, the super-resolution technique comprising, for each point in the high-resolution image, sampling values at pixels in two or more different microimages in the flat and blending the sampled values to generate a value for a pixel at the respective point in the high-resolution image.

2. The camera as recited in claim 1, wherein the reduction provided by the optical elements of the photosensor reduces blur in the high-resolution image of the scene generated by the super-resolution technique.

3. The camera as recited in claim 1, wherein the optical elements are configured to form corresponding said pixels with gaps between adjacent ones of the pixels.

4. The camera as recited in claim 1, wherein the mask layer includes an aperture at each pixel, and the apertures restrict light at respective pixels of the photosensor to effectively form small pixels with gaps between adjacent ones of the pixels.

5. The camera as recited in claim 1, wherein the optical elements are lenslets between the pixels of the photosensor and the microlens array, a lenslet being located at each pixel, and the lenslets affecting light projected onto respective pixels of the photosensor to effectively form small pixels with gaps between adjacent ones of the pixels.

6. The camera as recited in claim 1, wherein said sampling the values comprises applying a sharpening kernel to sample the values at the pixels in the microimages, the sharpening kernel applied to sample the values at the pixels in the microimages reducing blur in the high-resolution image.

7. The camera as recited in claim 1, wherein varying pitch between the centers of the areas of the image of the scene sampled by the pixels of the photosensor enables super-resolution to be performed at more depths of focus than possible with a flat captured with a fixed pitch between centers of the areas of the image of the scene sampled by the pixels.

8. A camera, comprising:
    an objective lens configured to refract light from a scene located in front of the camera to form an image of the scene at an image plane of the objective lens;
    a microlens array, positioned between the objective lens and a photosensor that comprises a plurality of pixels configured to capture light projected onto the photosensor, the microlens array comprising a plurality of microlenses that are each configured to sample a respective region of the image of the scene formed at the image plane by the objective lens, each region of the image of the scene sampled by the microlenses partially overlaps at least one other region of the image of the scene sampled by the microlenses;
    a plurality of optical elements interposed between the microlens array and the pixels of the photosensor, a pitch for the placement of the optical elements randomly varying the distance between centers of areas of the image of the scene sampled by the pixels of the photosensor, each said pixel on the photosensor sampling radiance from a particular area of the image of the scene; and
    the photosensor configured to capture a flat that includes each of the regions of the image of the scene projected onto the photosensor by the microlenses in a separate microimage in the flat that is processed by a super-resolution technique that interleaves pixels in neighboring microimages according to a subpixel shift to render a high-resolution image of the scene, the super-resolution technique comprising, for each point in the high-resolution image, sampling values at pixels in two or more different microimages in the flat and blending the sampled values to generate a value for a pixel at the respective point in the high-resolution image.

9. The camera as recited in claim 8, wherein said varying pitch between the centers of the areas of the image of the scene sampled by the pixels of the photosensor enables super-resolution to be performed at more depths of focus than possible with a flat captured with a fixed pitch between centers of the areas of an image of a scene sampled by the pixels.

10. The camera as recited in claim 8, wherein a reduction provided by the optical elements of the photosensor reduces blur in the high-resolution image of the scene generated by the super-resolution technique.

11. The camera as recited in claim 8, wherein the optical elements are configured to form corresponding said pixels with gaps between adjacent ones of the pixels.

12. The camera as recited in claim 8, wherein said sampling the values comprises a sharpening kernel applied to sample the values at the pixels in the microimages reducing blur in the high-resolution image.

13. The camera as recited in claim 8, wherein the optical elements lenslets affecting the light projected onto respective pixels of the photosensor to effectively form small pixels with gaps between adjacent ones of the pixels.

14. A method for capturing light-field images, comprising:
refracting light at an objective lens of a camera to form an image of a scene at an image plane of the objective lens;
receiving light from the image plane at a microlens array positioned between the objective lens and a photosensor of the camera, the photosensor comprising a plurality of pixels configured to capture light projected onto the photosensor, the microlens array comprising a plurality of microlenses that each sample a respective region of the image of the scene formed at the image plane by the objective lens, and each region of the image of the scene sampled by the microlenses partially overlaps at least one other region of the image of the scene sampled by the microlenses;
reducing, by optical elements fabricated as apertures in a mask layer interposed between the microlens array and the pixels of the photosensor, areas of the image of the scene received at the pixels so that the area of the image of the scene sampled by a given pixel at a given location on the photosensor does not overlap the areas of the image of the scene sampled by pixels at other locations on the photosensor onto which an overlapping region of the image of the scene is projected;
receiving light from the microlens array at the photosensor, the regions of the image of the scene sampled by the microlenses are received at separate locations on the photosensor, each pixel associated with each said location on the photosensor receives radiance from a particular area of the image of the scene;
capturing a flat that includes each of the regions of the image of the scene projected onto the photosensor by the microlenses in a separate microimage in the flat; and
interleaving pixels in neighboring microimages according to a subpixel shift to render a high-resolution image of the scene.

15. The method as recited in claim 14, further comprising:
applying a super-resolution technique to the flat to render the high-resolution image of the scene, the reduction provided by the optical elements of the photosensor reducing blur in the high-resolution image of the scene generated by the super-resolution technique.

16. The method as recited in claim 15, wherein said applying the super-resolution technique comprises, for each point in the high-resolution image, sampling values at pixels in two or more different microimages in the flat and blending the sampled values to generate a value for a pixel at the respective point in the high-resolution image.

17. The method of claim 16, wherein said sampling the values comprises applying a sharpening kernel to sample the values at the pixels in the microimages, and said applying the sharpening kernel to sample the values at the pixels in the microimages reducing blur in the high-resolution image.

18. The method as recited in claim 14, wherein the mask layer includes an aperture at each pixel, and the apertures restrict light at respective pixels of the photosensor to effectively form small pixels with gaps between adjacent ones of the pixels.

19. The method as recited in claim 14, wherein the optical elements are lenslets between the photosensor and the microlens array, a lenslet being located at each pixel, and the lenslets affecting light projected onto respective pixels of the photosensor to effectively form small pixels with gaps between adjacent ones of the pixels.

20. The method as recited in claim 14, wherein varying pitch between the centers of the areas of the image sampled by the pixels of the photosensor enables super-resolution to be performed at more depths of focus than possible with a flat captured with a fixed pitch between centers of the areas of the image of the scene sampled by the pixels.

* * * * *